(12) United States Patent
So et al.

(10) Patent No.: US 6,964,153 B2
(45) Date of Patent: Nov. 15, 2005

(54) COMPONENTS FOR TIMEPIECE AND METHOD OF MANUFACTURING THEREOF

(75) Inventors: Chin Hung Eddy So, Kwai Chung (HK); Chin Ping So, Kwai Chung (HK)

(73) Assignee: Wing Hon Metal Manufactory LTD, Kwai Chung (HK)

( * ) Notice: Subject to any disclaimer, the term of this patent is extended or adjusted under 35 U.S.C. 154(b) by 69 days.

(21) Appl. No.: 10/328,474

(22) Filed: Dec. 24, 2002

(65) Prior Publication Data

US 2003/0121280 A1 Jul. 3, 2003

(30) Foreign Application Priority Data

Jan. 2, 2002 (GB) .............................. 0200046

(51) Int. Cl.[7] .......................... B29C 45/14; B29C 65/64
(52) U.S. Cl. .............................. 59/79.1; 59/79.3; 59/80; 24/265 WS; 24/71 J
(58) Field of Search ............................... 59/79.1, 79.3, 59/80; 24/71 J, 68 J, 265 WS

(56) References Cited

U.S. PATENT DOCUMENTS

| | | | | |
|---|---|---|---|---|
| 4,178,751 A | | 12/1979 | Liautaud | |
| 5,441,686 A | * | 8/1995 | Jackl et al. | 59/79.3 |
| 5,748,571 A | * | 5/1998 | Jackl | 59/79.1 |
| 5,781,968 A | * | 7/1998 | Widmer | 24/71 J |
| 5,845,478 A | * | 12/1998 | Ripley | 63/5.1 |
| 6,289,562 B1 | * | 9/2001 | Linder et al. | 24/265 WS |
| 6,311,373 B1 | * | 11/2001 | Hashimoto | 24/265 WS |

FOREIGN PATENT DOCUMENTS

| | | |
|---|---|---|
| CH | 666 994 | 9/1988 |
| CH | 667 784 | 11/1988 |
| EP | 0 064 031 | 11/1982 |
| EP | 0 081 464 | 6/1983 |
| EP | 0 570 638 | 11/1993 |
| GB | 2 330 427 | 4/1999 |
| JP | 7-329110 | 12/1995 |
| JP | 2000-300314 | 10/2000 |

\* cited by examiner

Primary Examiner—David Jones
(74) Attorney, Agent, or Firm—Smith-Hill and Bedell

(57) ABSTRACT

There is provided a band for a timepiece comprising a plurality of inter-connected links, at least one of the links including a first portion made at least principally of a metallic material and a second portion made at least principally of an injection moldable material and fixedly secured thereto and molded thereover by injection moulding.

18 Claims, 96 Drawing Sheets

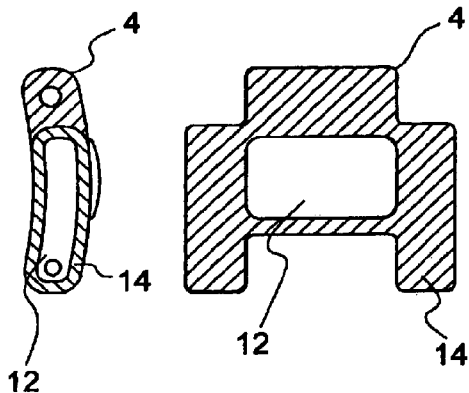
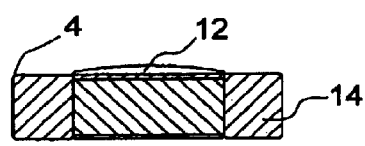
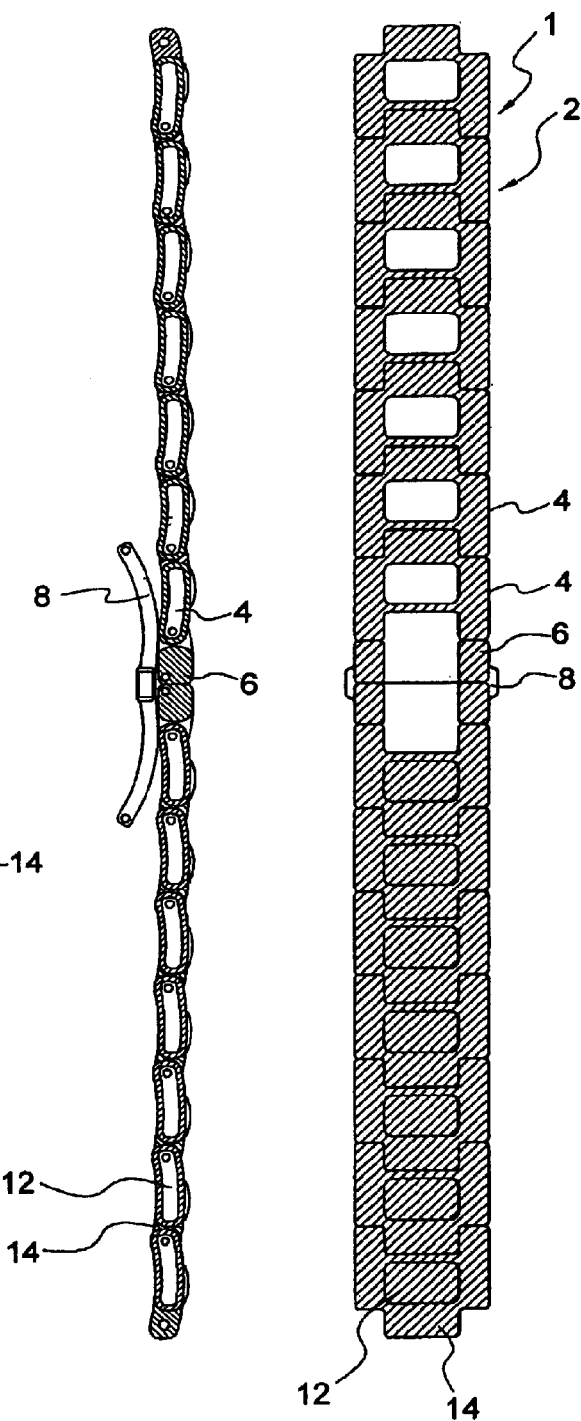
Fig.2b   Fig.2a
Fig.2c
Fig.1b   Fig.1a

SECTION B-B

SECTION A-A

SECTION A-A

SECTION A-A

SECTION A—A

SECTION B-B

SECTION A-A

SECTION A-A

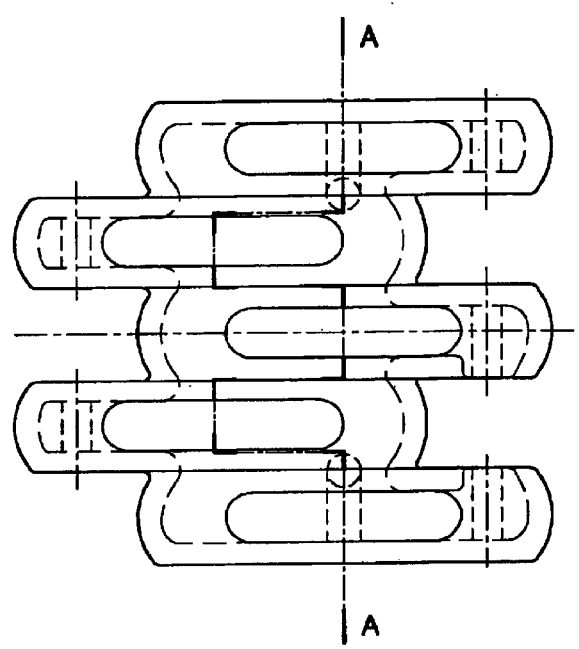
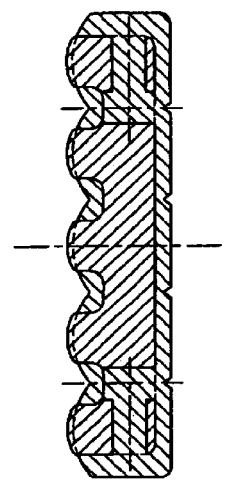
SECTION A-A
Fig.21a      Fig.21b
Fig.21c

SECTION A-A

SECTION A—A

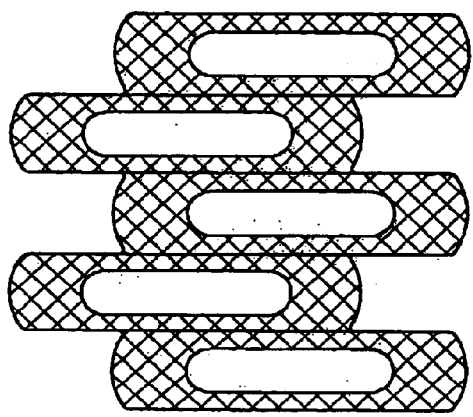
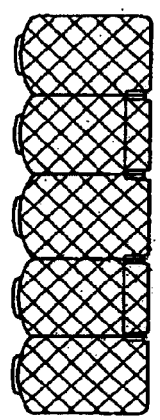
Fig.34a  Fig.34b
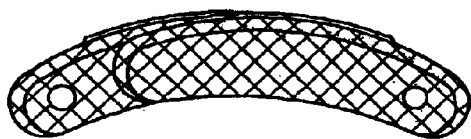
Fig.34c

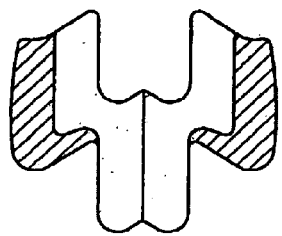
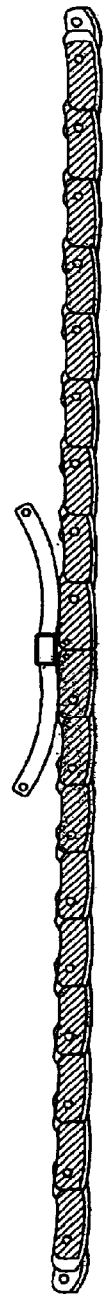
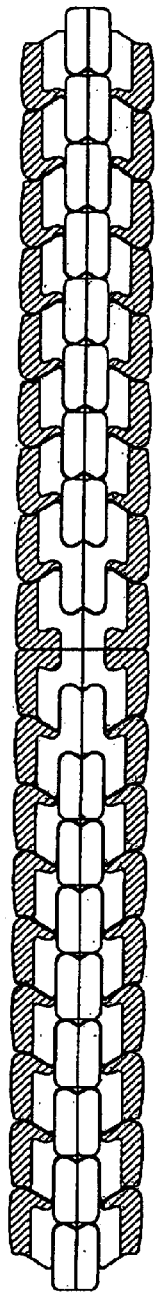
Fig.35d  Fig.35c
Fig.35e
Fig.35b  Fig.35a

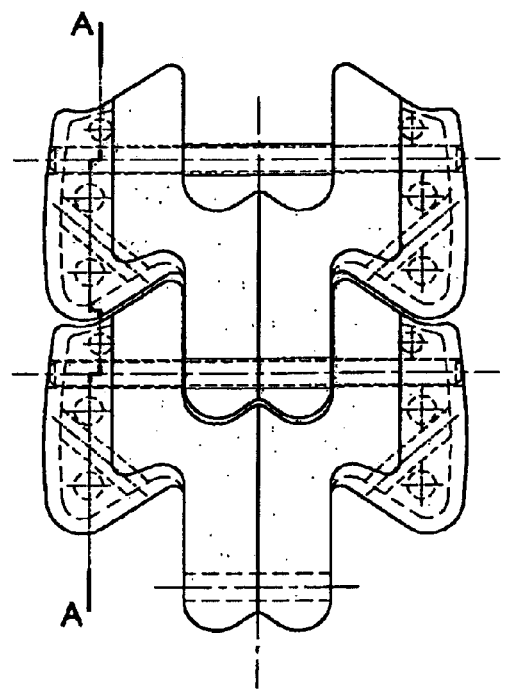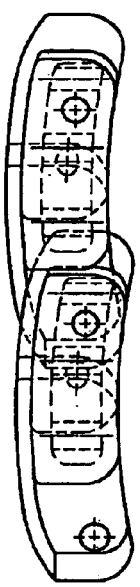
Fig.36a   Fig.36b
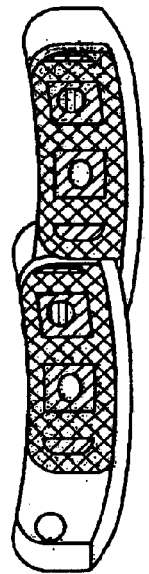
SECTION A-A
Fig.36c

SECTION A-A

SECTION A-A

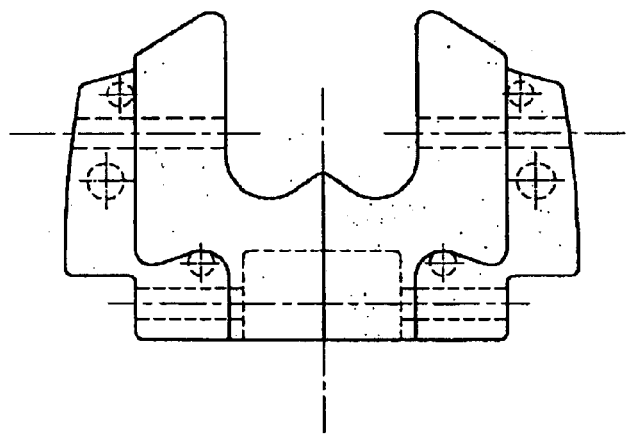
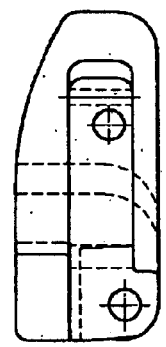
Fig.39a	Fig.39c
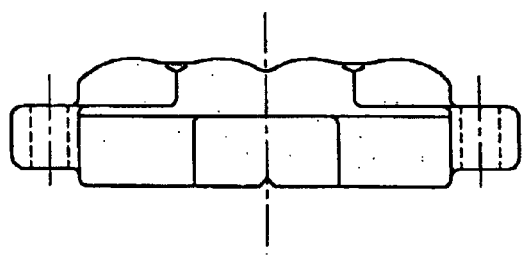
Fig.39b

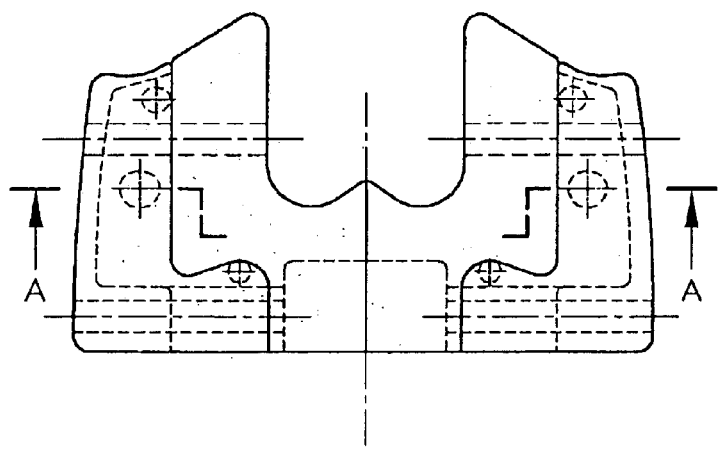
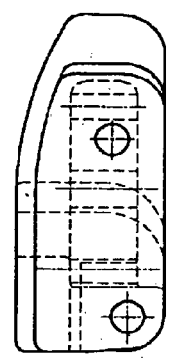
Fig.40a Fig.40c
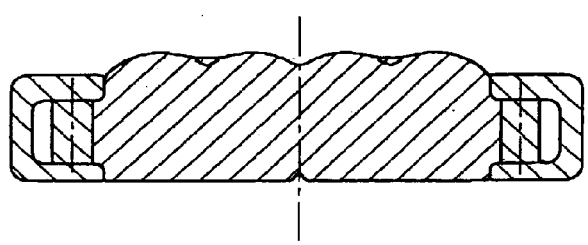
Fig.40b

SECTION A-A

COMPONENTS FOR TIMEPIECE AND METHOD OF MANUFACTURING THEREOF

FIELD OF INVENTION

The present invention relates to components for a timepiece or similar article, and in particular a watchcase, a wristband and a length adjuster for a watchband.

BACKGROUND OF THE INVENTION

There are a variety of watches equipped with different types of watchcases and wristbands. The watchcases or wristbands may be made predominantly of a single material selected from a variety of materials such as metal or stainless steel.

It is an object of the present invention to provide components for a timepiece, which are relatively light, durable and aesthetic, or at least to provide a useful alternative to the public, the components being a watchcase, a band and a length adjuster for the band.

It is a further object of the present invention to produce a timepiece having one or more such components.

It is a further object of the present invention to provide a method of manufacturing such components.

SUMMARY OF THE INVENTION

According to a first aspect of the present invention, there is provided a band for a timepiece (e.g. watch) comprising a plurality of inter-connected links, at least one of the links including a first portion made at least principally of a metallic material and a second portion made at least principally of an injection moldable material and fixedly secured thereto and molded thereover by injection moulding, wherein the injection moldable material is a synthetic rubber material, a natural rubber material, a silicon compound or a polymeric material selected from the group consisting of thermoplastic polyurethane, thermoplastic elastomer, acrylonitrile butadiene styrene, polycarbonate and polyvinyl chloride. The rubber material may be a melt processable rubber. Alternatively, other suitable injection moldable materials may also be used. In a preferred embodiment, the first portion may at least be partially enveloped by the second portion.

Preferably, the links may be inter-connected by at least a pin. However, other suitable means for connecting the links may also be used.

Suitably, protrusions and/or recesses may be provided at at least one end of the links allowing connection of the links with each other. In particular, two adjacent links may be connected at the protrusions and recesses.

Preferably, the links may be provided with a plurality of apertures at the protrusions and recesses, and the pin may connect the links at the apertures. In a preferred embodiment, two links which are adjacent each other are connected together by the pin and may be pivotably movable relative to each other.

Preferably, the metallic material may be stainless steel.

According to a second aspect of the present invention, there is provided a length adjuster for a band as defined in any preceding claim for adjusting the length of the band comprising a first portion made at least principally of a metallic material and a second portion made at least principally of an injection moldable material. The length adjuster may be in the form of a fastener or a buckle. The injection moldable material may be a synthetic rubber material, a natural rubber material, a silicon compound or a polymeric material selected from the group consisting of thermoplastic polyurethane, thermoplastic elastomer, acrylonitrile butadiene styrene, polycarbonate and polyvinyl chloride. The rubber material may be a melt processable rubber. Alternatively, other suitable injection moldable materials may also be used.

The second portion of the length adjuster may be fixedly secured to the first portion of the length adjuster by molded thereover. Alternatively, the first and second portions of the length adjuster may be connected together by snap fitting. Suitably, the metallic material may be stainless steel. The length adjuster may be connectable to the band.

According to a third aspect of the present invention, there is provided a case for a timepiece comprising a first portion made at least principally of a metallic material and a second portion made at least principally of an injection moldable material and fixedly secured thereto and molded thereover by injection moulding.

Preferably, the injection moldable material may be a synthetic rubber material, a natural rubber material, a silicon compound or a polymeric material selected from the group consisting of thermoplastic polyurethane, thermoplastic elastomer, acrylonitrile butadiene styrene, polycarbonate and polyvinyl chloride. However, similar to the band and the length adjuster as described above, other suitable injection moldable materials may also be used. The metallic material may be stainless steel. The case described above may be connectable to a band as described above. The case may also be connectable to a conventional band for a timepiece.

According to a fourth aspect of the present invention, there is provided a timepiece comprising a band, a length adjuster and/or a case as described above. It is to be appreciated that the timepiece having the matching band, length adjuster and case exhibits an unusual appearance in that there are exposed alternate metallic regions and injectionmolded regions.

According to a fifth aspect of the present invention, there is provided a method of manufacturing a component for a timepiece, the component being a band, a length adjuster or a case for the timepiece, the component having a first portion and a second portion, comprising the steps of (i) positioning at least the first portion made at least principally of a metal in a mould of a moulding machine, (ii) injecting an injection moldable material for forming the second portion into a cavity of the mould whereby the second portion envelopes at least part of the first portion, wherein the injection moldable material is a synthetic rubber material, a natural rubber material, a silicon compound or a polymeric material selected from the group consisting of thermoplastic polyurethane, thermoplastic elastomer, acrylonitrile butadiene styrene, polycarbonate and polyvinyl chloride, (iii) allowing the second portion to solidify whereby the first portion and second solidified portion together form the component, and (iv) releasing the component from the mould. The rubber material may be a melt processable rubber. Alternatively, other suitable injection moldable materials may also be used. The timepiece may comprise a plurality of interconnected components.

Preferably, the component may be made at least principally of stainless steel.

Suitably, the plurality of components may be connected by pins.

In a preferred embodiment, after the step (iv), at least part of the first portion of the component is exposed to the environment, and at least part of the first portion of the component may be protected by the injection-molded material.

In a preferred embodiment, the first portion of the component may be formed by cutting a blank from a plate or slab made at least principally of the metallic material, and pressing the blank. The blank may suitably be cut from the plate or slab by a punching machine. The pressed blank may be pressed by a pressing machine. The pressed blank may be processed at least a second time by the punching machine.

The method may also comprise a step of connecting a plurality of the components. For example, a plurality of the links may be connected to form a band which may be connected with the length adjuster and the case to form a watch. The finished timepiece will have a plurality of parts of the first portions exposed to the environment. In other words, at least part of the first portions may be protected by the second portions. In the event that the first portions are made of stainless steel having a metallic and/or shiny appearance, the exposed surface of the first portions and the second portions together produce an unusual aesthetic appearance.

BRIEF DESCRIPTION OF THE DRAWINGS

Some embodiments of the present invention will now be described by way of example only, with reference to the accompanying drawings, in which:

FIG. 1a is a top view showing a band for a timepiece according to a first embodiment of the present invention, generally formed of a plurality of first and second links;

FIG. 1b is a side view of the band shown in FIG. 1a;

FIG. 2a is a top view of one of the first links shown in FIG. 1a;

FIG. 2b is a side view of the first link shown in FIG. 2a;

FIG. 2c is an end view of the first link shown in FIG. 2a;

FIG. 3b is a side view of the two first links shown in FIG. 3a, FIG. 3c is a cross-section view of the two first links taken along line B—B of FIG. 3a;

FIG. 3d is a cross-section view of the two first links taken along line A—A of FIG. 3a;

FIG. 4b is a cross-section view of the interior portion of the first link taken along line A—A of FIG. 4a;

FIG. 4c is a side view of the interior of the first link shown in FIG. 4a;

FIG. 5a is an alternative top view of the first link shown in FIG. 2a incorporating the interior portion shown in FIG. 4a;

FIG. 5b is a cross-section view of the first link taken along line A—A of FIG. 5a;

FIG. 5c is a side view of the first link shown in FIG. 5a;

FIG. 6a is a top view of an interior portion of one of the second links of the band shown in FIG. 1a;

FIG. 6b is an end view of the interior portion of the second link shown in FIG. 6a;

FIG. 6c is a side view of the interior portion of the second link shown in FIG. 6a;

FIG. 7a is a top view of the second link incorporating the interior portion shown in FIG. 6a;

FIG. 7b is a cross-section view of the second link taken along line A—A of FIG. 7a;

FIG. 7c is a side view of the second link shown in FIG. 7a;

FIG. 8 is a side view of a pin in the band shown in FIG. 1a;

FIG. 17b is a side view of the finished first link shown in FIG. 17a;

FIG. 17c is an end view of the finished first link shown in FIG. 17a;

FIG. 18b is a side view of the band shown in FIG. 18a;

FIG. 18c is a top view of one of the third links shown in FIG. 18a;

FIG. 19b is a side view of the two third links shown in FIG. 19a, FIG. 19c is a cross-section view of the third links taken along line B—B of FIG. 19a;

FIG. 19d is a cross-section view of the two third links taken along line A—A of FIG. 19a;

FIG. 20b is a cross-section view of the interior portion of the third link taken along line A—A of FIG. 20a;

FIG. 21a is an alternative top view of the third link shown in FIG. 18c incorporating the interior portion shown in FIG. 20a;

FIG. 21b is a cross-section view of the third link taken along line A—A of FIG. 21a;

FIG. 21c is a side view of the third link shown in FIG. 21a;

FIG. 22a is a top view of an interior portion of one of the fourth links of the band shown in FIG. 18a;

FIG. 22b is an end view of the interior portion of the fourth link shown in FIG. 22a;

FIG. 22c is a side view of the interior portion of the fourth link shown in FIG. 22a;

FIG. 23a is a top view of the fourth link incorporating the interior portion shown in FIG. 22a;

FIG. 23b is a cross-section view of the fourth link taken along line A—A of FIG. 23a;

FIG. 23c is a side view of the fourth link shown in FIG. 23a;

FIGS. 24a to 24d are side views of two pins which may be used in the band shown in FIG. 18a;

FIG. 34a is a top view of the finished third link produced from the steps illustrated in FIGS. 30a to 33b;

FIG. 34b is an end view of the finished third link shown in FIG. 34a;

FIG. 34c is a side view of the finished third link shown in FIG. 34a;

FIG. 35a is a top view showing a band for a timepiece according to a third embodiment of the present invention, generally formed of a plurality of fifth, sixth and seventh links;

FIG. 35b is a side view of the band shown in FIG. 35a;

FIG. 35c is a top view of one of the fifth links shown in FIG. 35a;

FIG. 35d is a side view of the fifth link shown in FIG. 35c;

FIG. 35e is an end view of the fifth link shown in FIG. 35c;

FIG. 36a is a top view of two of the fifth links shown in FIG. 35a connected with each other, FIG. 36b is a side view of the two fifth links shown in FIG. 36a;

FIG. 36c is a cross-section view of the two fifth links taken along line A—A of FIG. 36a;

FIG. 37b is a side view of the interior portion of the fifth link shown in FIG. 37a;

FIG. 37c is a cross-section view of the interior portion of the fifth link taken along line A—A of FIG. 37a;

FIG. 38a is an alternative top view of the fifth link shown in FIG. 35c incorporating the interior portion shown in FIG. 37a;

FIG. 38b is a side view of the fifth link shown in FIG. 38a;

FIG. 38c is a cross-section view of the fifth link taken along line A—A of FIG. 38a;

FIG. 39a is a top view of an interior portion of one of the sixth links of the band shown in FIG. 35a;

FIG. 39b is an end view of the interior portion of the sixth link shown in FIG. 39a;

FIG. 39c is a side view of the interior portion of the sixth link shown in FIG. 39a;

FIG. 40a is a top view of the sixth link incorporating the interior portion shown in FIG. 39a;

FIG. 40b is a cross-section view of the sixth link taken along line A—A of FIG. 40a;

FIG. 40c is a side view of the sixth link shown in FIG. 40a;

FIG. 41a is a top view of one of the seventh links of the band shown in FIG. 35a;

FIG. 41b is a side view of the seventh link shown in FIG. 41a;

FIG. 41c is an end view of the seventh link shown in FIG. 41a;

FIG. 42 is a side view of a pin in the band shown in FIG. 35a;

FIG. 51b is an end view of the finished fifth link of FIG. 51a;

FIG. 51c is a side view of the finished fifth link shown in FIG. 51a;

DETAILED DESCRIPTION OF PREFERRED EMBODIMENTS

Figure 3A:
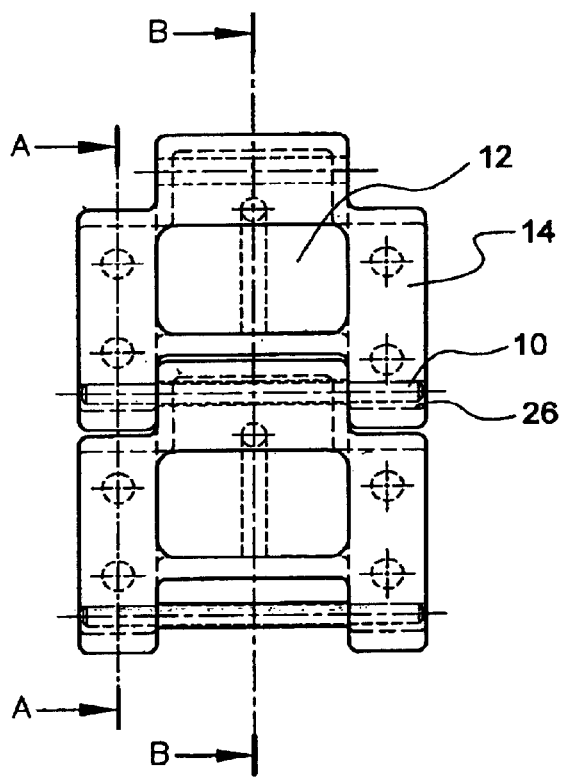
FIG. 3a is a top view of two of the first links shown in FIG. 1a connected with each other.

A first embodiment of a component for a watch and a method of manufacture thereof according to the present invention are shown in FIGS. 1a to 17c. The component in this embodiment is a wristband and is generally designated as 1. Referring firstly to FIG. 1a, a body 2 of the wristband 1 comprises a plurality of link members 4, 6 and a fastener 8. The fastener 8 may be used for adjusting the length of the wristband 1, thus enabling a watch (not shown) to which the wristband 1 is engaged to be worn by a user. Two types of link members 4, 6 are used in this embodiment. The first-type of the link members 4, which is shown in FIGS. 2a to 2c, constitutes the majority of the body 2 of the wristband 1. The second-type of link members 6 are arranged on opposite sides of and immediately adjacent to the fastener 8.

Figure 8:
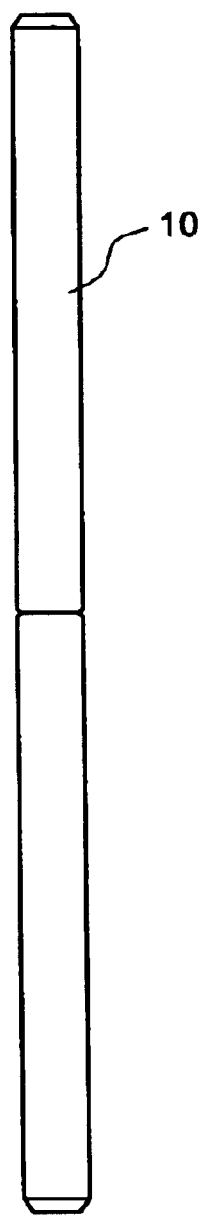

The link members 4, 6 and the fastener 8 are connected together by connecting means, such as pins 10 as shown in FIG. 8.

Figure 3B:
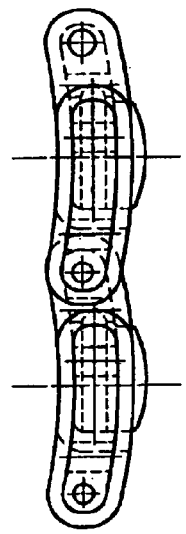
Figure 3C:
Figure 3D:

FIGS. 2a to 2c show, respectively, the top, side and end views of the first-type link member 4. FIGS. 3a and 3b show, respectively, the top and side views of two of the first-type link members 4 connected together. FIGS. 3c and 3d show the cross-section views of the two first-type link members 4 taken along lines B—B and A—A of FIG. 3a respectively. The first-type link members 4 are connected by the pins 10 whereby each of these first-type link members 4 may pivotably move relative to the adjacent link member (4 and/or 6).

Figure 4A:
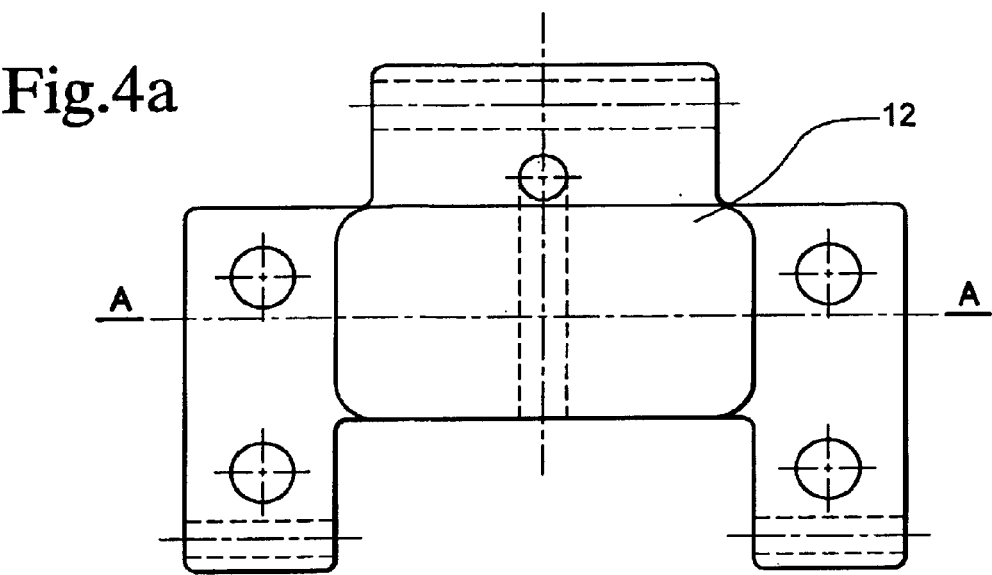
FIG. 4a is a top view of an interior portion of the first link shown in FIG. 2b.
Figure 4B:
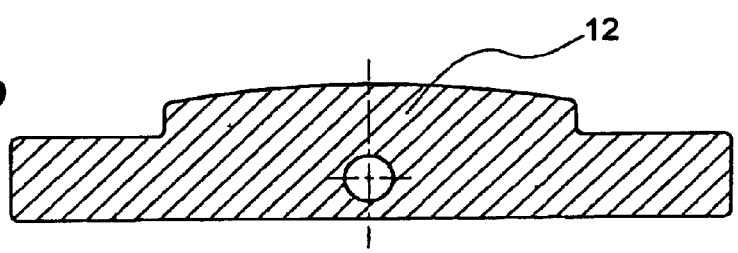
Figure 4C:
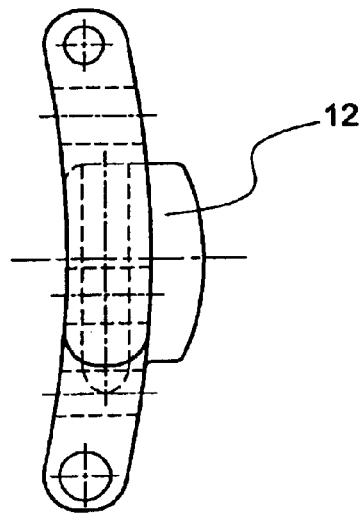
Figure 5A:
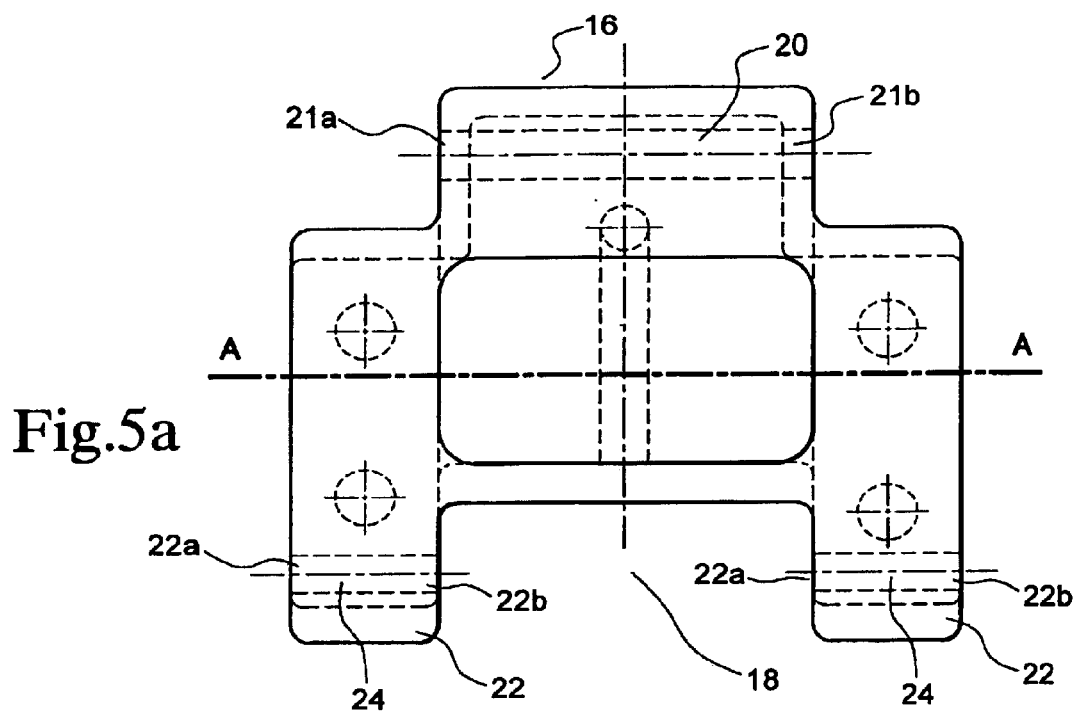
Figure 5B:
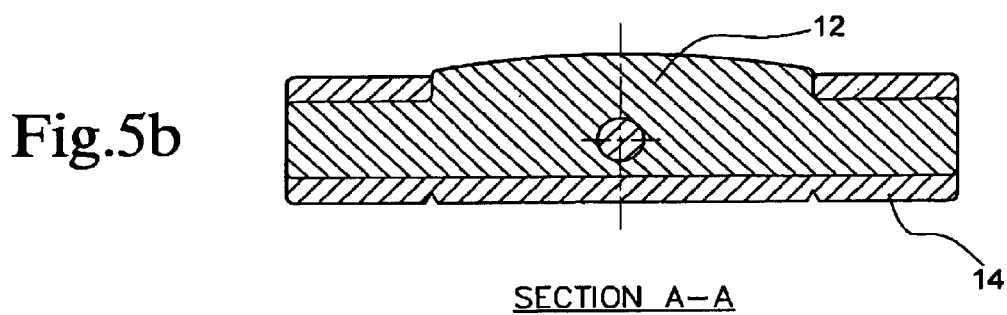
Figure 5C:
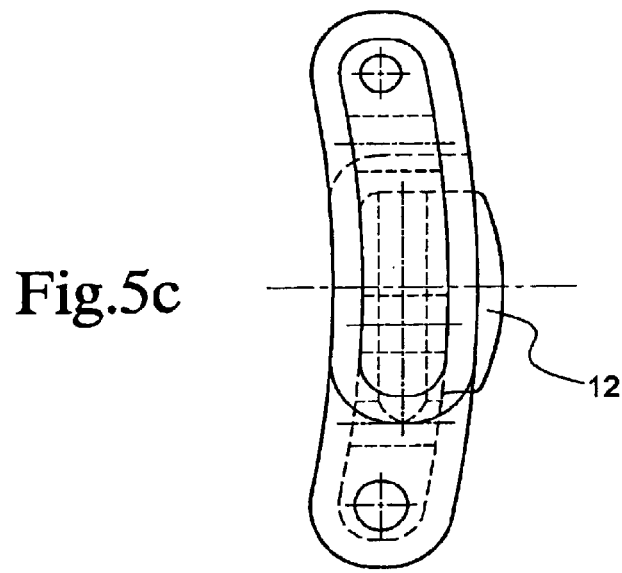

Referring to FIGS. 1a to 3d, each link member 4 generally 5 comprises an inner (or interior) portion 12 (or link element) and an outer (or exterior) portion 14. FIG. 4a shows a top view of the inner portion 12 of the first-type link member 4. FIG. 4b shows a cross section view of the inner portion of the link member 4 and FIG. 4c shows a side view of the inner portion of the same link member 4. The inner portion 12 is made principally of stainless steel although other suitable metallic material may also be used. FIGS. 5a to 5c show the first-type link member 4 including both the inner portion 12 shown in FIG. 4a and an outer portion 14. The outer portion 14 is made of an injection moldable material and in particular polymeric material, e.g. thermoplastic polyurethane, thermoplastic elastomer, acrylonitrile butadiene styrene, polycarbonate or polyvinyl chloride. Alternatively, the injection moldable material may be a natural or synthetic rubber material, or a silicon compound.

Turning specifically to FIG. 5a, a tongue-shaped protrusion 16 is provided at one end of the link member 4 and a recess 18 sandwiched by two legs 22 is provided at the opposite end thereof whereby the protrusion 16 of the link member 4 is engageable with a recess 18 of its adjacent link member 4 arranged therebelow. Such an arrangement is shown more clearly in FIGS. 3a to 3d. A channel 20 with two apertures 21a, 21b at its ends thereof is provided within the protrusion 16 and arranged from left to right thereof and such is illustrated by the dashed lines at numeral 20. A further channel 24, also with two apertures 22a, 22b at its ends (and such is illustrated by the dashed lines at numerals 24), is provided within each of the legs 22, whereby when the protrusion 16 of the link member 4 is received within the recess 18 of its adjacent link member 4, the channel 20 of the protrusion 16 of the link member 4 and the channels 24 of the legs 22 of its adjacent link member 4 are aligned to form a continuous channel 26 through which the pin 10 may be inserted. Referring to FIGS. 3a to 3d, the pin 10 serves as means for connecting two adjacent link members 4. The pin 10 is sized and shaped to fit tightly in the channel 26.

Figure 6A:
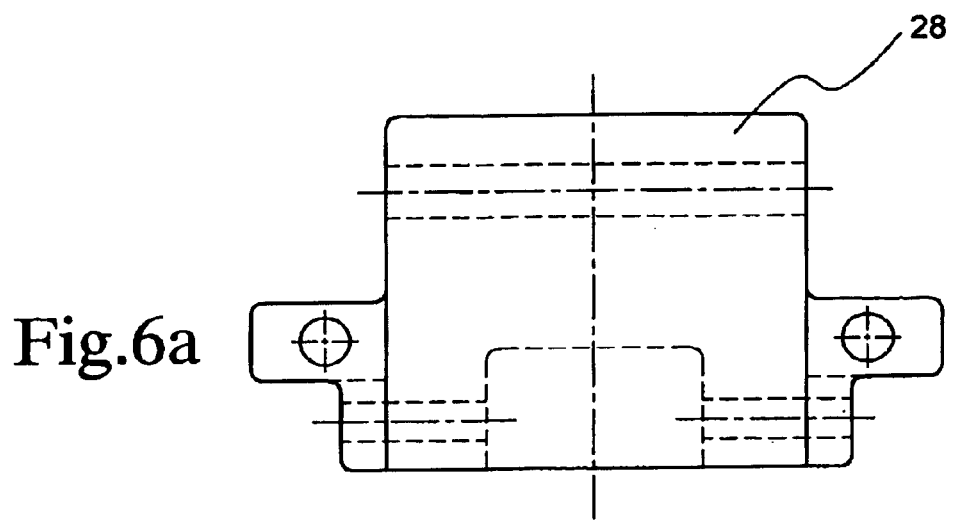
Figure 6B:
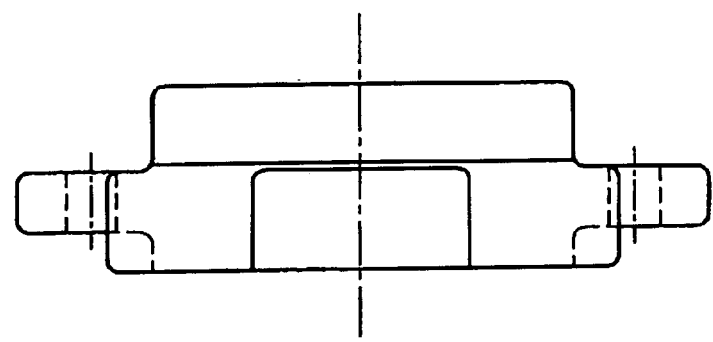
Figure 6C:
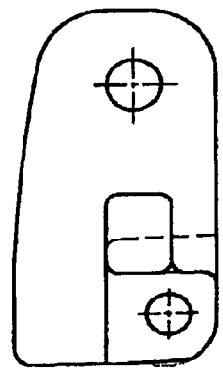
Figure 7A:
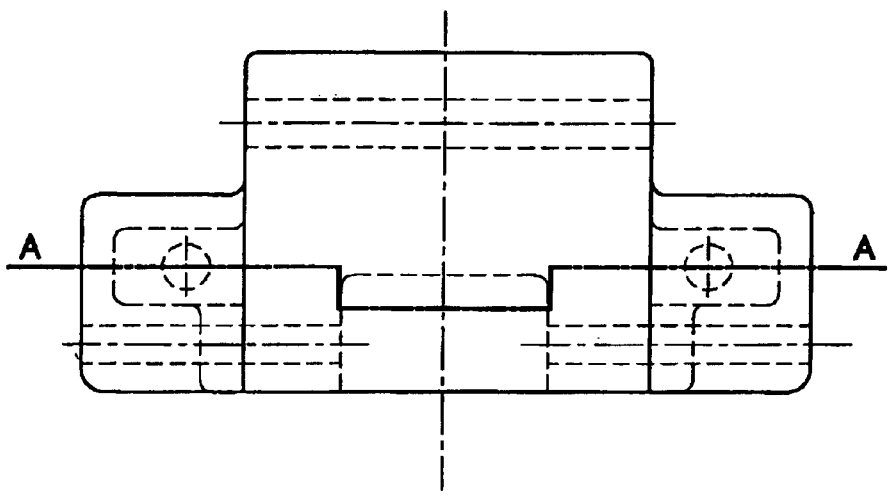
Figure 7B:
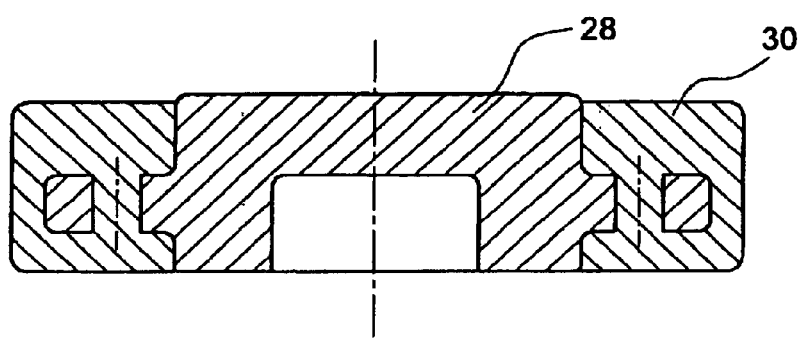
Figure 7C:
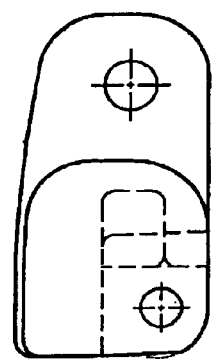
Figure 9A:
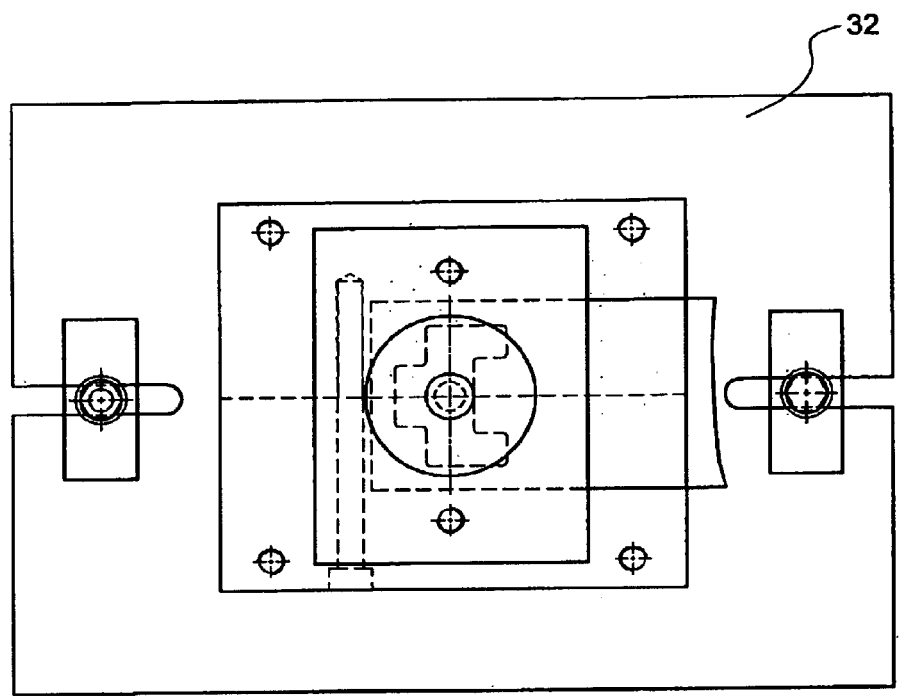
FIGS. 9a to 11b show a series of steps for producing the interior portion of the first link shown in FIGS. 4a to 4c.
Figure 9B:
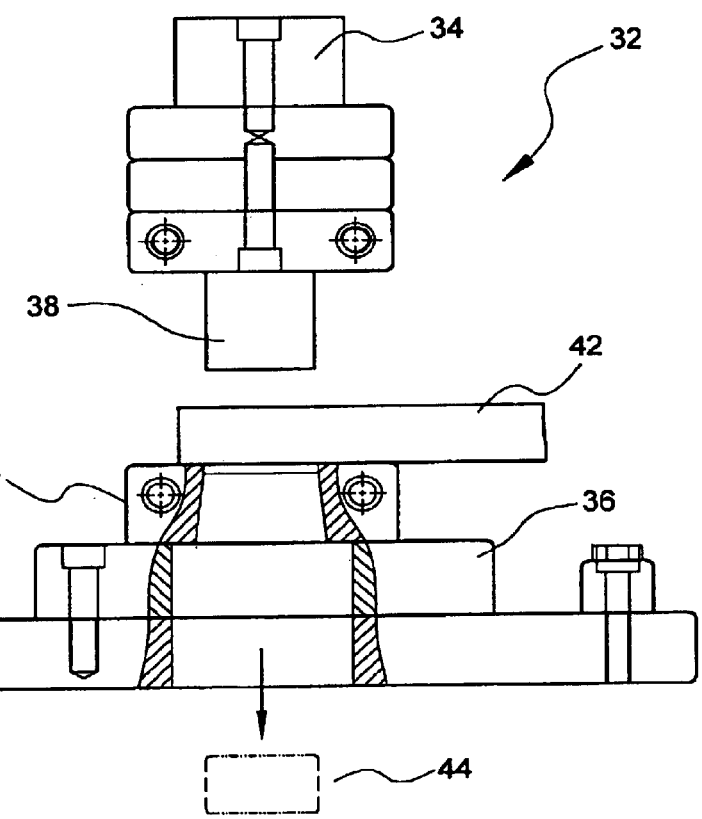

FIG. 6a shows a top view of an inner portion 28 of the second-type link member 6 used in the first embodiment. FIGS. 6b and 6c are respectively end view and side view of the inner portion 28. FIG. 7a shows a top view of the second-type link member 6 incorporating the inner portion 28 and an outer portion 30. Similar to the first-type link members 4, the inner portion 28 of the second-type link member 6 is made principally of stainless steel and the outer portion 30 is made of an injection moldable material FIGS. 9a to 11b show the process of manufacturing the inner portion 12 of the first-type link member 4. The process firstly involves the use of a conventional cutting/punching machine. FIGS. 9a and 9b show a top view and a side view respectively of such a punching machine 32. The punching machine 32 comprises a presser 34 and a station 36. The presser 34 includes an upper mould 38 while the station 36 includes a lower mould 40. During the cutting process, a steel plate 42 is firstly inserted between the upper and lower moulds 38, 40 after which the presser 34 is pressed down causing the upper mould 38 to stamp onto the lower mould 40 through the steel plate 42. A steel blank 44 is thereby cut out and removed from the steel plate 42. The steel blank 44 thus produced has a shape roughly corresponding to the overall shape of the inner portion 12 of the link member 4.

Figure 10A:
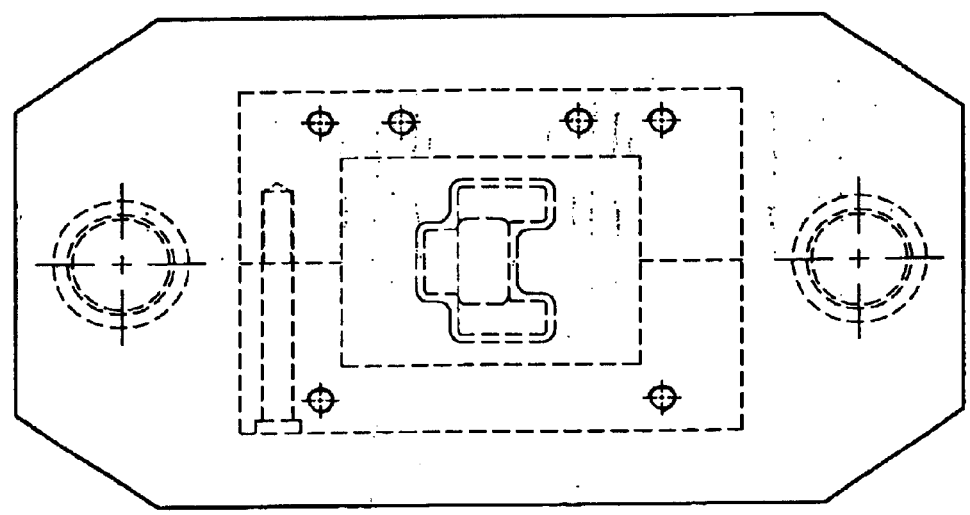
Figure 10B:
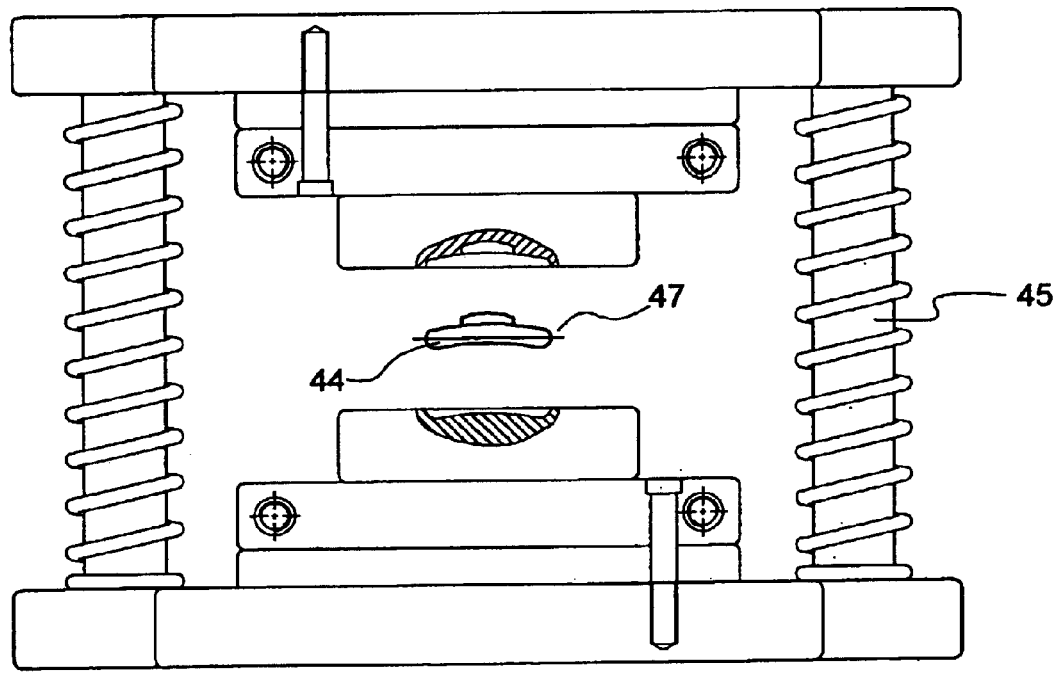
Figure 11A:
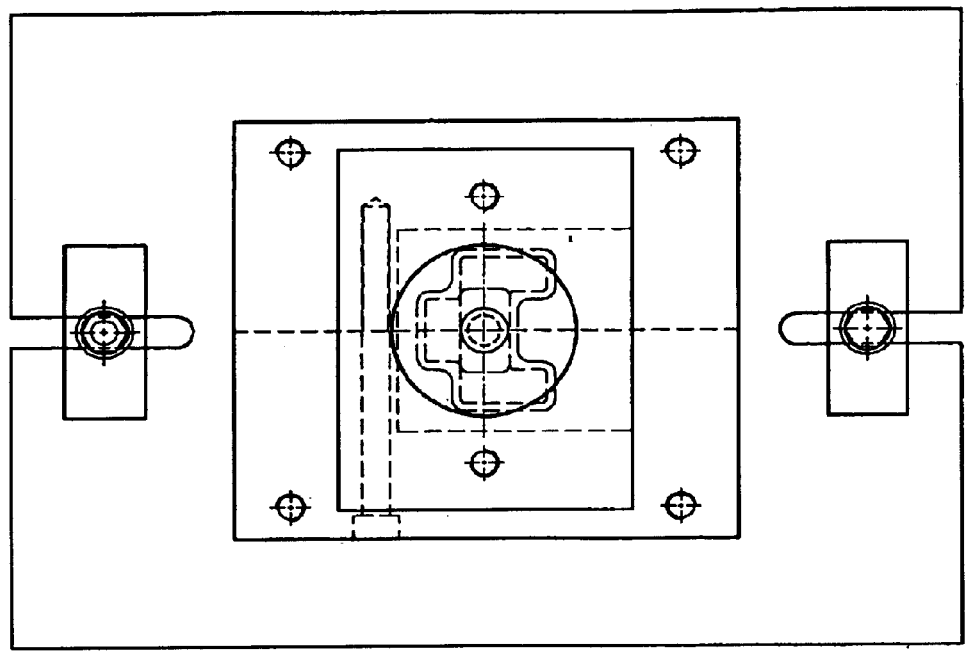
Figure 11B:
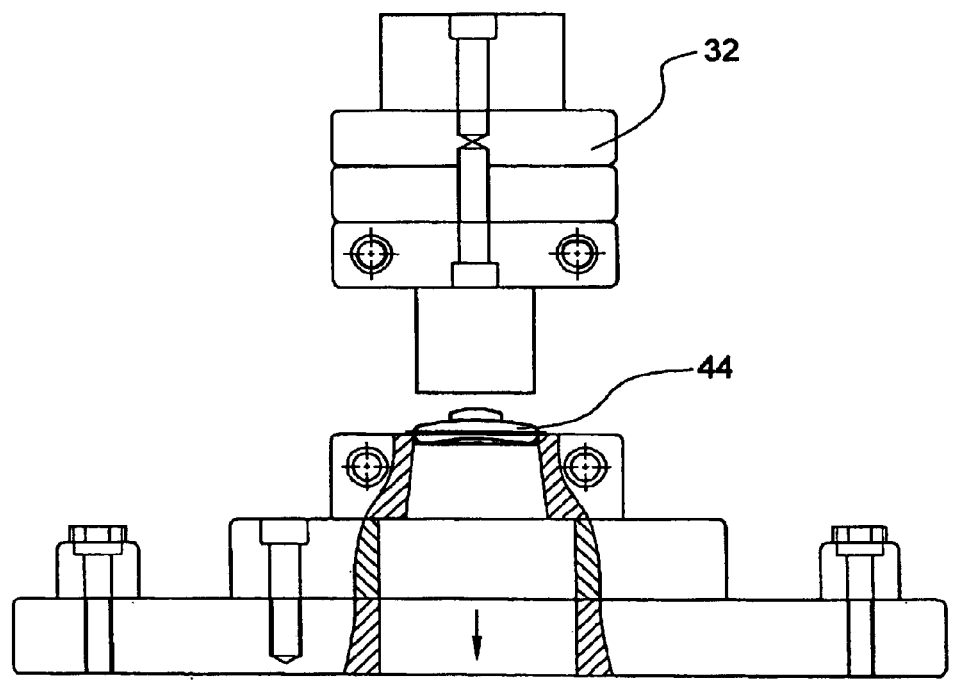

The steel blank 44 is then subject to a pressing step which is shown in FIGS. 10a and 10b. In this step, the steel blank 44 is pressed and deformed by a conventional pressing machine 45 to a desired shape and curvature. If the shape of the resultant inner portion is relatively complicated, it may be necessary to press the steel blank 44 more than once, to ensure that the required shape is formed.

Figure 12A:
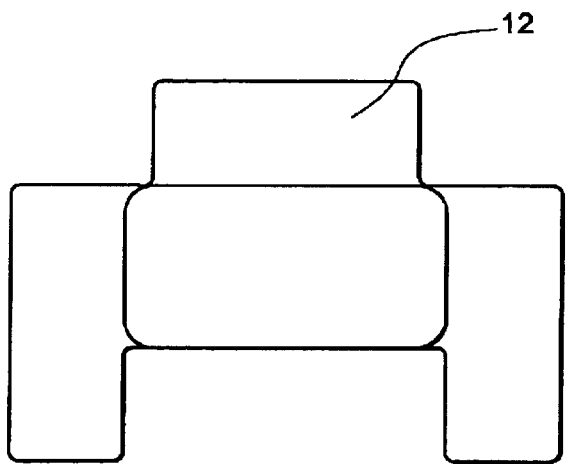
FIGS. 12a to 12c are different views of the interior portion of the first link produced from the steps illustrated in FIGS. 9a to 11b.
Figure 12B:
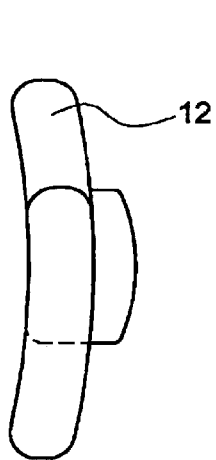
Figure 12C:
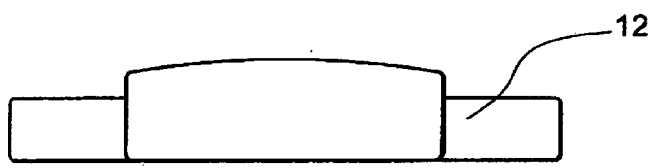

Usually, burr 47 will be formed after the pressing step. In this case, the pressed blank 44 will then be again processed by the punching machine 32 (see FIGS. 11a and 11b) to cut off the burr 47. An inner portion 12 of the link member 4 is produced, as shown in dashed line in FIG. 11b. The inner portion 12 produced after the above steps will possess the required shape, dimension and surface. In FIG. 12a, the top view of the inner portion 12 of the link member 4 produced by the above steps is shown. FIGS. 12b and 12c show a side view and an end view of the same inner portion 12.

Figure 13A:
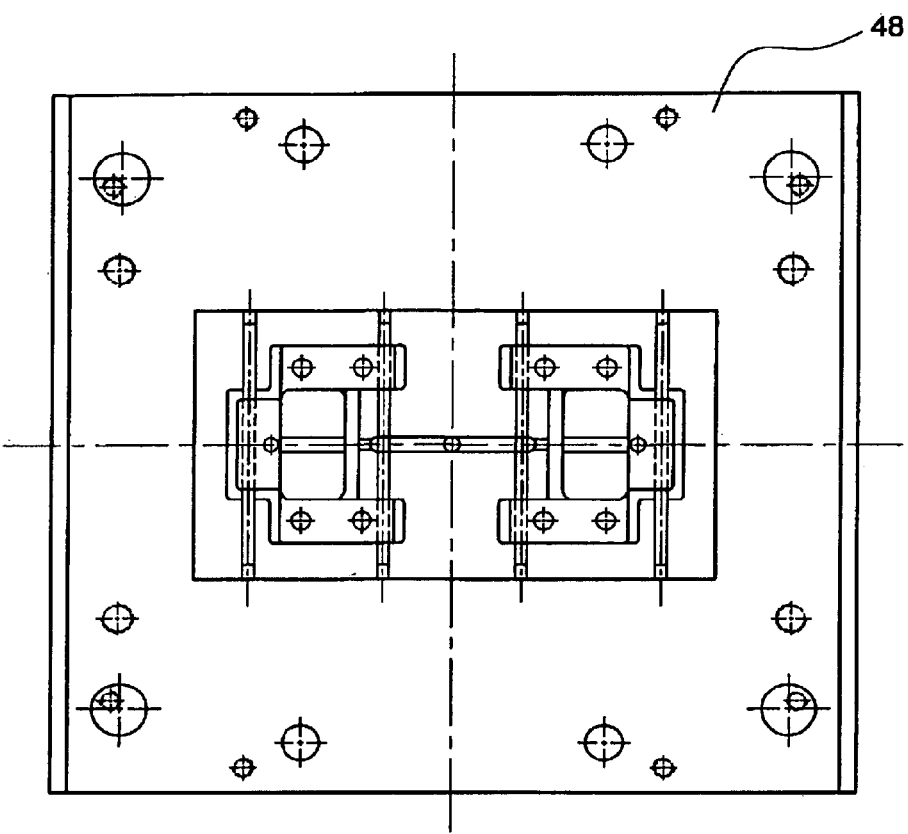
FIGS. 13a to 16b show a series of steps for moulding an exterior portion onto the interior portion of the first link shown in FIGS. 12a to 12c.
Figure 13B:
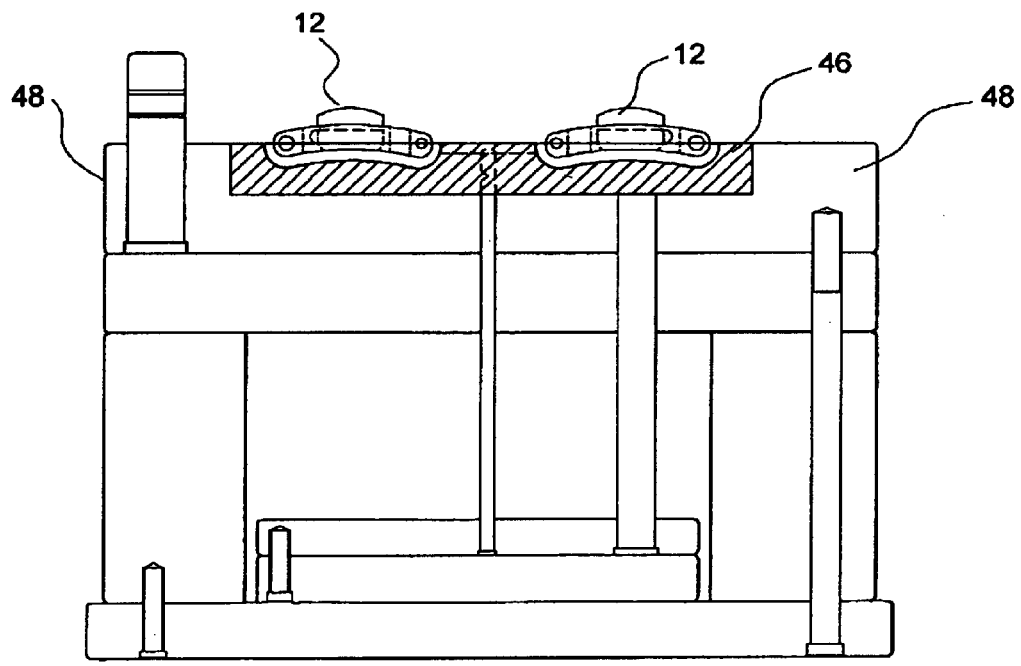
Figure 14A:
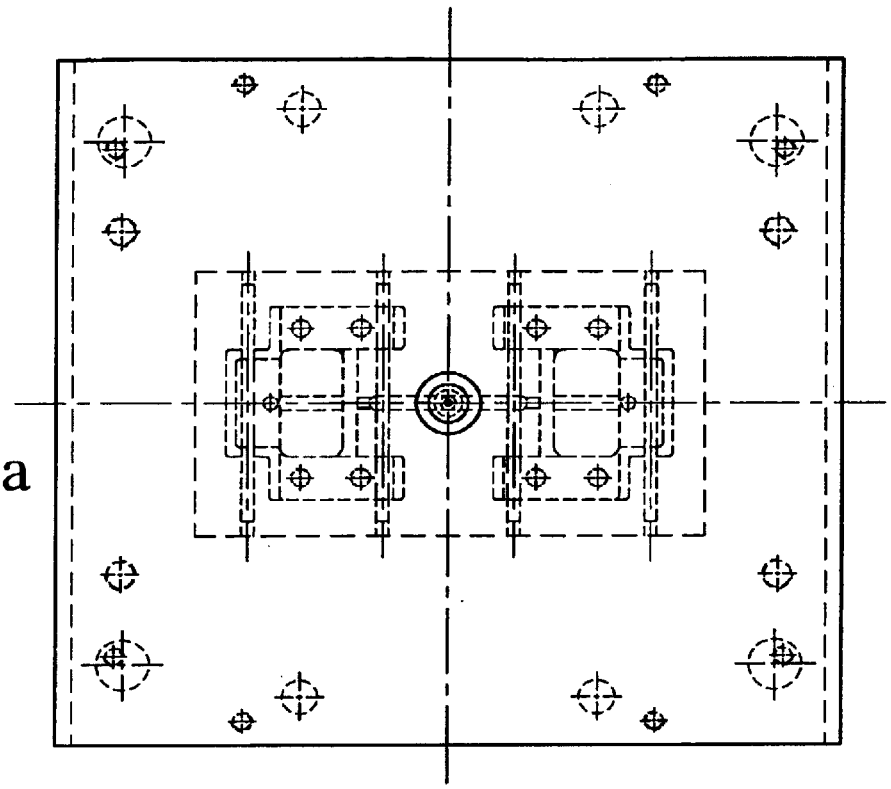
Figure 14B:
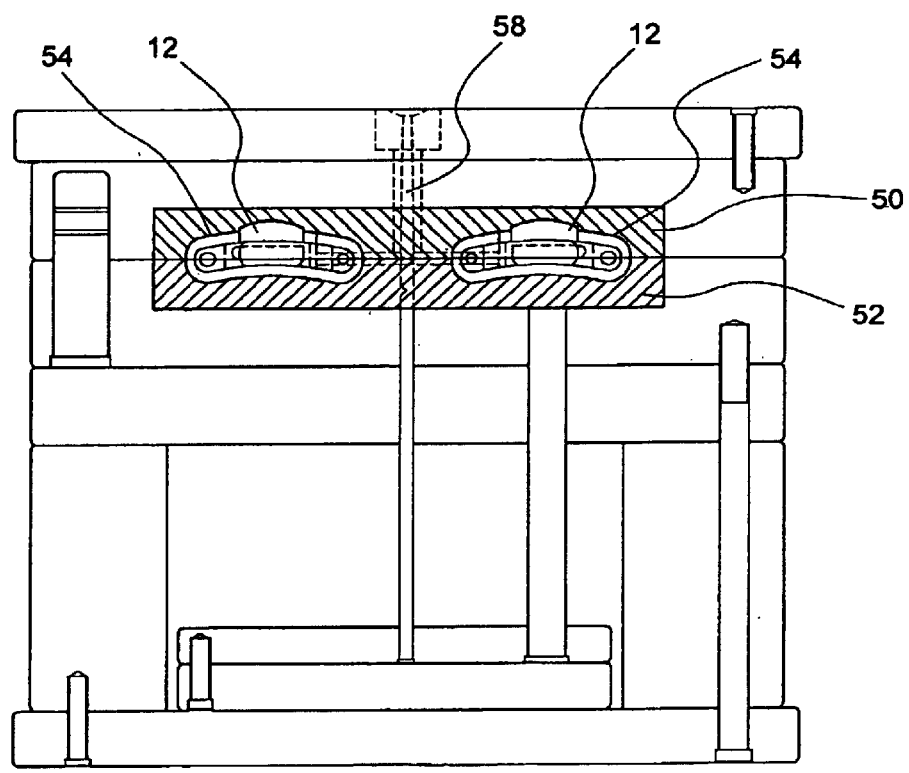
Figure 15A:
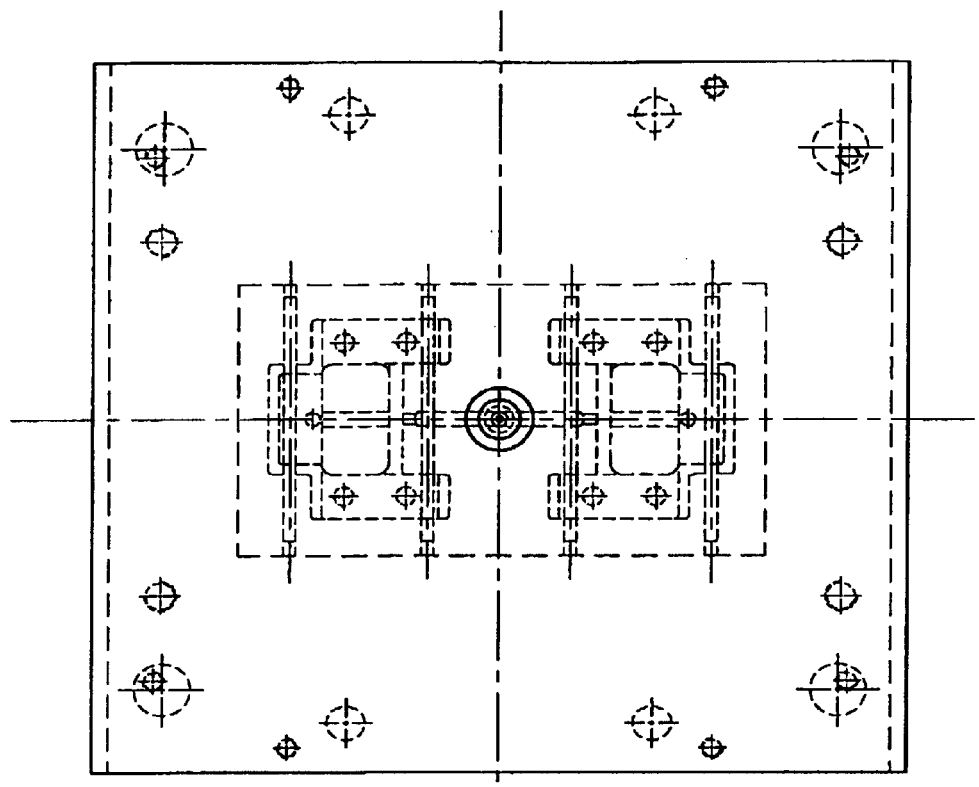
Figure 15B:
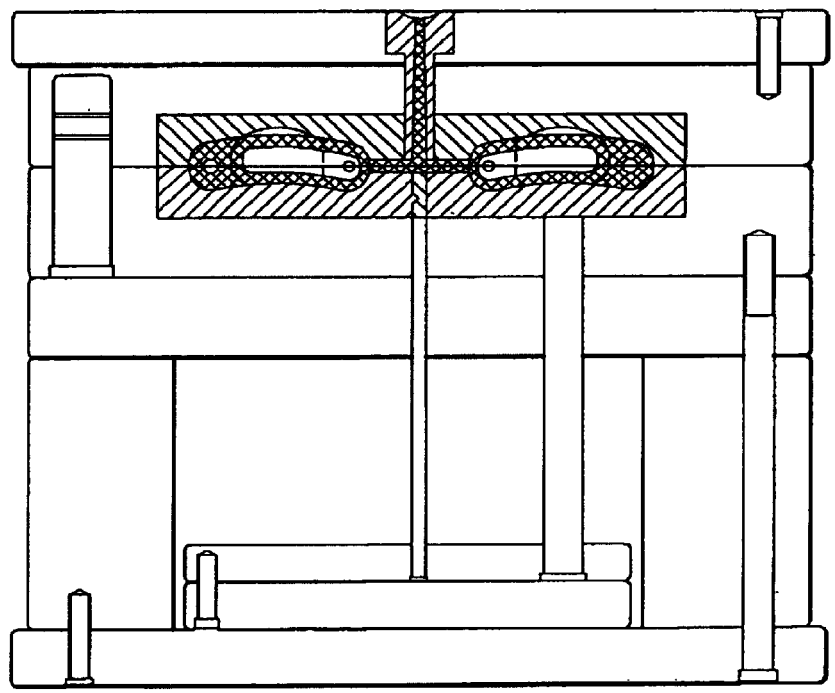
Figure 16A:
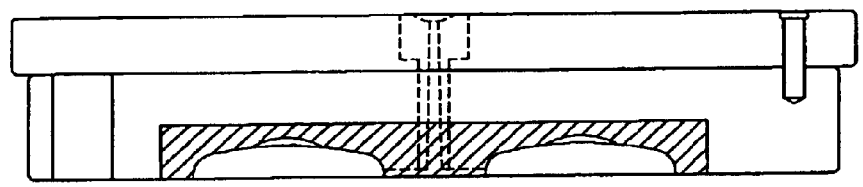
Figure 16B:
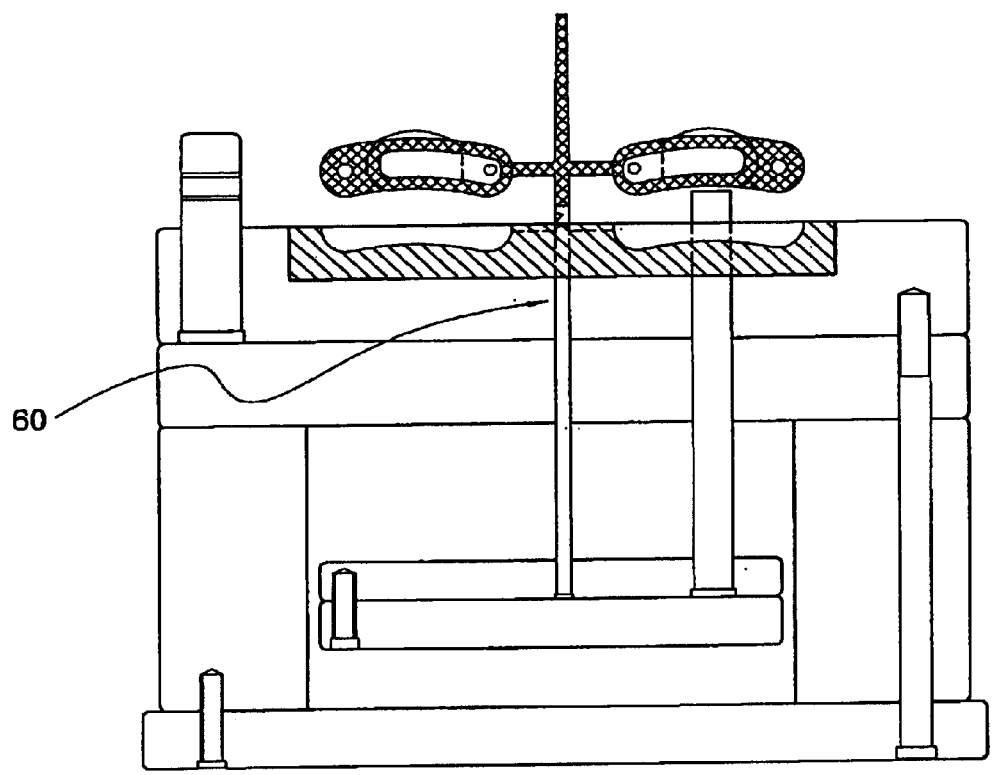
Figure 17B:
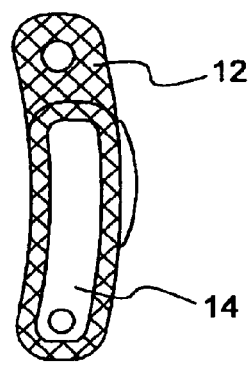
Figure 17A:
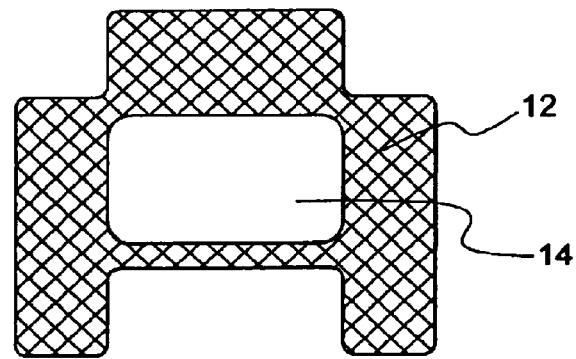
FIG. 17a is a top view of the finished first link produced from the steps illustrated in FIGS. 13a to 16b.
Figure 17C:
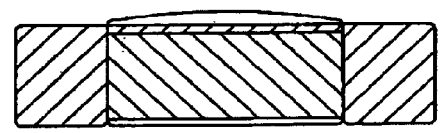
Figure 18D:
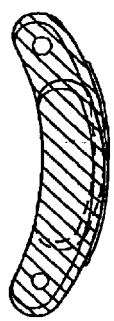
FIG. 18d is a side view of the third link shown in FIG. 18c.
Figure 18C:
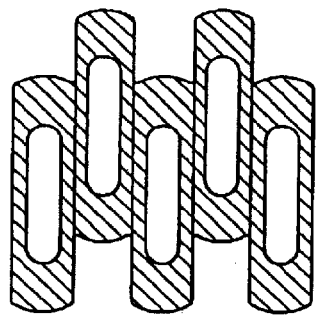
Figure 18B:
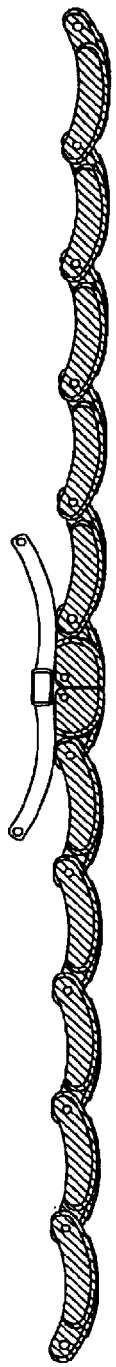
Figure 18A:
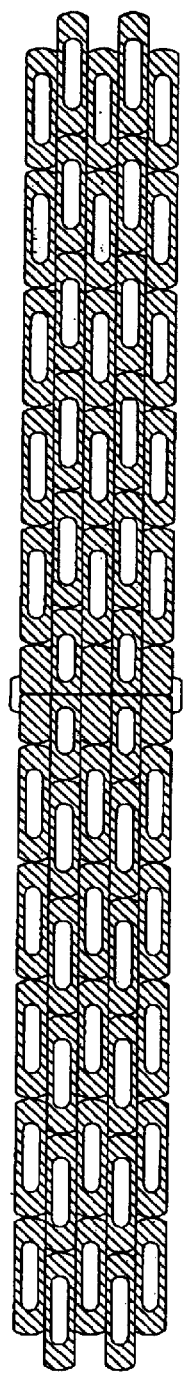
FIG. 18a is a top view showing a band for a timepiece according to a second embodiment of the present invention, generally formed of a plurality of third and fourth links.
Figure 19B:
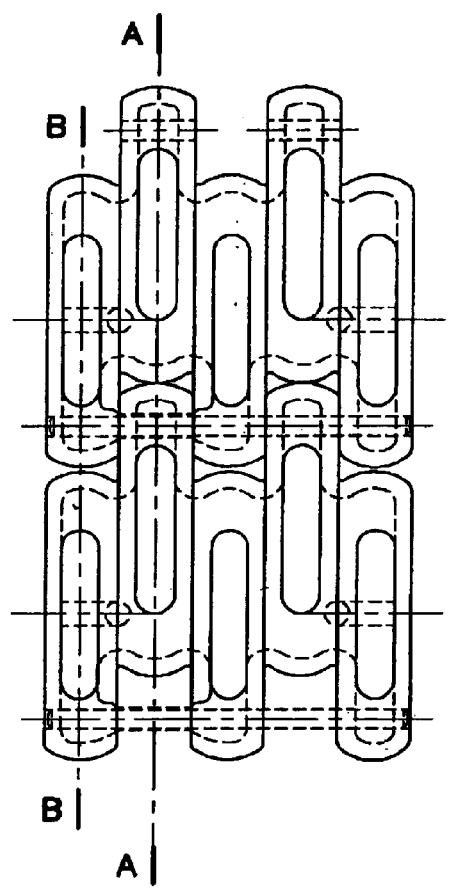
Figure 19A:
FIG. 19a is a top view of two of the third links shown in FIG. 18a connected with each other.
Figure 19C:
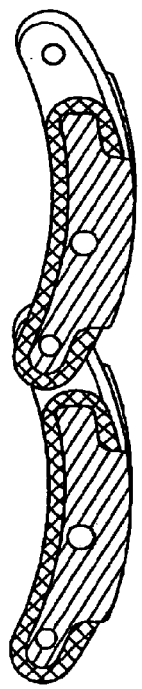
Figure 19D:
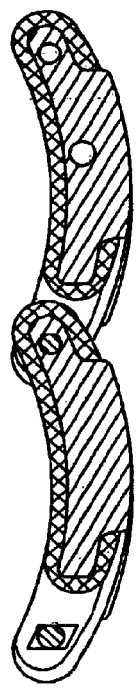
Figure 20A:
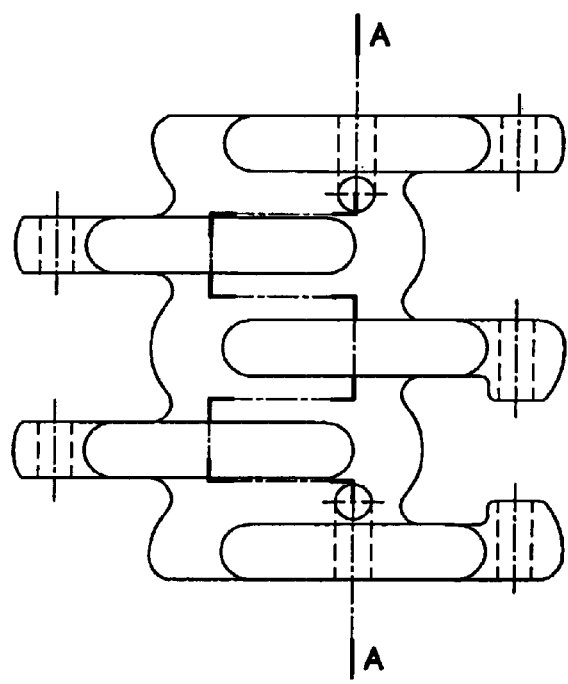
FIG. 20a is a top view of an interior portion of the third link shown in FIG. 18c.
Figure 20B:
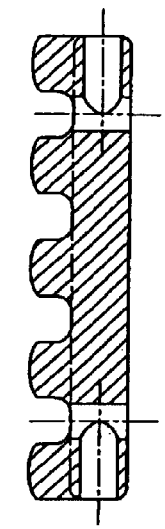
Figure 20C:
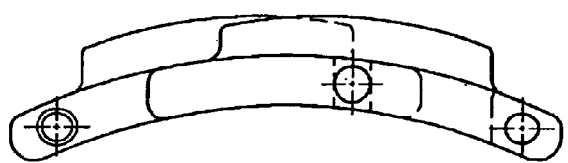
FIG. 20c is a side view of the interior portion of the third link shown in FIG. 18c.
Figure 22A:
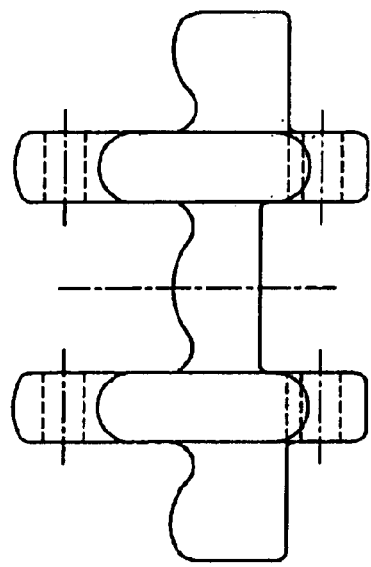
Figure 22B:
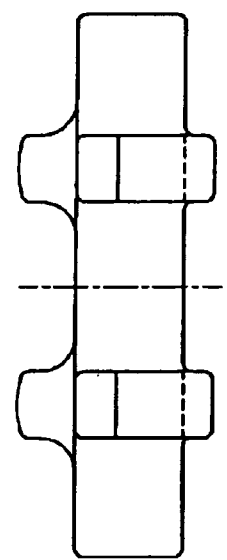
Figure 22C:
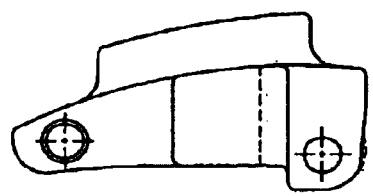
Figure 23A:
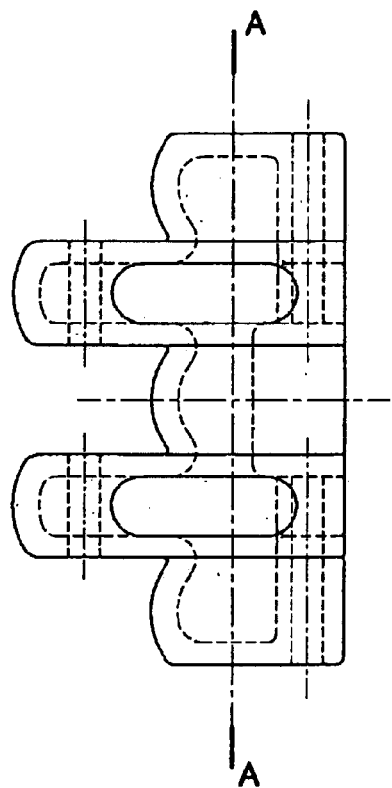
Figure 23B:
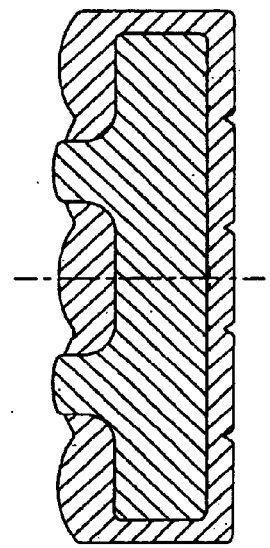
Figure 23C:
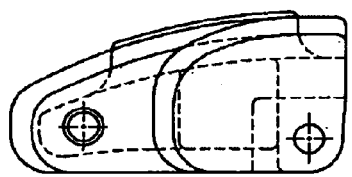
Figure 24A:
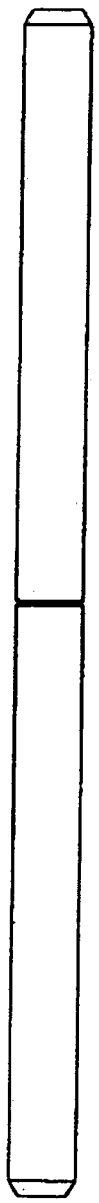
Figure 24B:
Figure 25A:
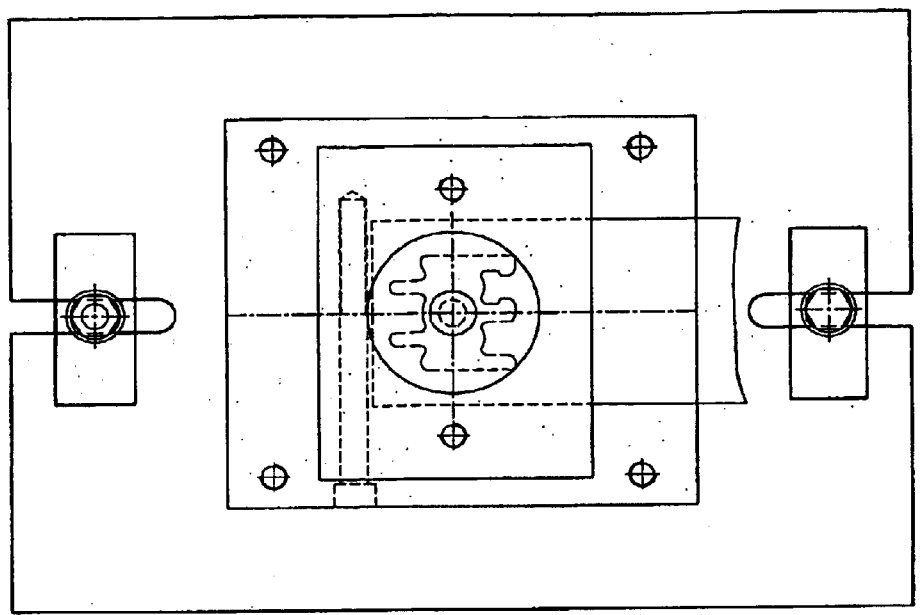
FIGS. 25a to 28b show a series of steps for producing the interior portion of the third link shown in FIGS. 20a to 20c.
Figure 25B:
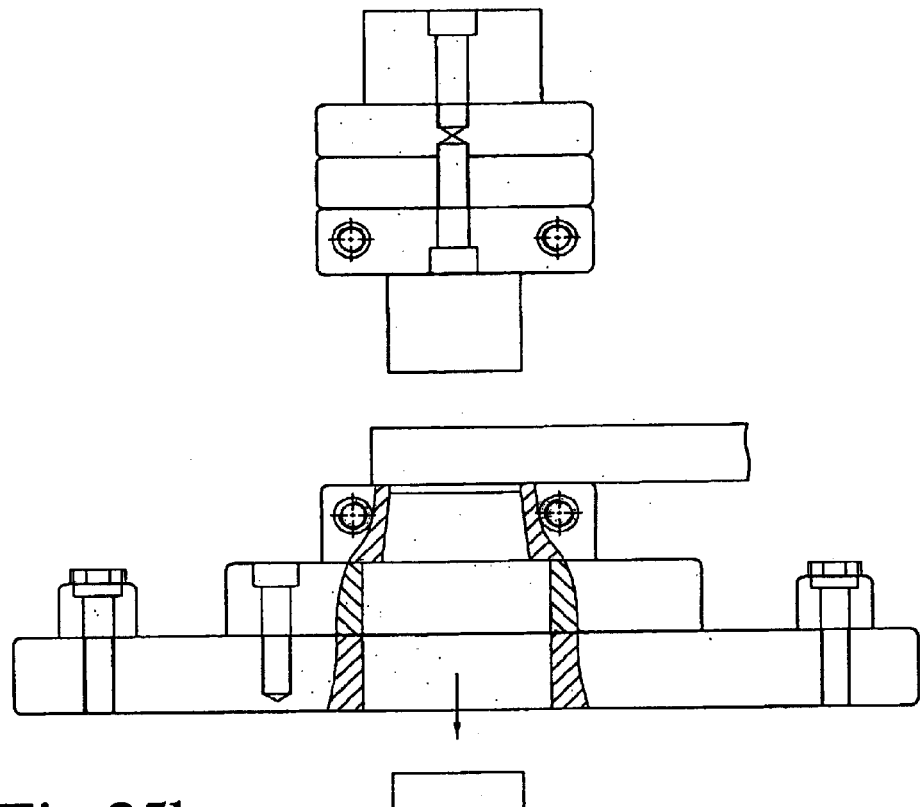
Figure 26A:
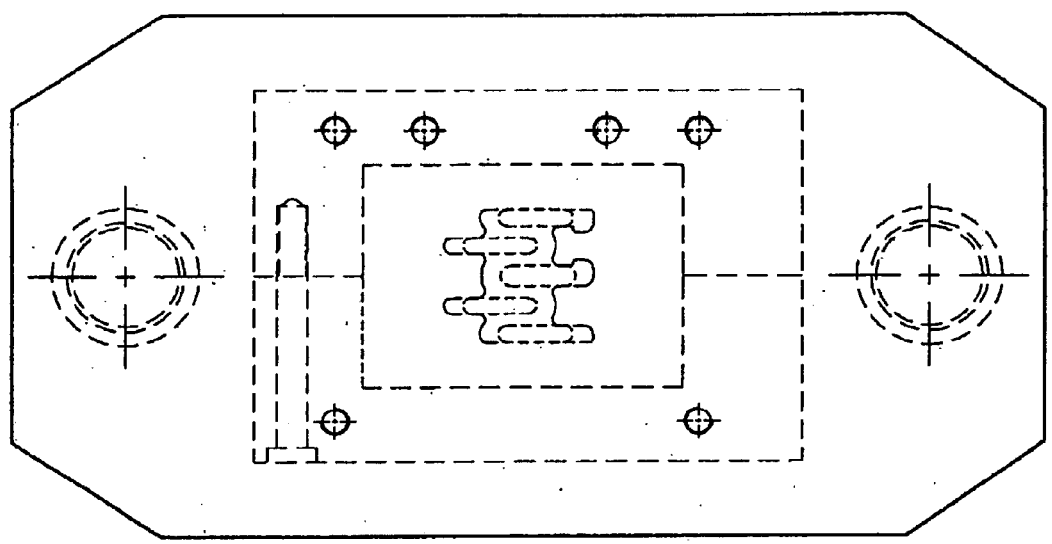
Figure 26B:
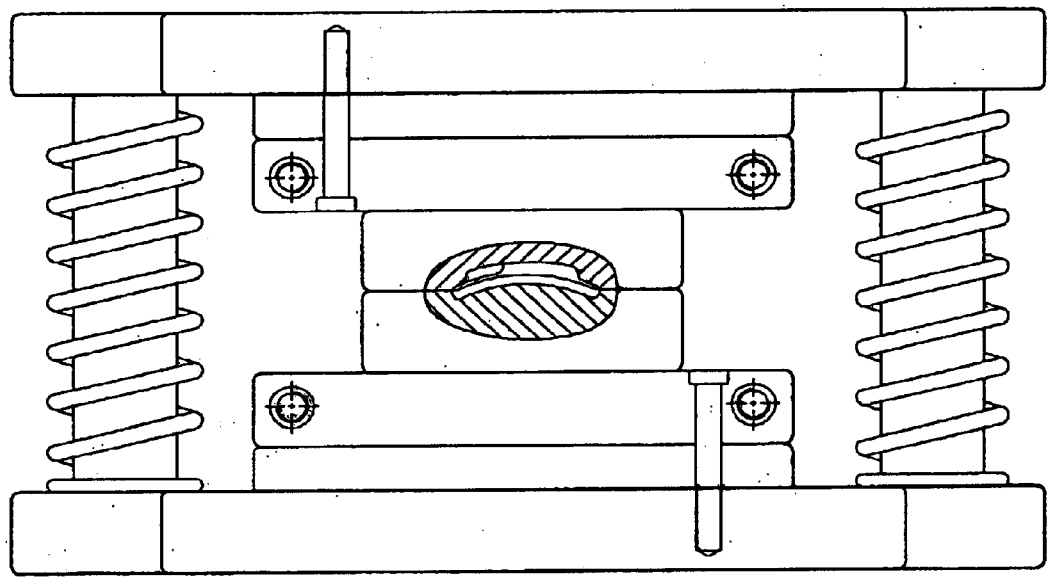
Figure 27A:
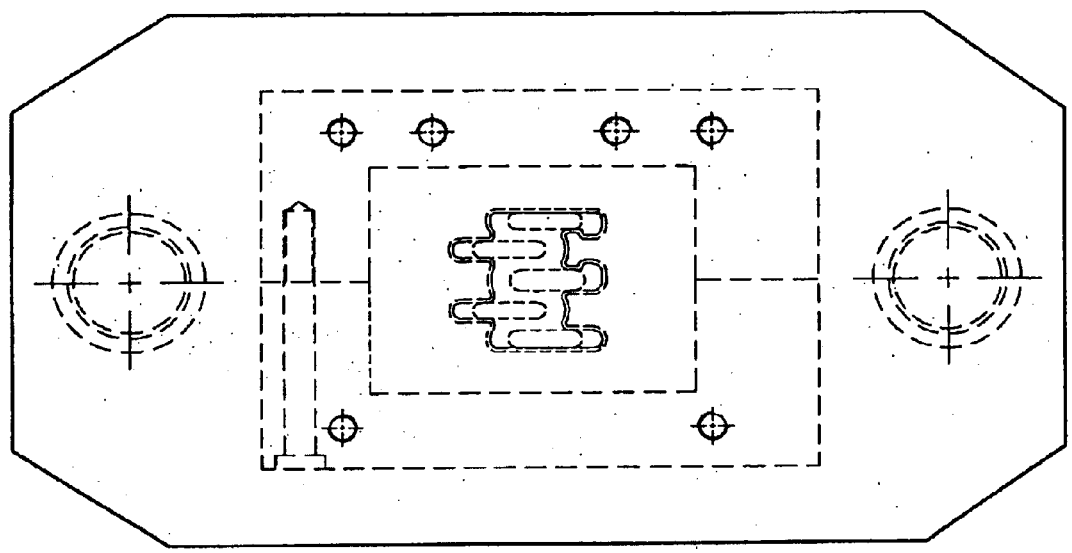
Figure 27B:
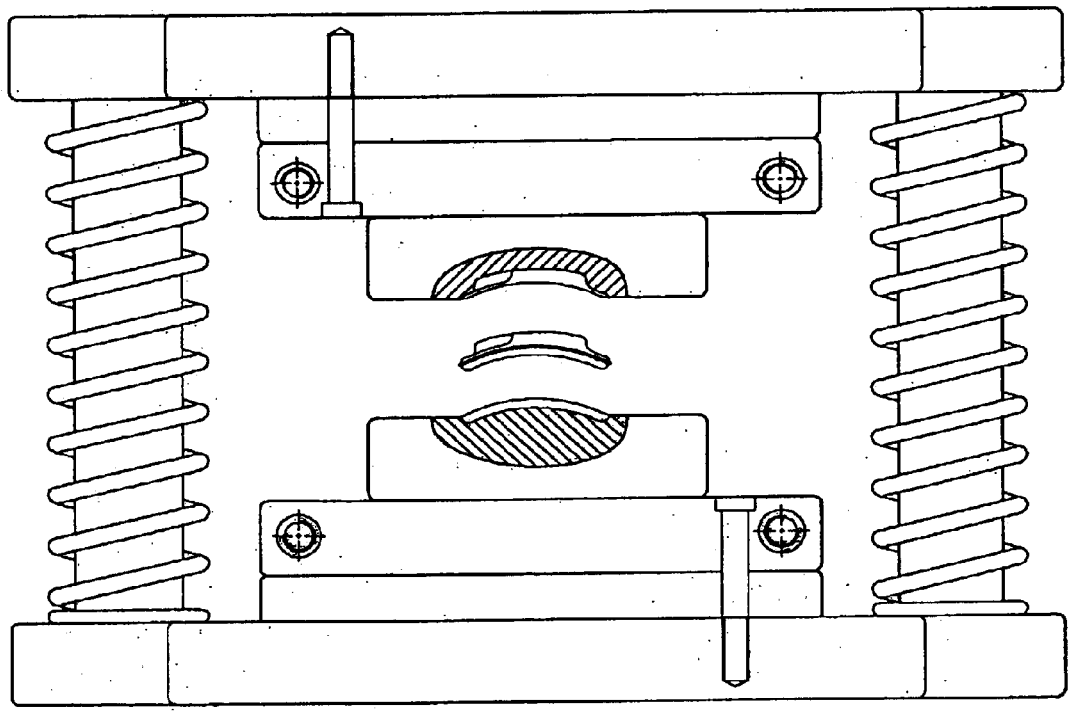
Figure 28A:
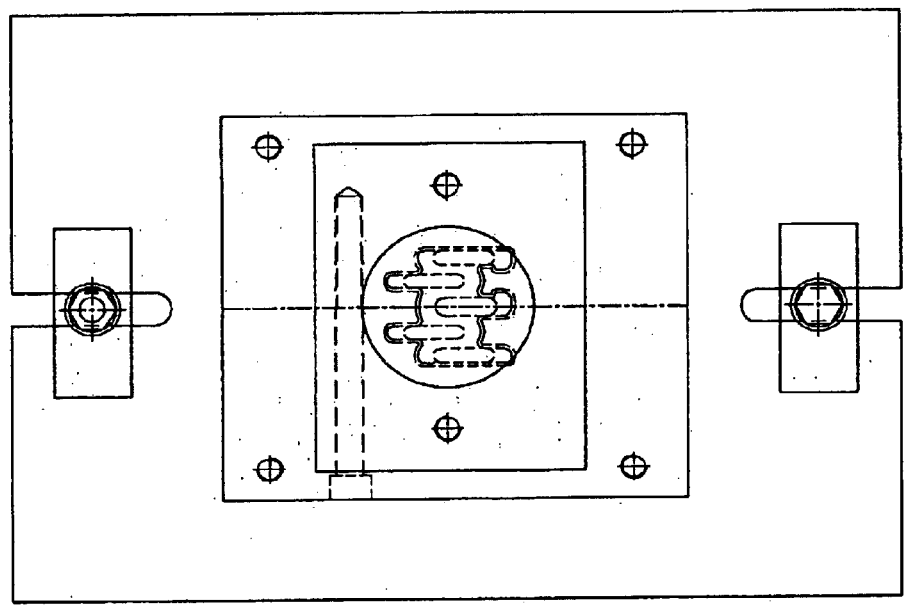
Figure 28B:
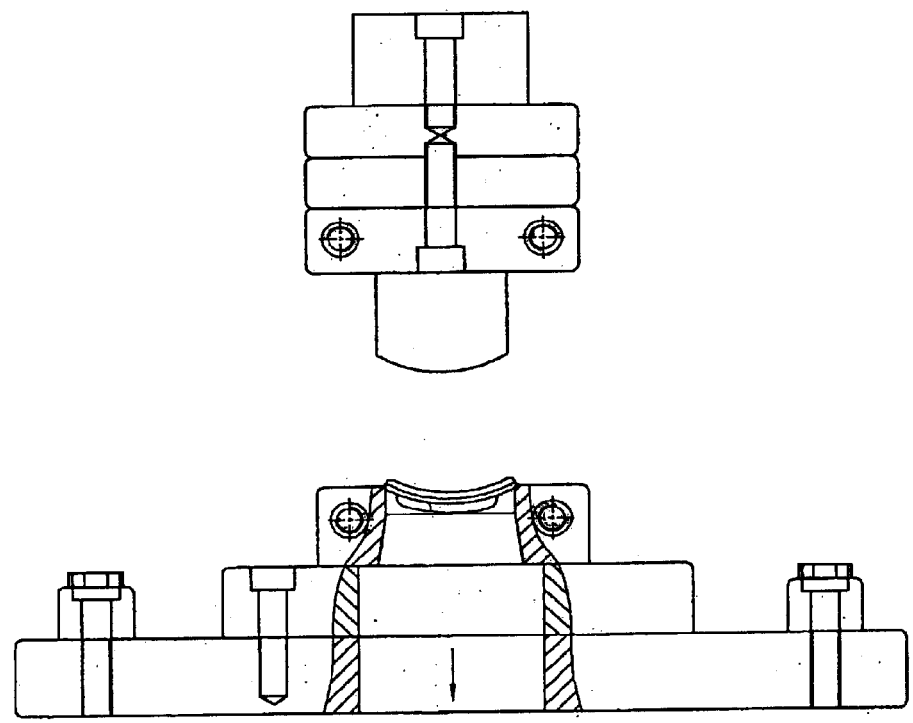
Figure 29A:
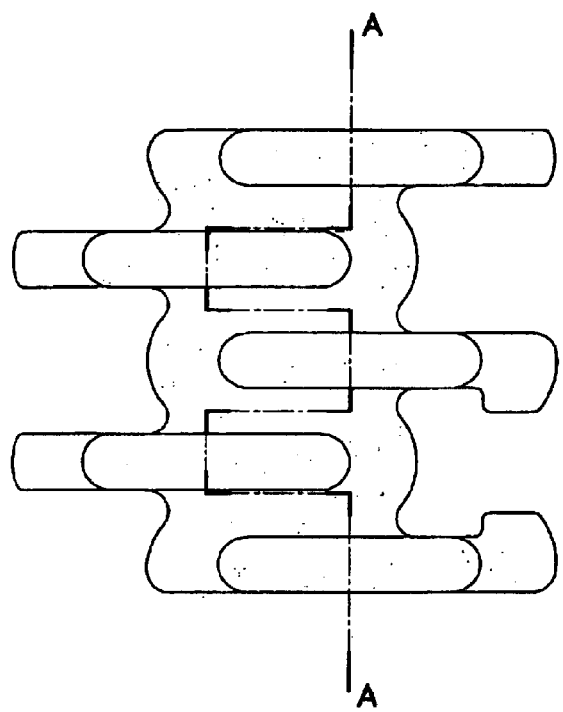
FIGS. 29a to 29c are different views of the interior portion of the third link produced from the steps illustrated in FIGS. 25a to 28b.
Figure 29B:
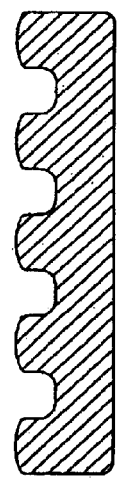
Figure 29C:
Figure 30A:
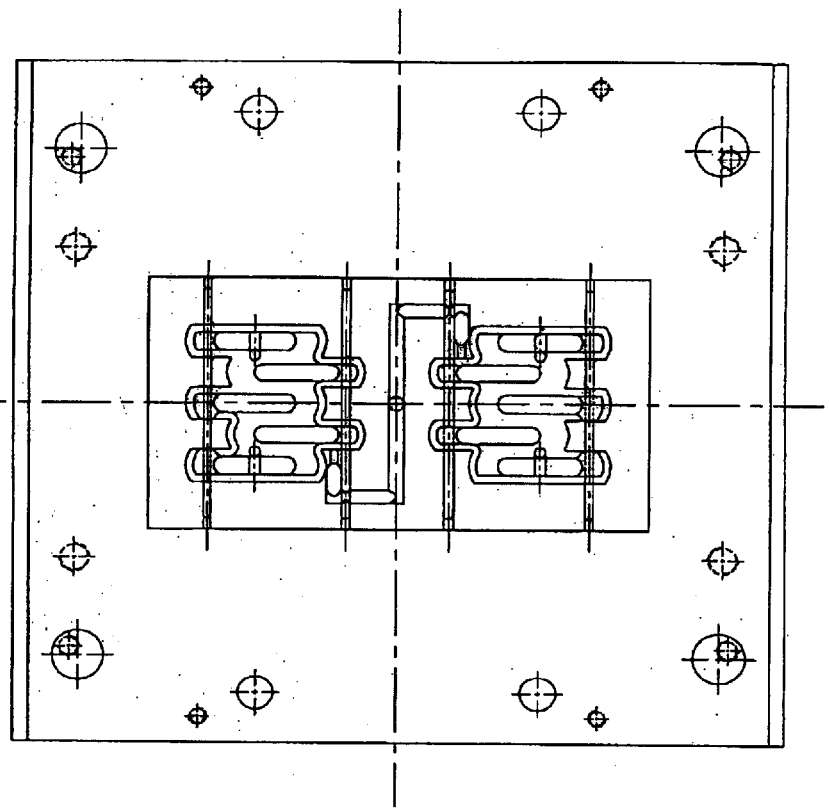
FIGS. 30a to 33b show a series of steps for moulding an exterior portion onto the interior portion of the third link shown in FIGS. 29a to 29c.
Figure 30B:
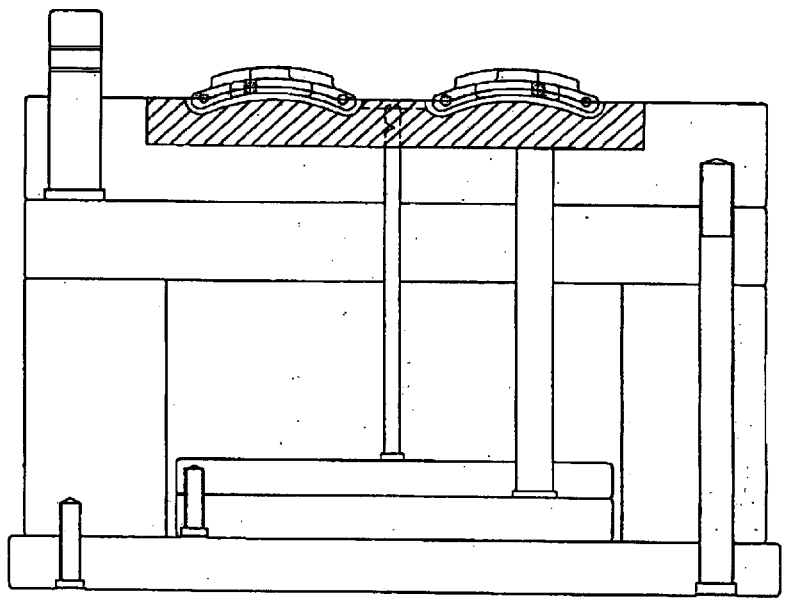
Figure 31A:
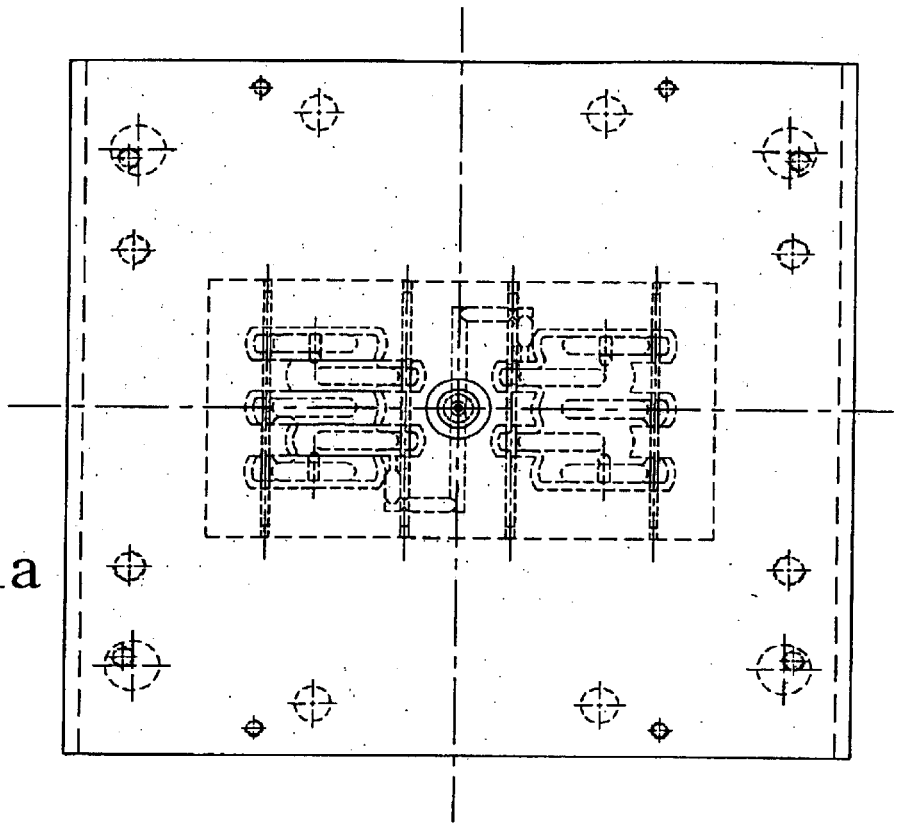
Figure 31B:
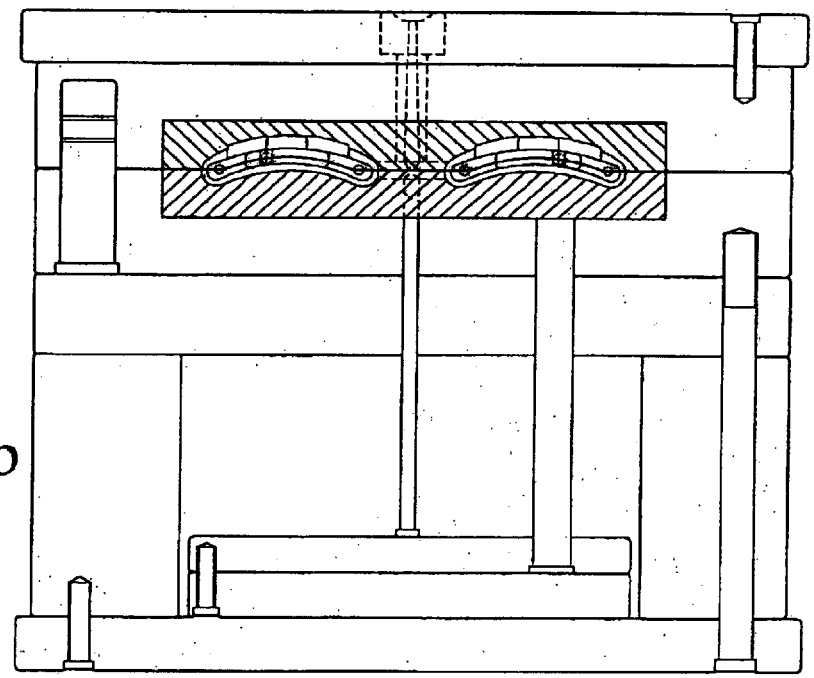
Figure 32A:
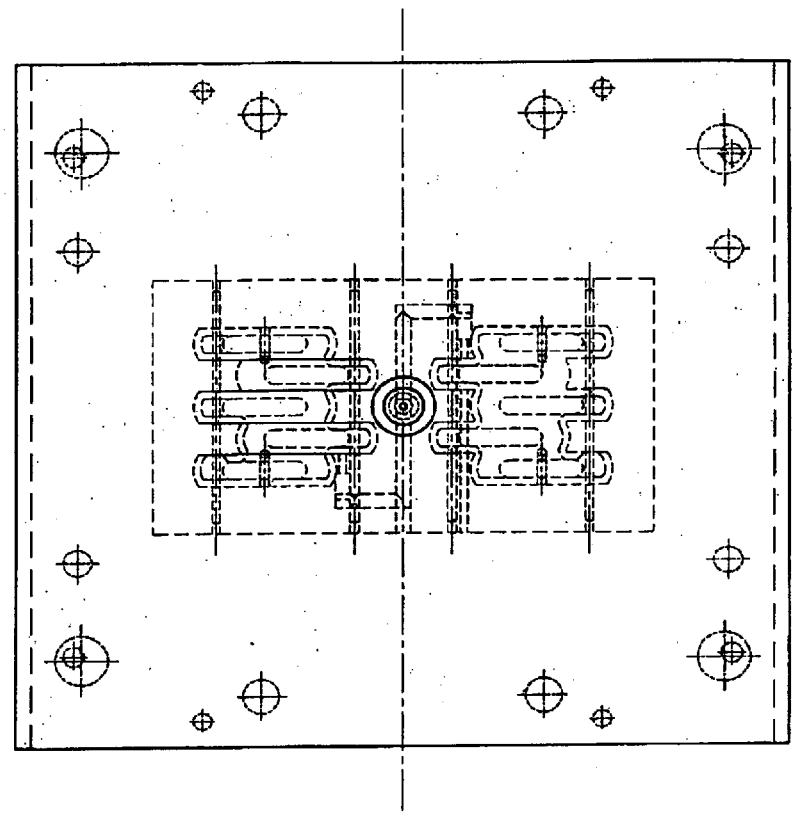
Figure 32B:
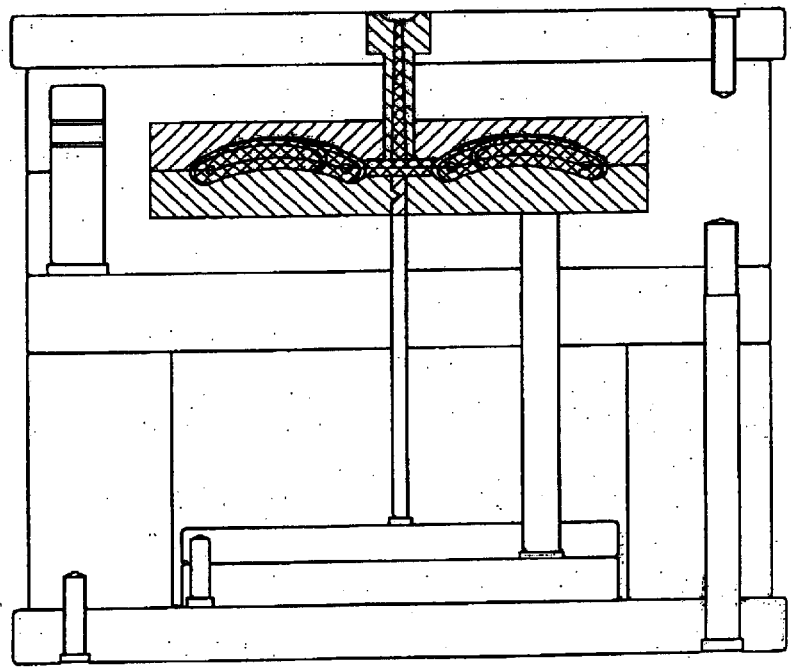
Figure 33A:
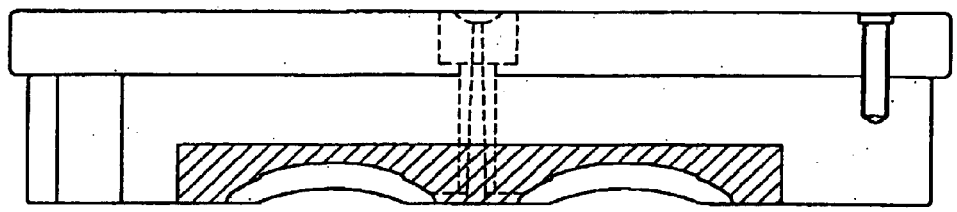
Figure 33B:
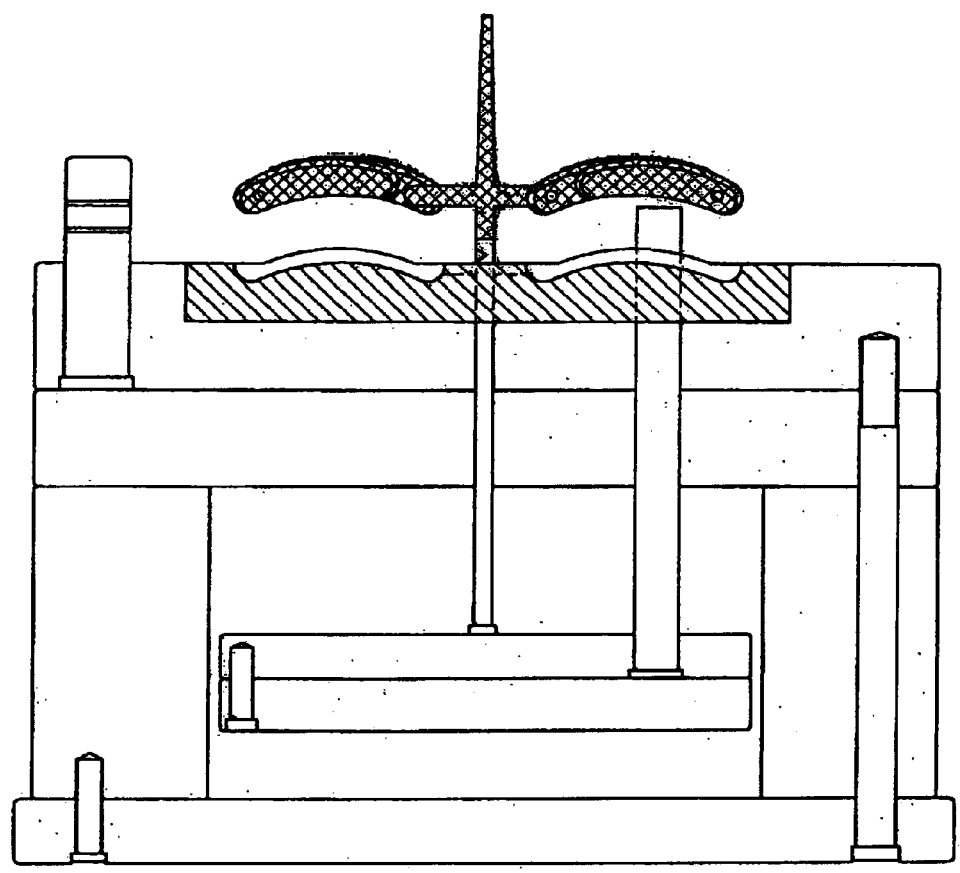
Figure 37A:
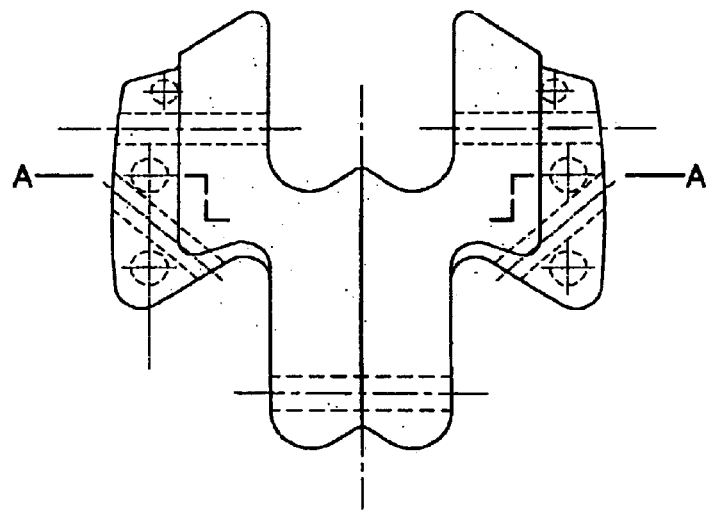
FIG. 37a is a top view of the interior portion of the fifth link shown in FIG. 35c.
Figure 37B:
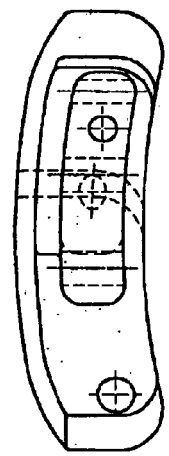
Figure 37C:
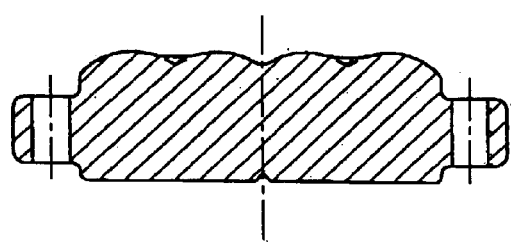
Figure 38A:
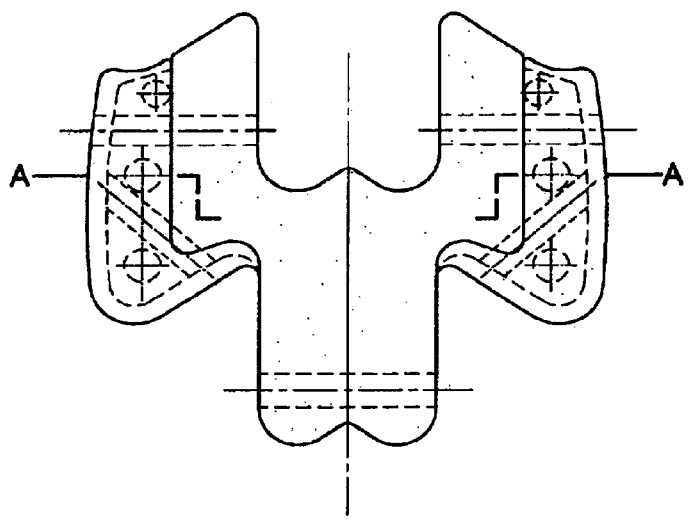
Figure 38B:
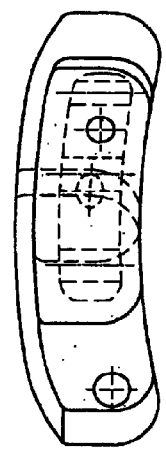
Figure 38C:
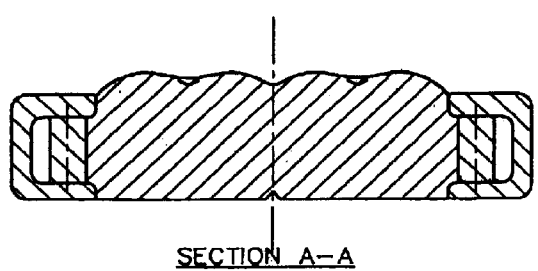
Figure 41B:
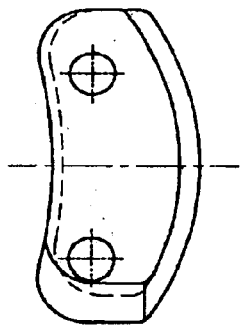
Figure 41A:
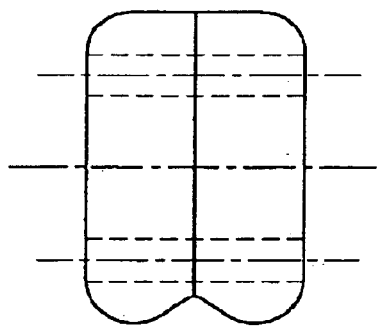
Figure 41C:
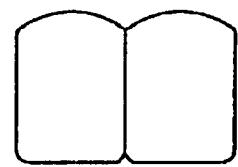
Figure 42:
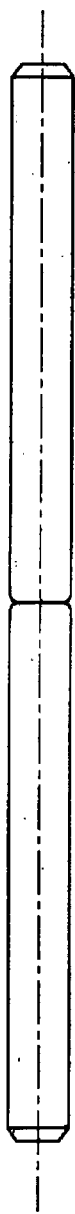
Figure 43A:
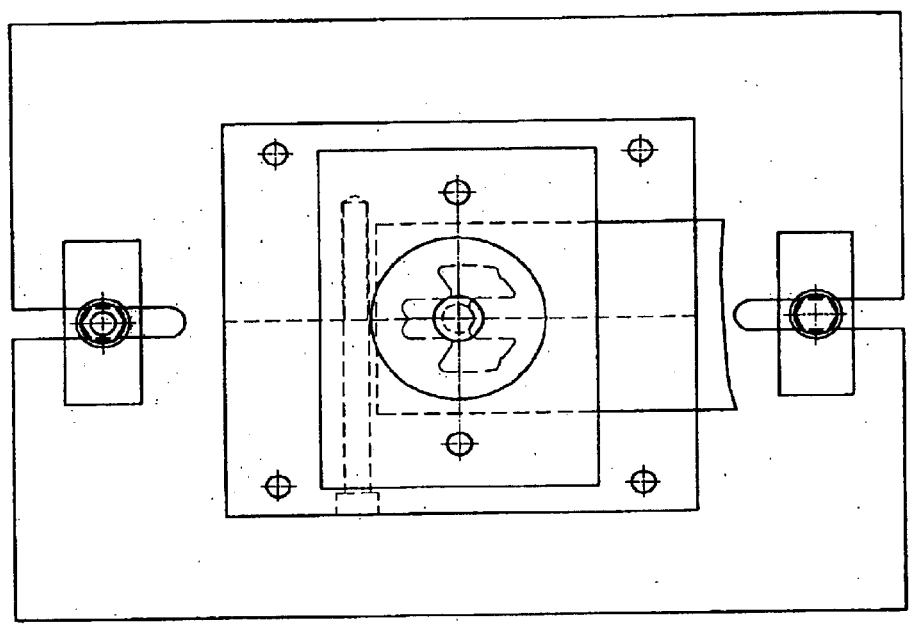
FIGS. 43a to 46b show a series of steps for producing the interior portion of the fifth link shown in FIGS. 37a to 37c.
Figure 43B:
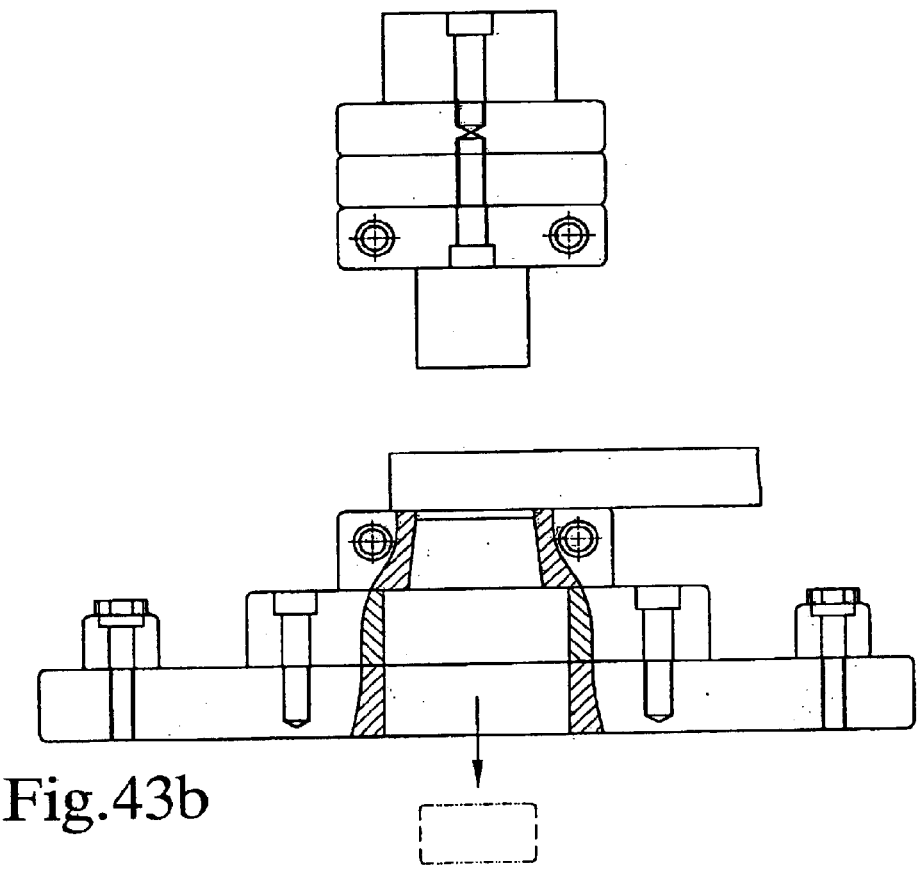
Figure 44A:
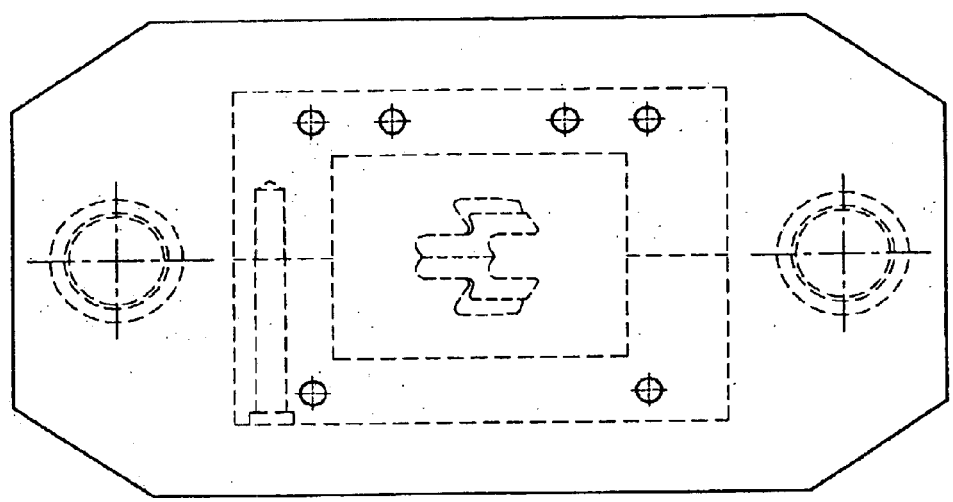
Figure 44B:
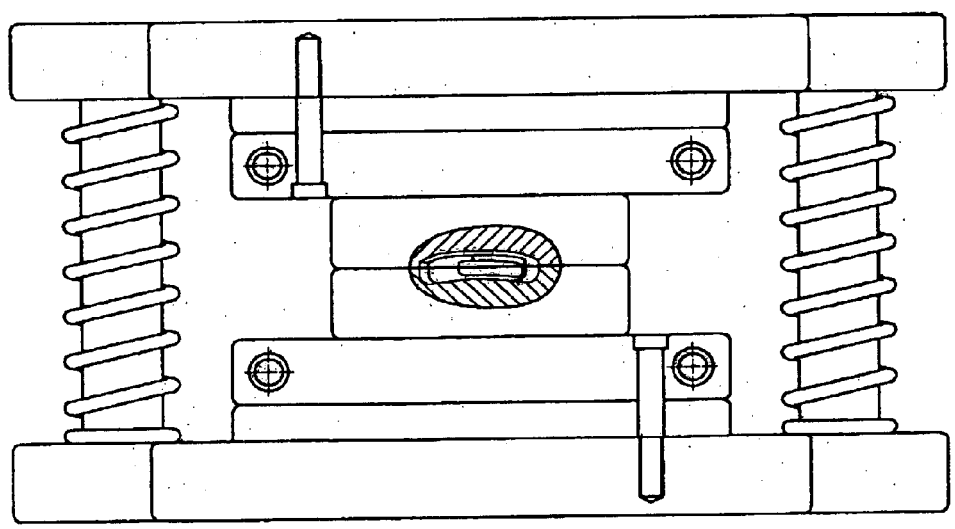
Figure 45A:
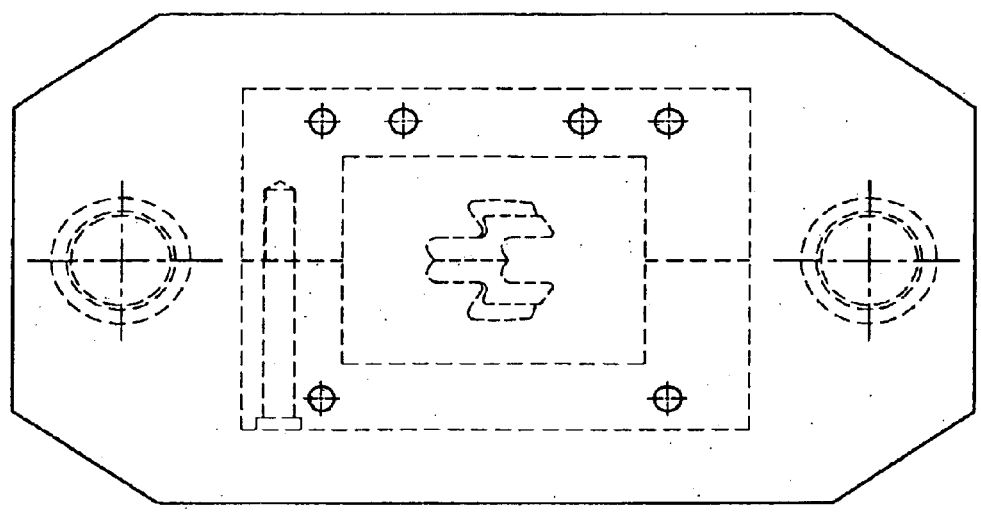
Figure 45B:
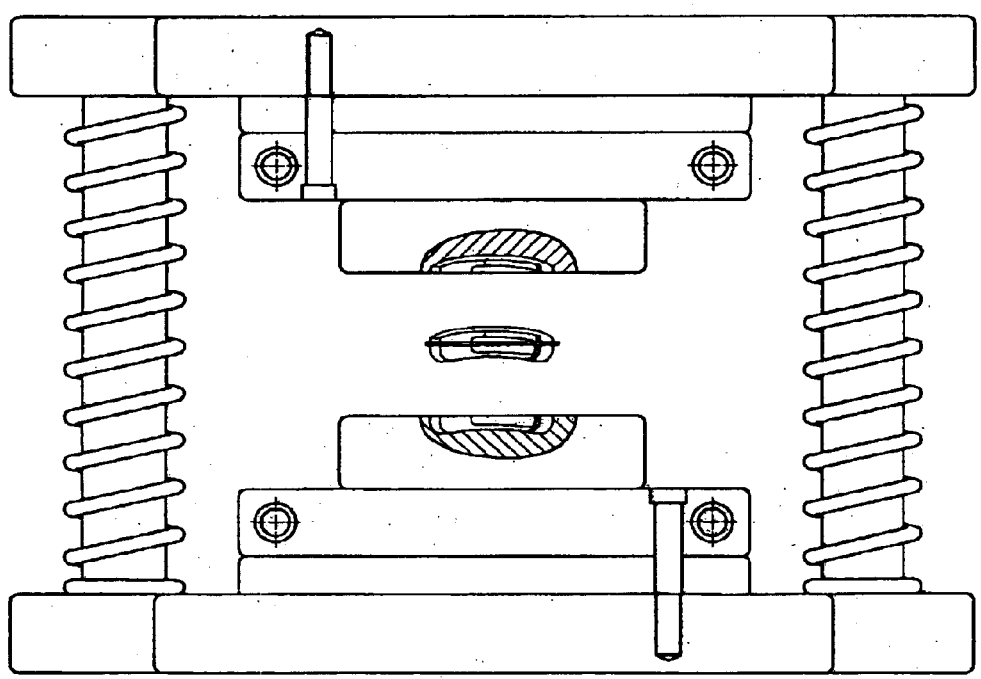
Figure 46A:
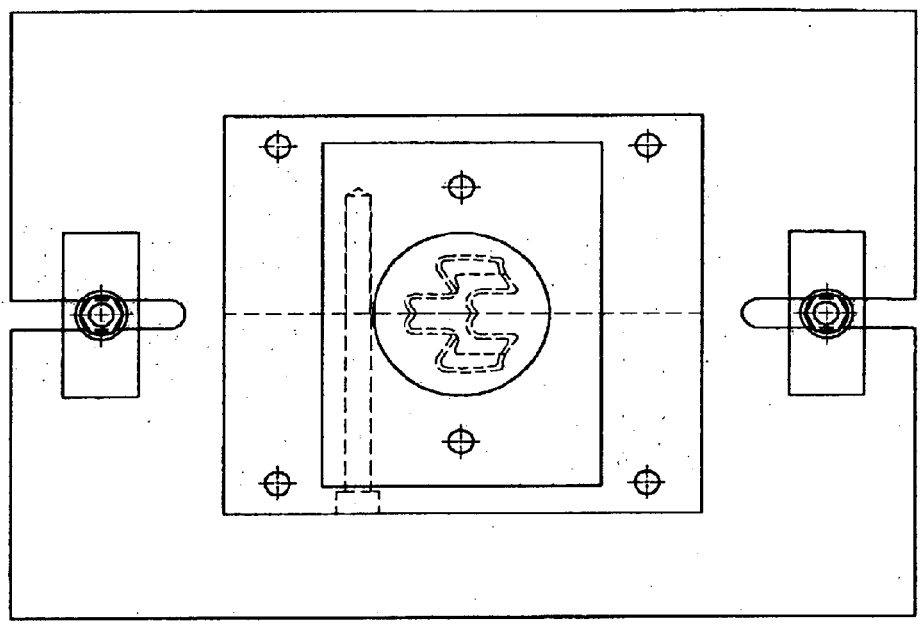
FIGS. 46c to 46e are different views of the interior portion of the fifth link produced from the steps illustrated in FIGS. 43a to 46b.
Figure 46B:
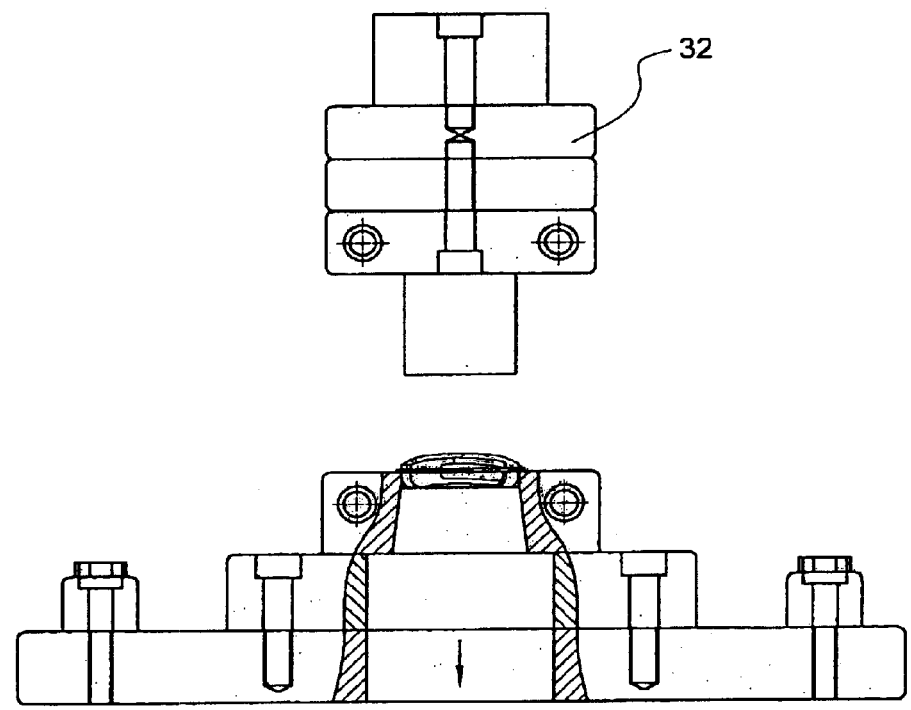
Figure 46C:
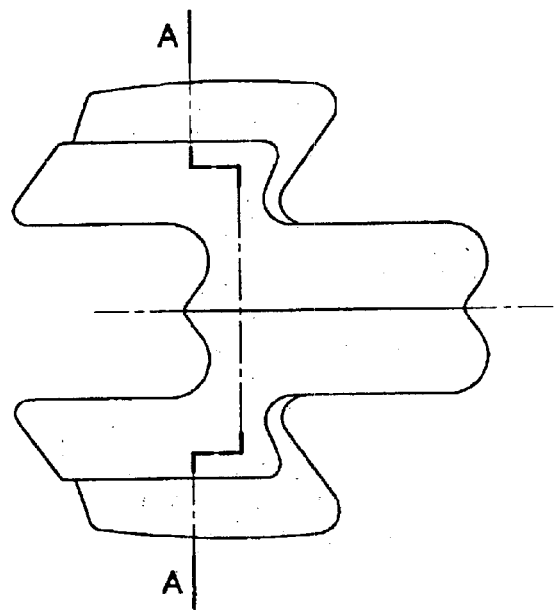
Figure 46D:
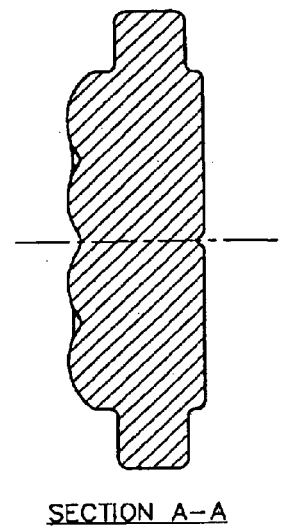
Figure 46E:
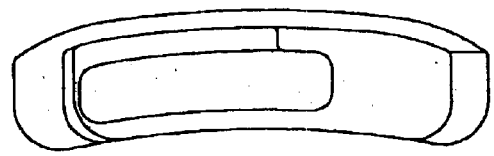
Figure 47A:
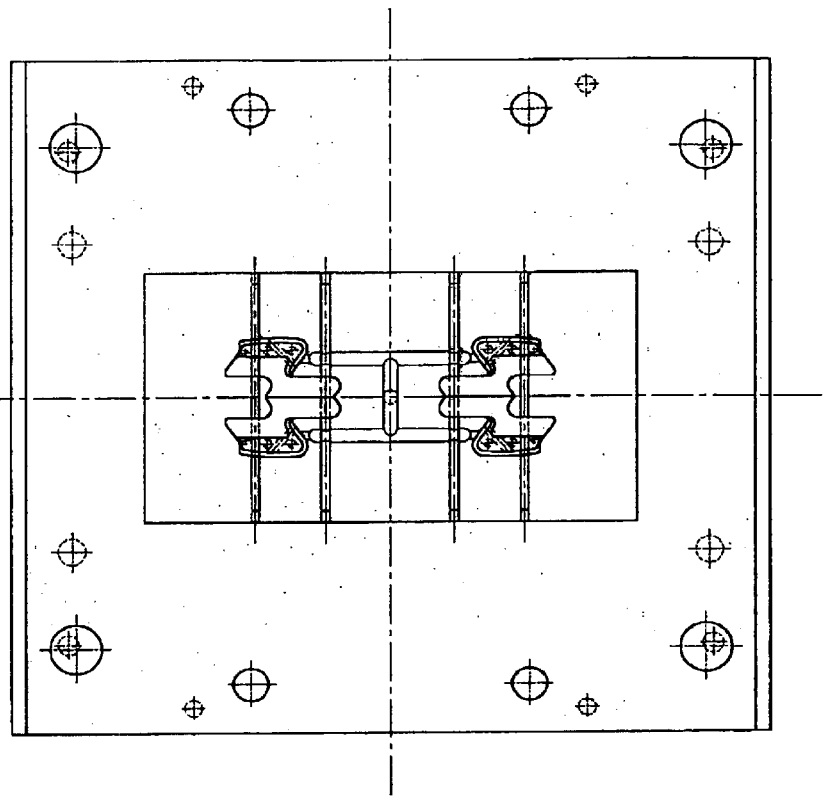
FIGS. 47a to 50b show a series of steps for moulding the exterior portion onto the interior portion of the fifth link shown in FIGS. 46c to 46e.
Figure 47B:
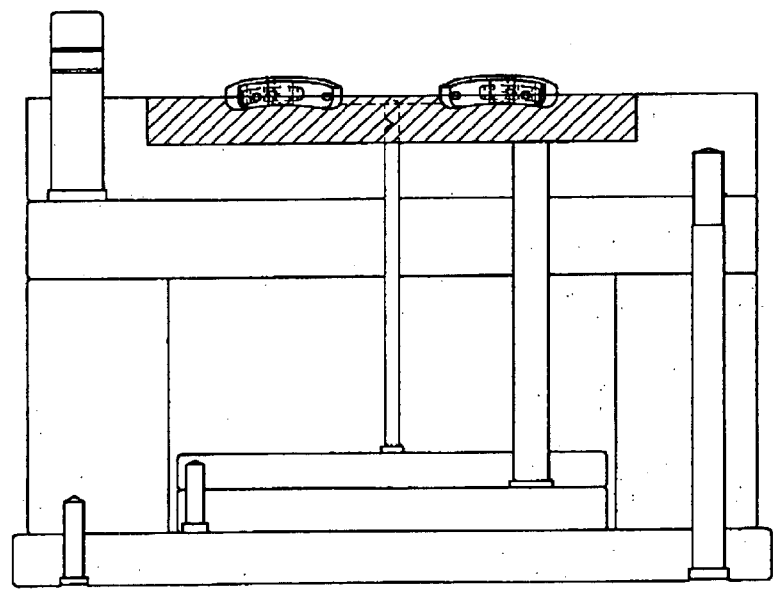
Figure 48A:
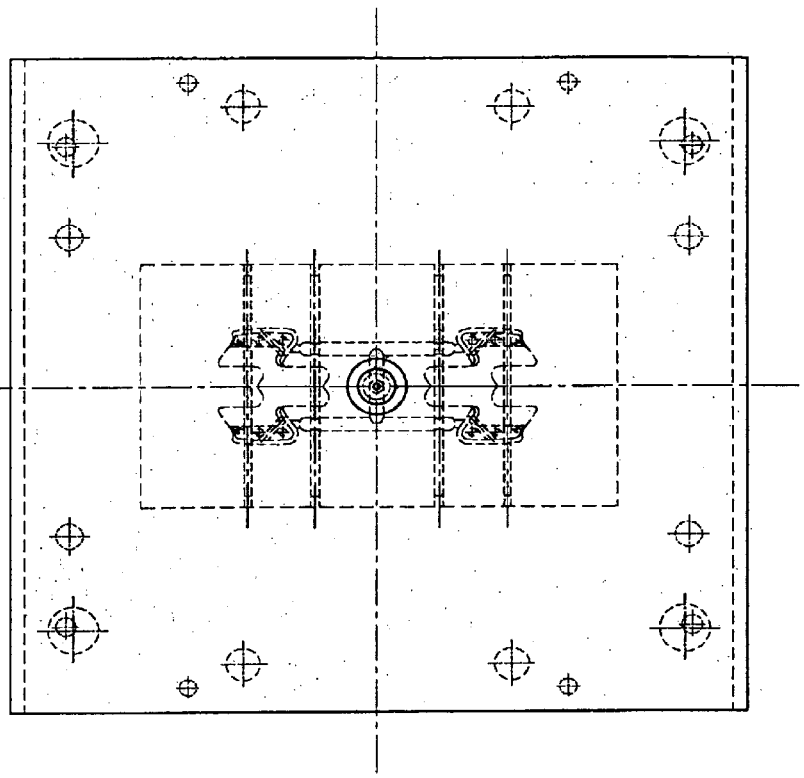
Figure 48B:
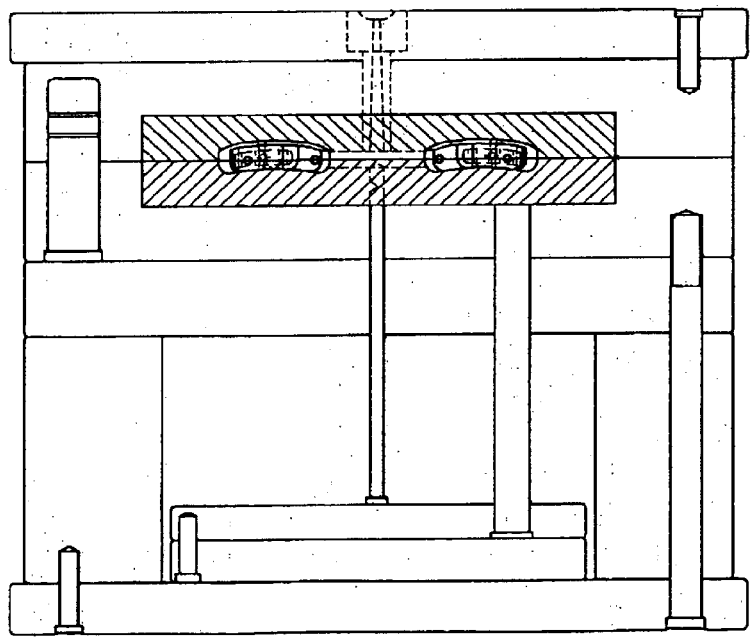
Figure 49A:
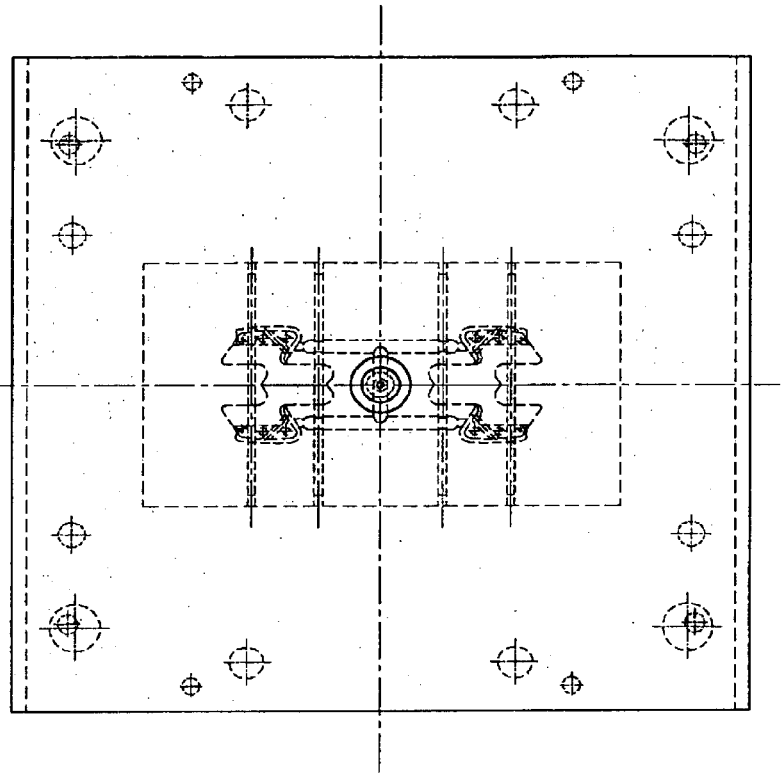
Figure 49B:
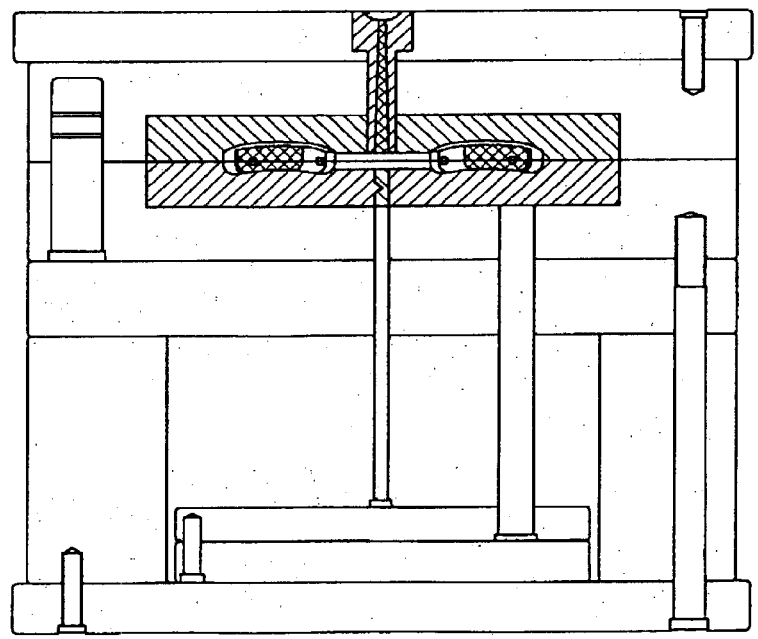
Figure 50A:
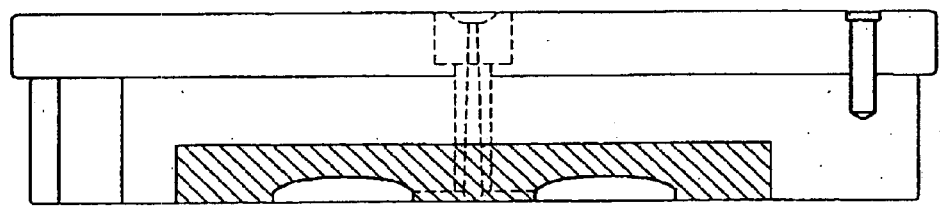
Figure 50B:
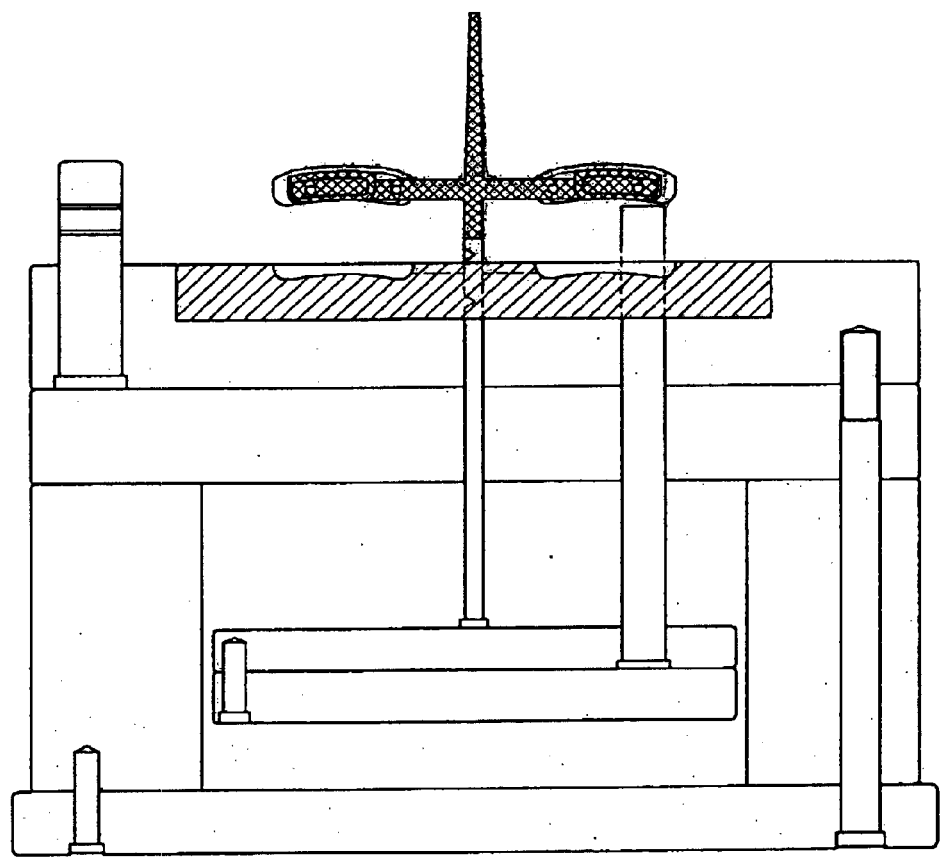
Figure 51A:
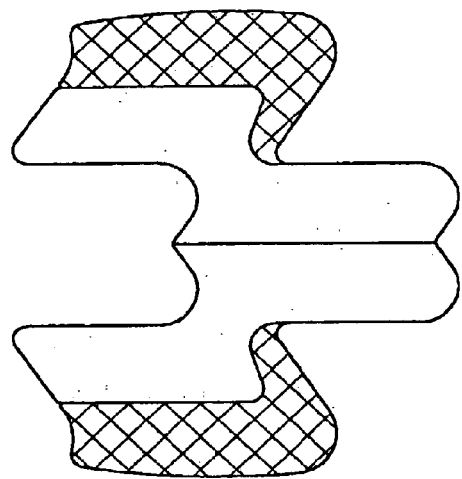
FIG. 51a is a top view of the finished fifth link produced from the steps illustrated in FIGS. 47a to 50b.
Figure 51B:
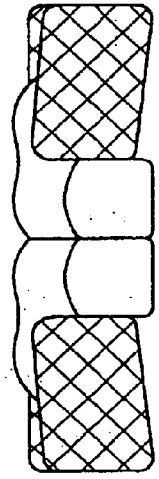
Figure 51C:
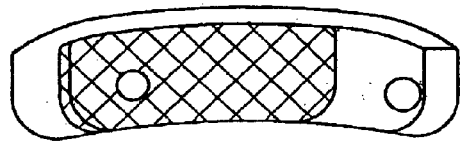
Figure 52B:
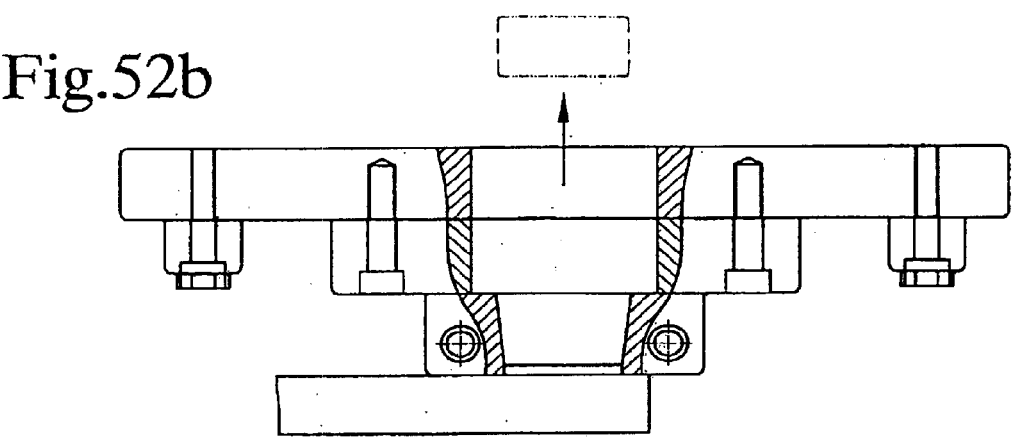
FIGS. 52a to 53b show a series of steps for producing an interior portion of a watchcase according to a fourth embodiment of the present invention.
Figure 52B:
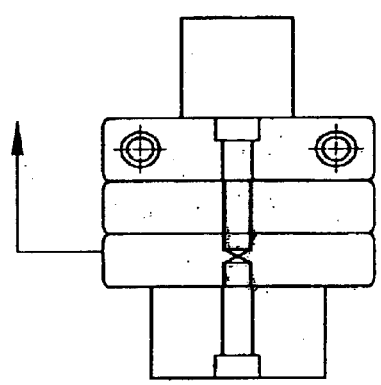
Figure 52A:
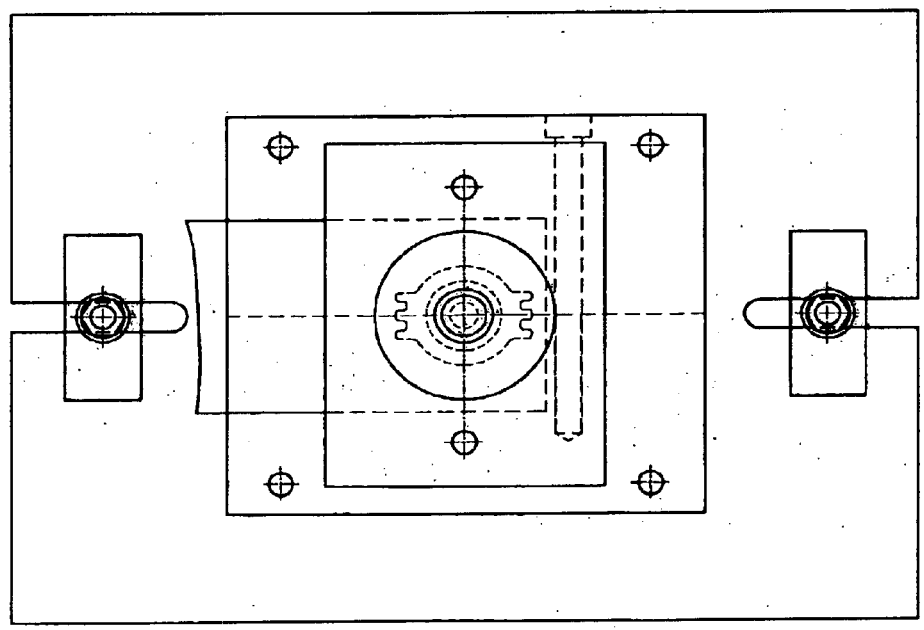
Figure 52D:
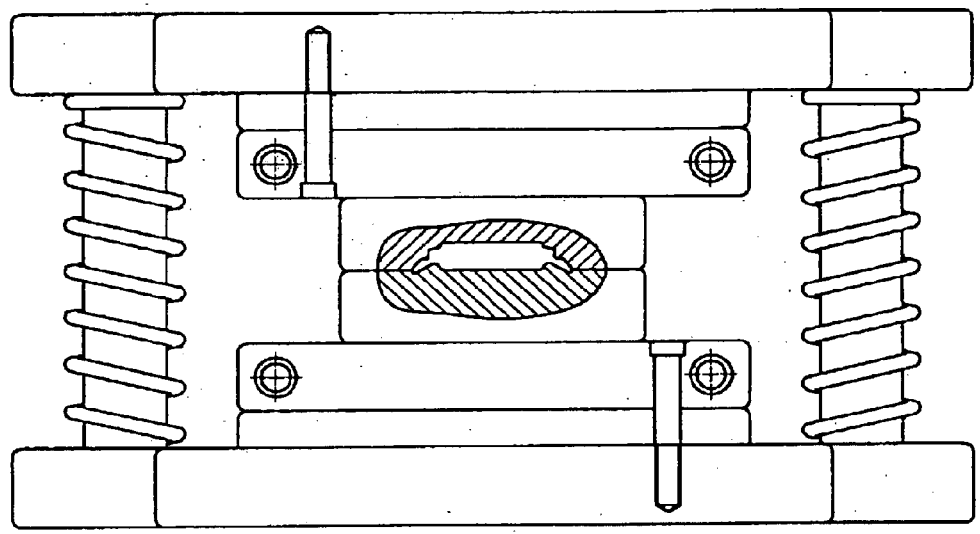
Figure 52C:
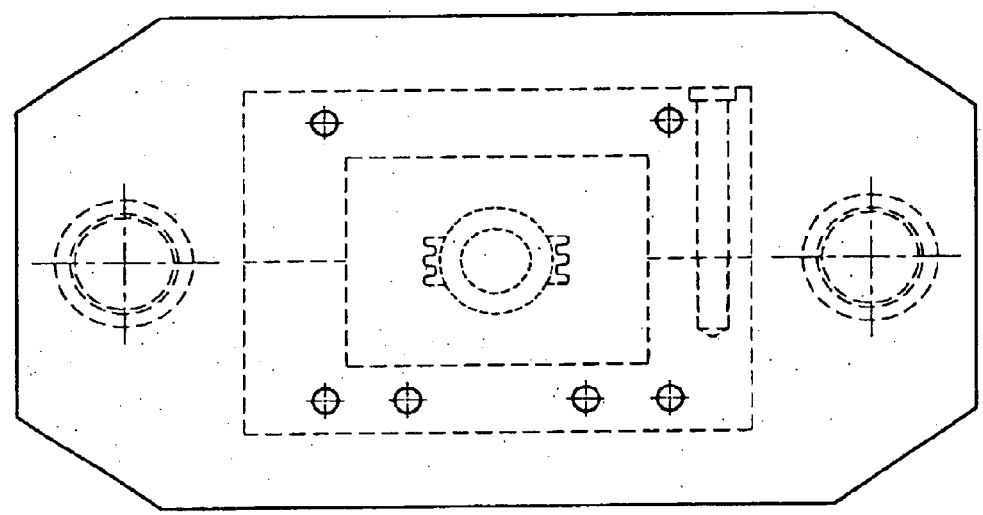
Figure 52F:
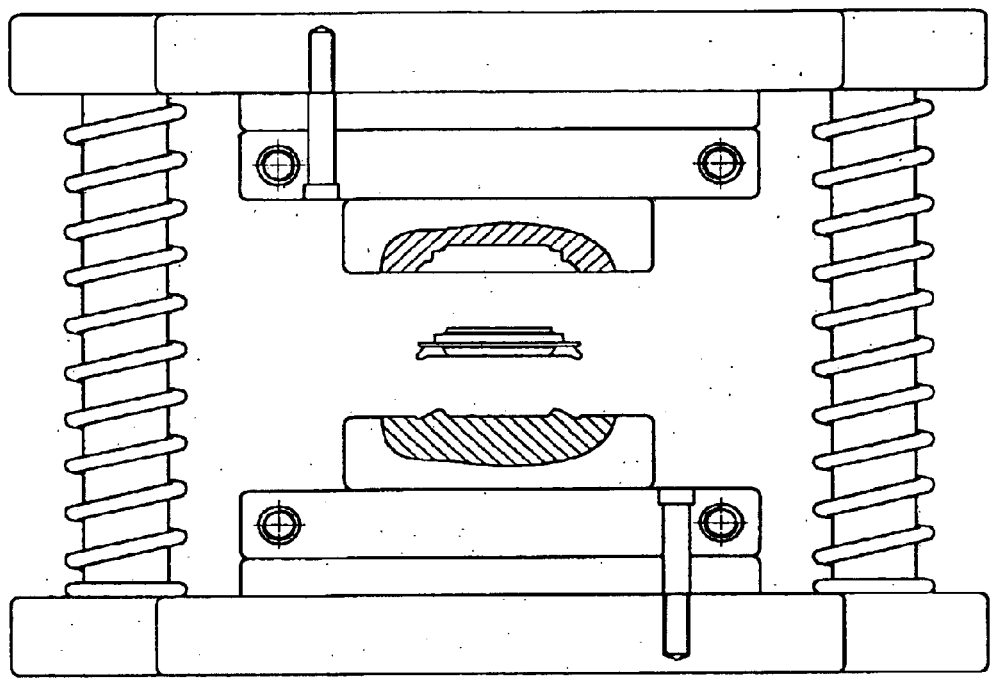
Figure 52E:
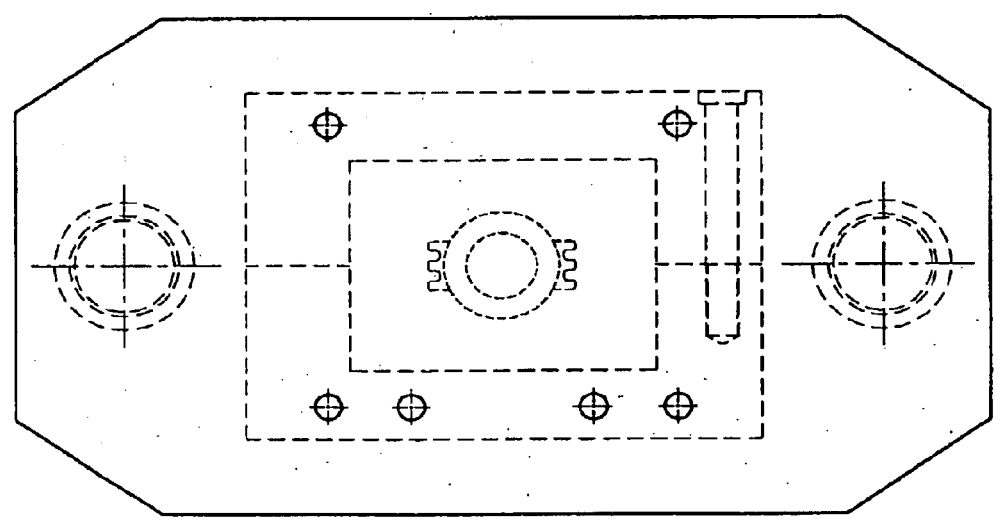
Figure 53B:
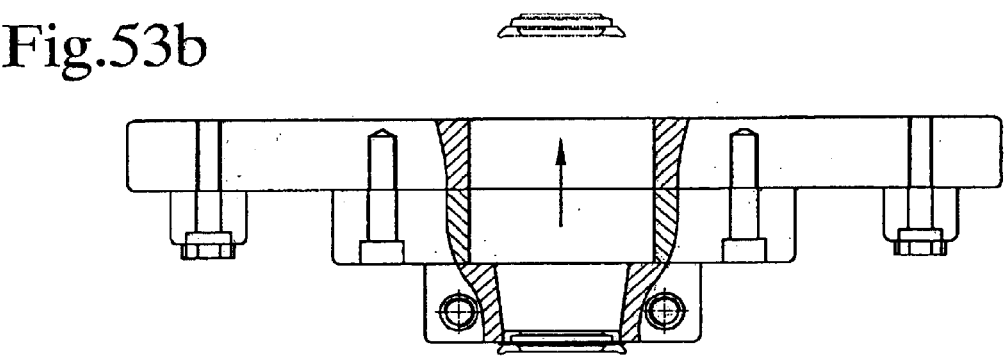
Figure 53B:
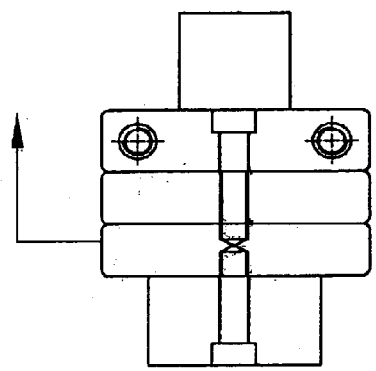
Figure 53A:
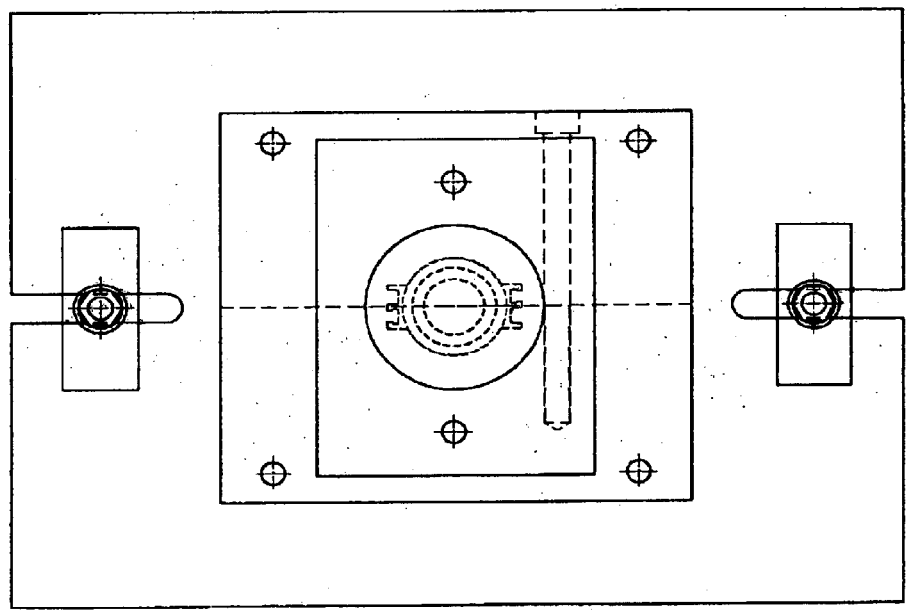
Figure 54A:
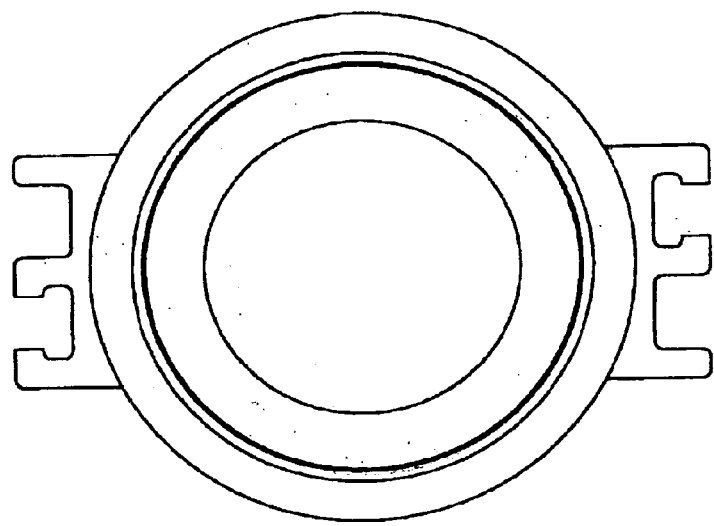
FIGS. 54a to 54b are different views of the interior portion produced from the steps illustrated in FIGS. 52a to 53b.
Figure 54B:
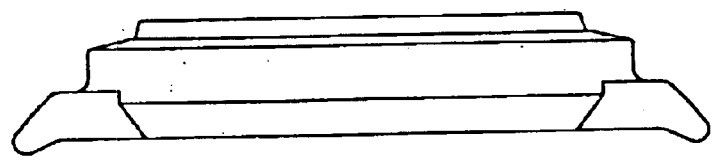
Figure 55A:
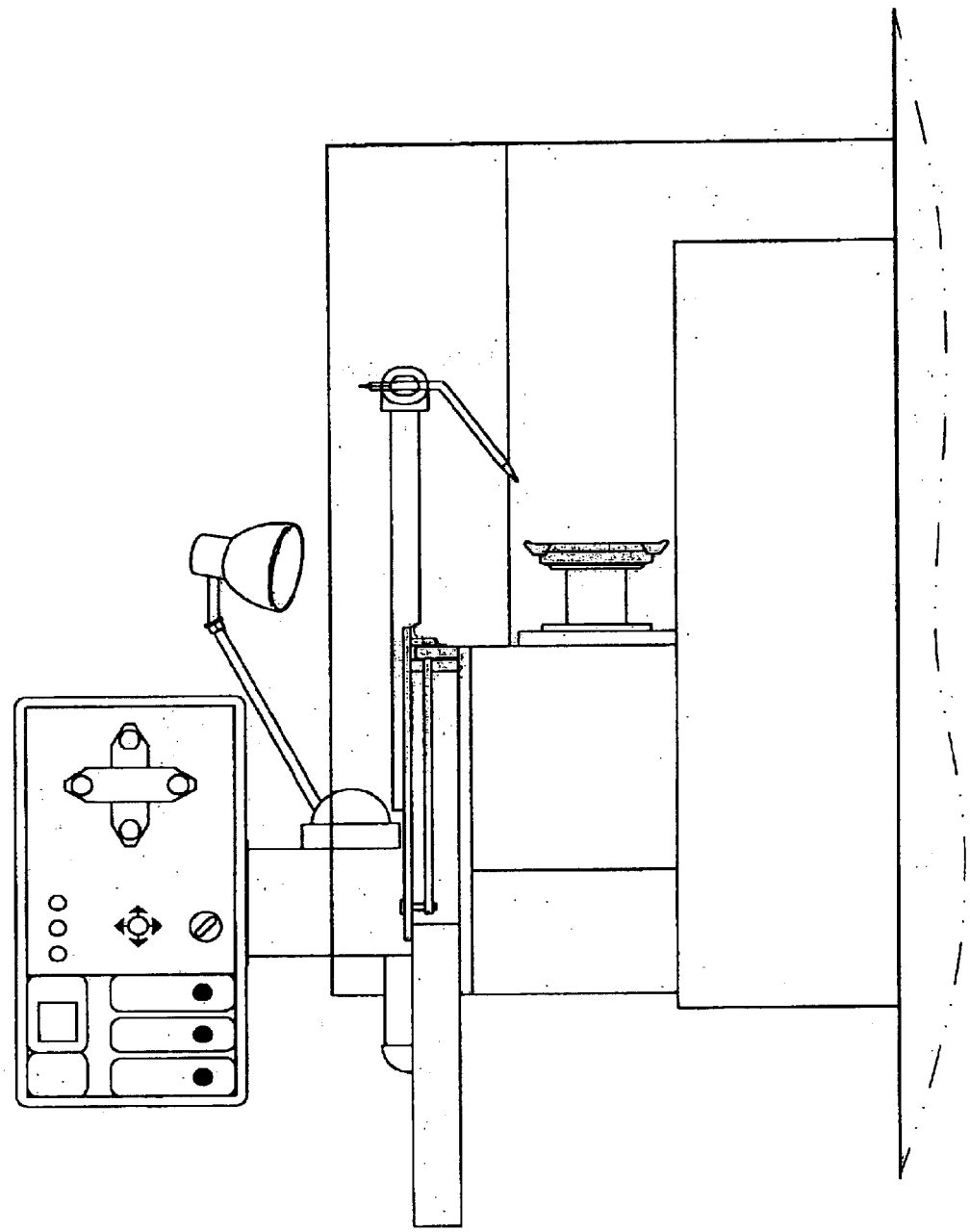
FIGS. 55a to 55b shows a series of steps for further processing the interior portion shown in FIGS. 54a to 54b.
Figure 55B:
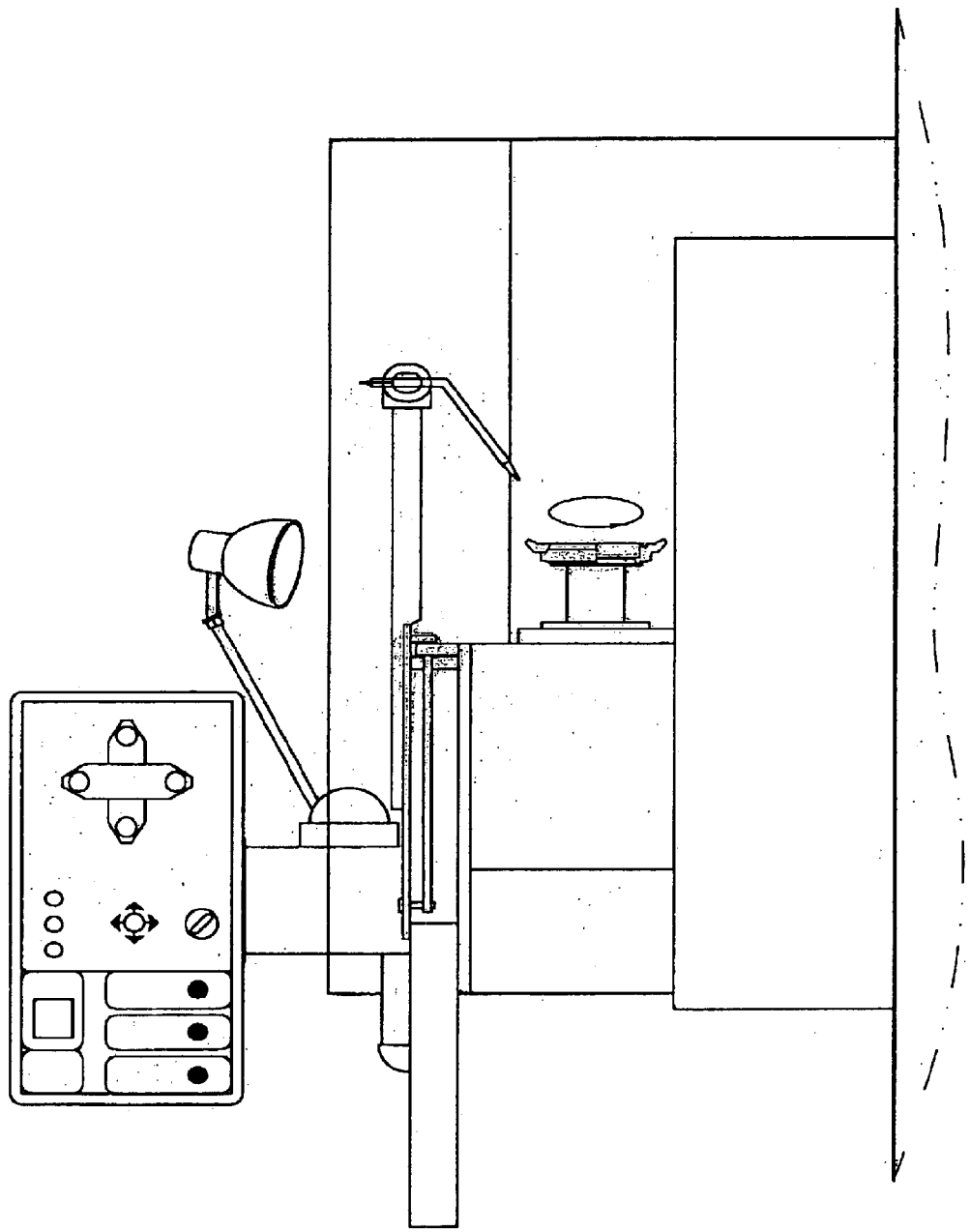
Figure 56A:
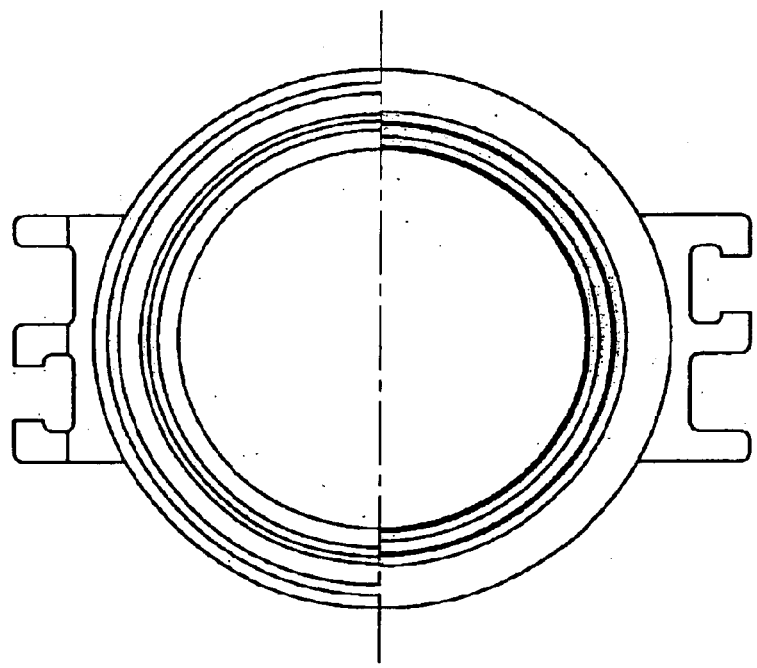
FIGS. 56a to 56b are different views of the interior portion produced from the steps illustrated in FIGS. 55a to 55b.
Figure 56B:
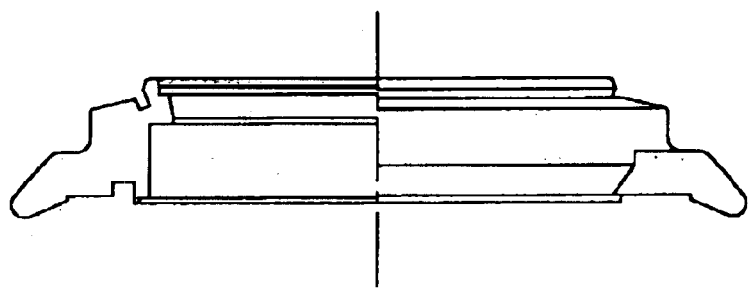
Figure 57A:
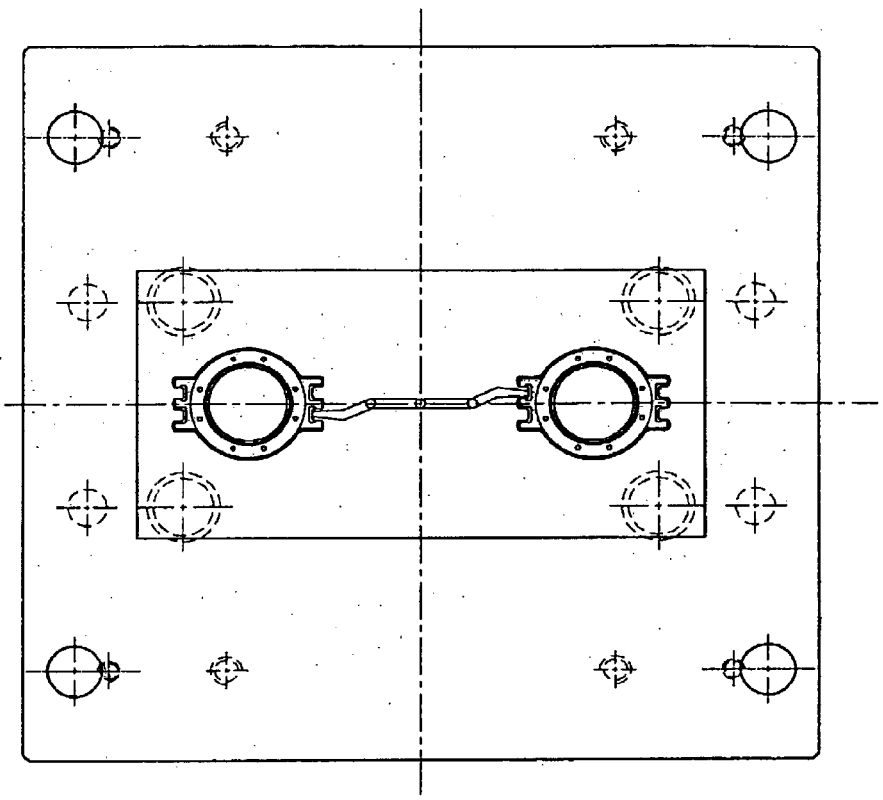
FIGS. 57a to 57g show a series of steps for moulding an exterior portion onto the interior portion of the watchcase shown in FIGS. 56a to 56b.
Figure 57B:
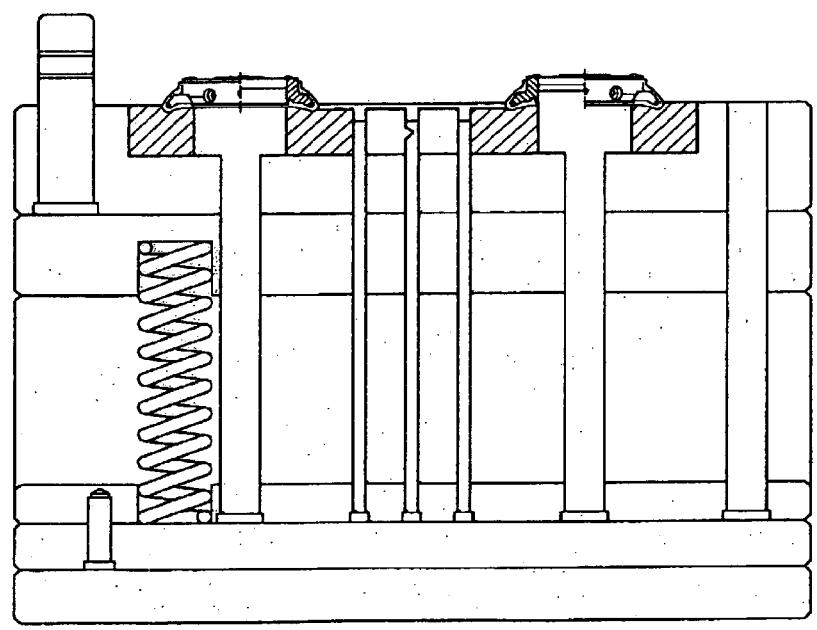
Figure 57C:
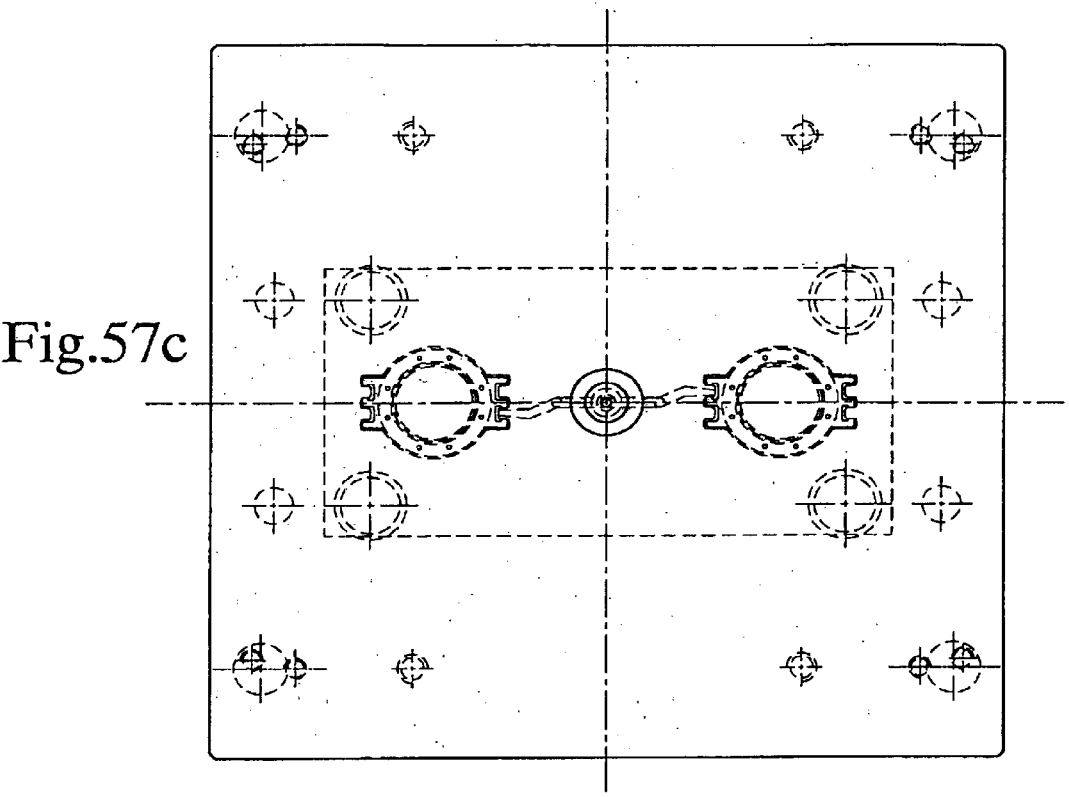
Figure 57D:
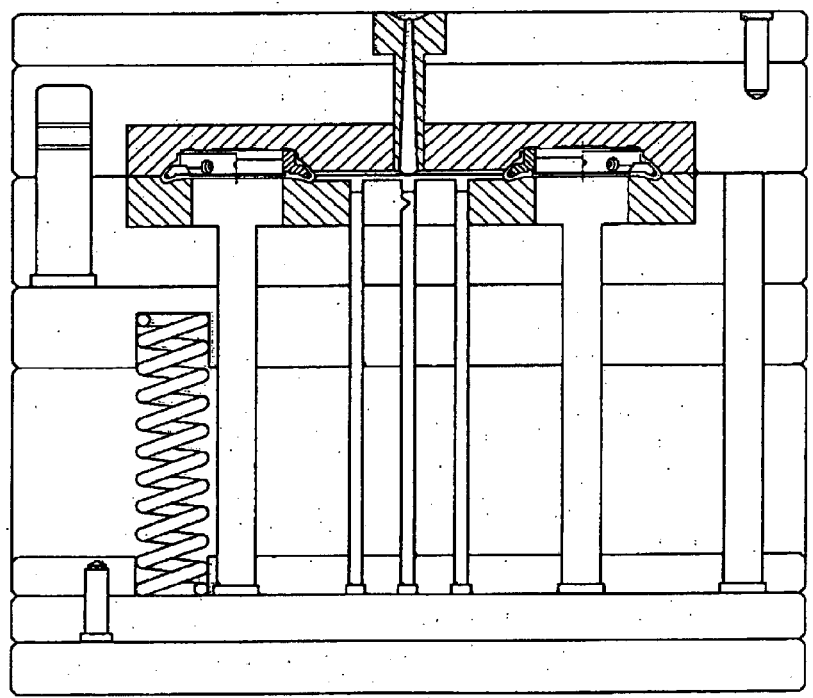
Figure 57E:
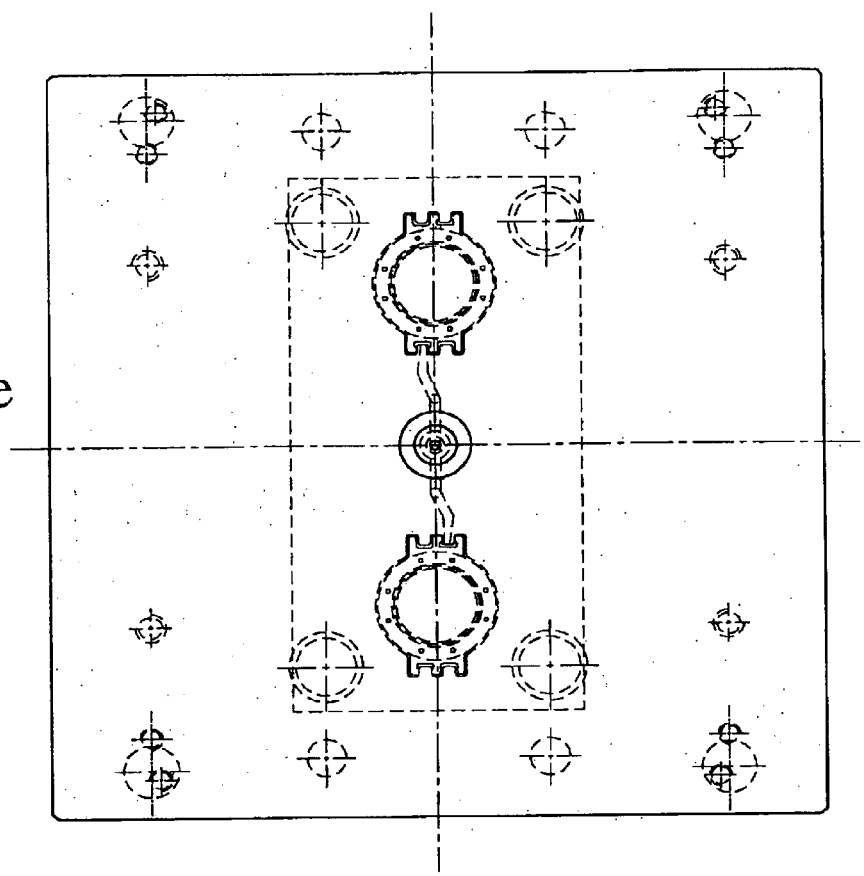
Figure 57F:
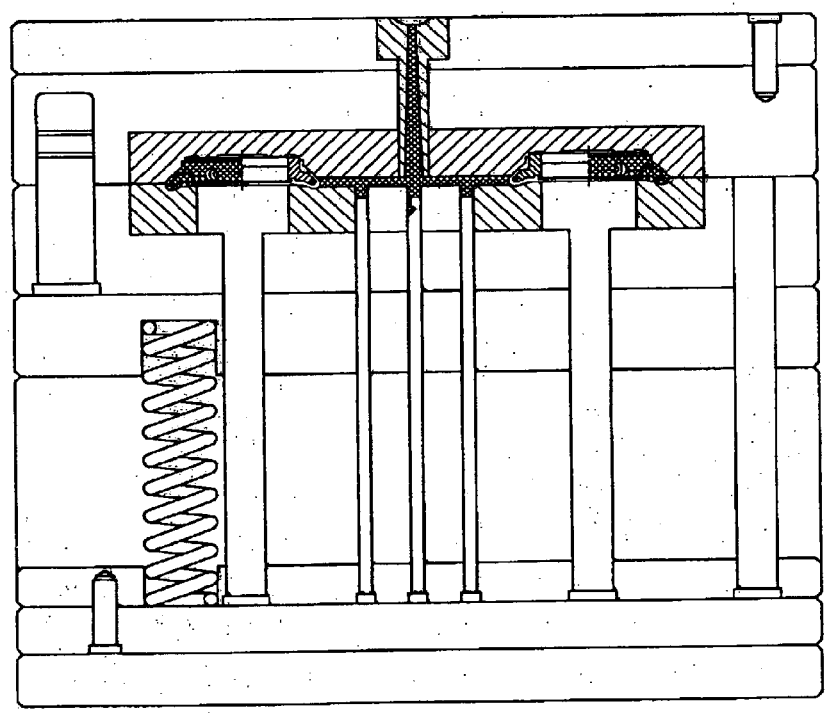
Figure 57G:
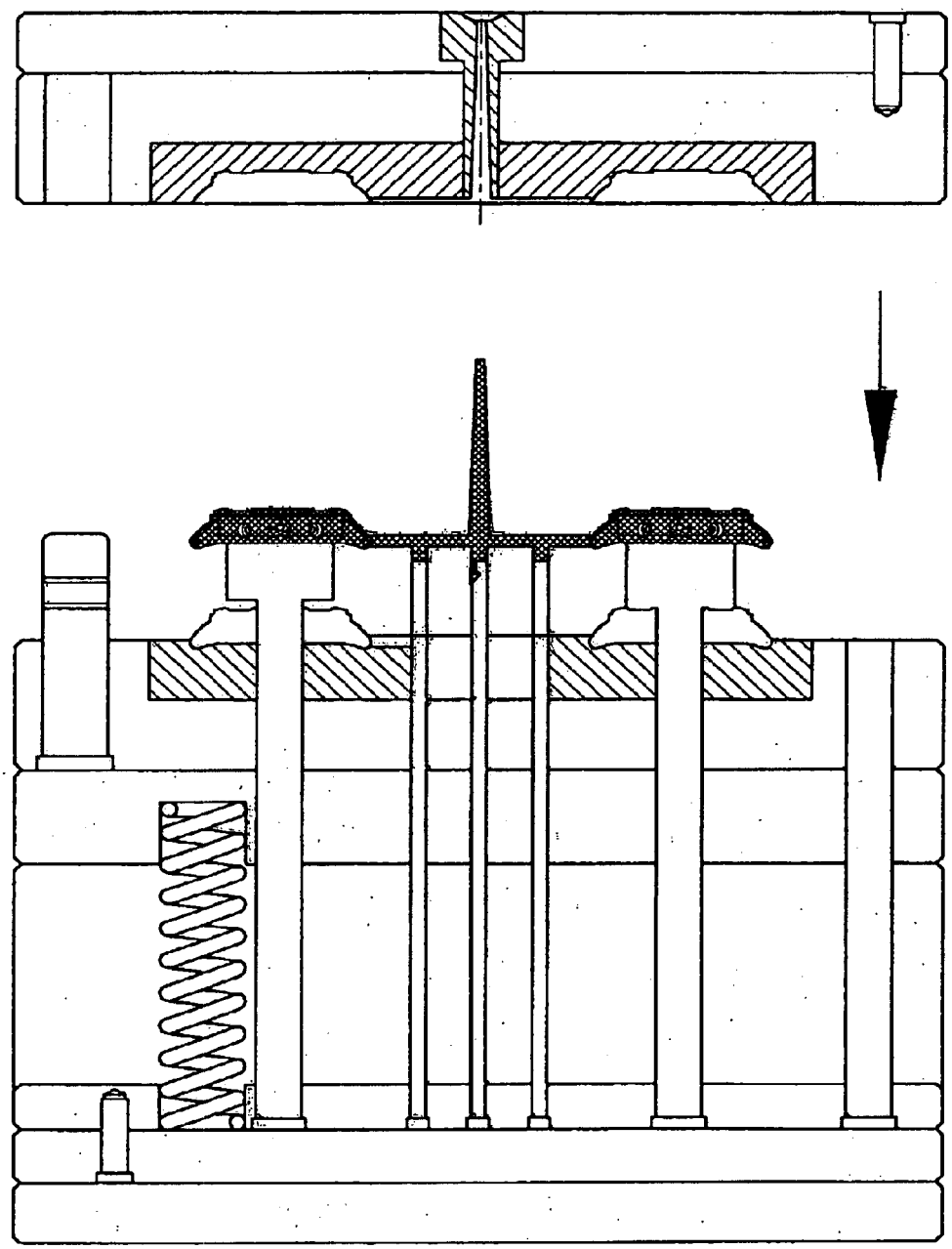

After the inner portion 12 is produced it is positioned in a mould 46 of an injection-moulding machine 48 as shown in FIGS. 13a and 13b. The mould 46 comprises an upper member 50 and a lower member 52 (as shown in FIG. 14b) which together define a cavity 54 in which the inner portion 12 is housed. The mould 46 defining the cavity 54 is sized and shaped with the desired characteristics to produce the link member 4. After the inner portion 12 is properly positioned in the lower member 52 of the mould 46, the upper member 50 of the mould 46 will move downward to engage with the lower member 52, defining the cavity 54 described above. A suitable fluid injection moldable material such as polymeric material, e.g. thermoplastic polyurethane, thermoplastic elastomer, acrylonitrile butadiene styrene, polycarbonate or polyvinyl chloride, or a synthetic or natural rubber material or a silicon compound, is then injected into the cavity 54. A channel 58 is provided in the upper member 50 through which the injection moldable material is injected into the mould cavity 54. Once the injection is completed, the inner portion 12 is at least partially enveloped in and/or molded over with the injection moldable material. The injection-molded material is then allowed to cool down and solidify so that the inner portion 12 and an outer portion 14 formed of the solidified material are fixedly secured together and become one continuous piece. The inner portion 12, which has been coated with a jacket of the solidified material, is then released by being pushed upwardly away from the mould by a push pin 60 as shown in FIG. 16b. In FIGS. 13a to 16b, two inner portions 12 are molded with the solidified material together. After being released from the mould 46, the jacketed inner portions are subject to trimming to remove the unnecessary solidified material and polishing to provide a finished appearance of the link member 4, a top view, a side view and an end view thereof are shown in FIGS. 17a to 17c.

The second-type link members 6 are produced using the same method as illustrated above.

The finished link members 4, 6 produced according to the steps described above and the fastener 8 may then be assembled together by the pins 10. The novel wristband 1 made in accordance with the present invention provides an unusual aesthetic appearance. Surfaces of the exposed inner portion 12 (of each link member 4), which is made principally of stainless steel, provide metallic appearance. The stainless steel may be electroplated with a material having a gold or silver color. Various color additives may be added to the injection moldable material before injection moulding and the outer portion 14 of the link members may thus have such color. As can be seen, a band made according to the present invention is capable of having a very wide combination of colors from the exposed surfaces of the metallic inner portion, and the injection-molded jacket allows the design of many different patterns or ornament. It is to be noted that the exposed surface of the inner portion of each of link member 4, 6 includes an exposed top surface and side surfaces as shown in FIGS. 17a to 17c. The shape of the inner portion 12 may be designed so that different combinations of surfaces may be exposed after the moulding step.

Second and third embodiments of a component for a watch and a method of manufacture thereof according to the present invention are shown in FIGS. 18a to 34c and FIGS. 35a to 51c respectively. The component in these two embodiments is also a wristband. In these two embodiments, construction of its link members, wristbands and method of manufacture thereof are generally similar to that of the first embodiment as explained above and illustrated in FIGS. 1a to 17c and are therefore not repeated here. However, it is to be noted that the link members in the second and third embodiments are of different shapes and dimensions and the exposed surfaces of the inner portion of the link members are different. In the second embodiment, the wristband shown therein is formed of third and fourth link members together with a fastener and pins. In the third embodiment, the wristband shown therein is formed of fifth, sixth and seventh link members together with a fastener and pins. As a result, the overall appearance of the wristbands in these two embodiments produces a different aesthetic appearance.

Figure 58A:
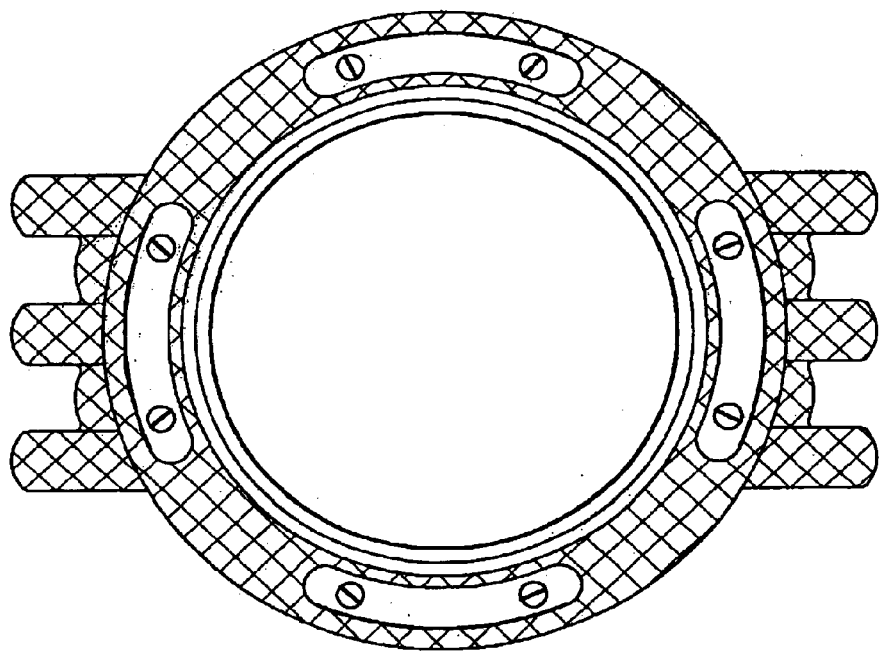
FIGS. 58a to 58b are different views of the watchcase produced from the steps illustrated in FIGS. 57a to 57g.
Figure 58B:
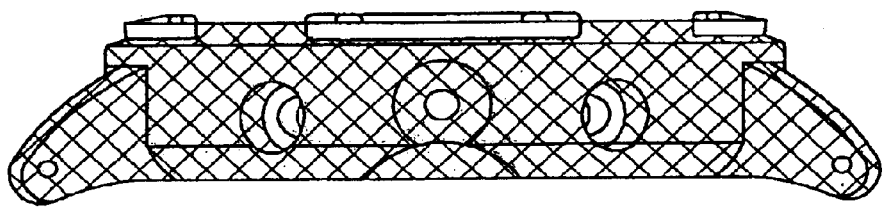
Figure 59B:
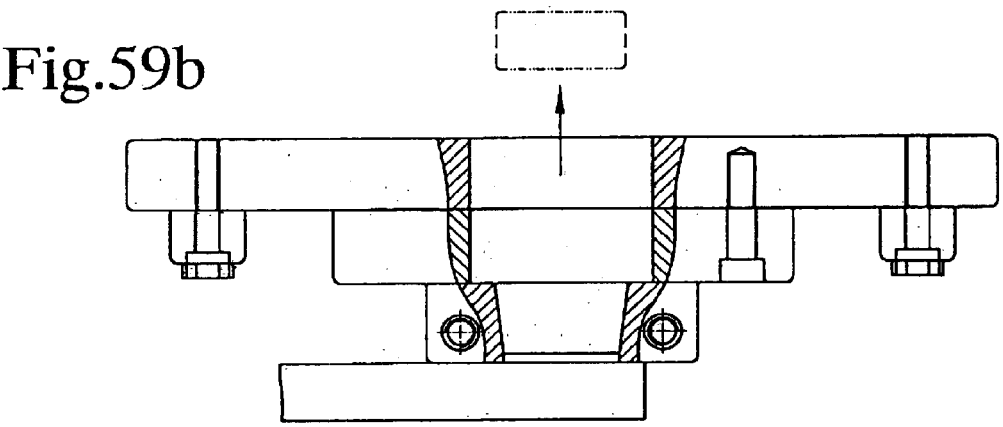
FIGS. 59a to 59h show a series of steps for producing an interior portion of a watchcase according to a fifth embodiment of the present invention.
Figure 59B:
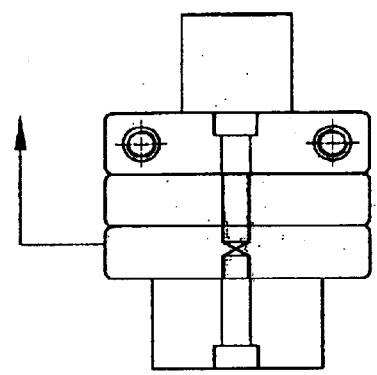
Figure 59A:
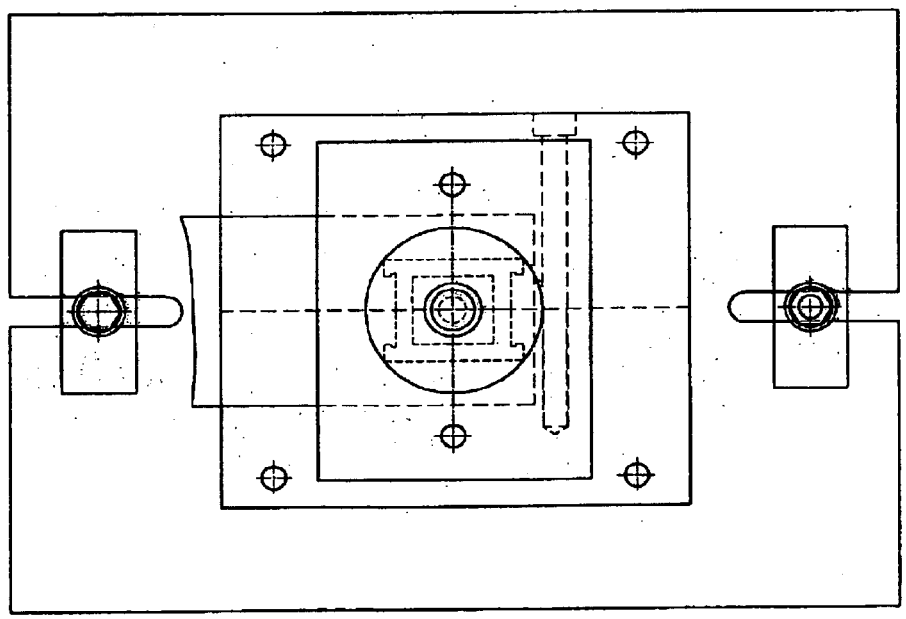
Figure 59D:
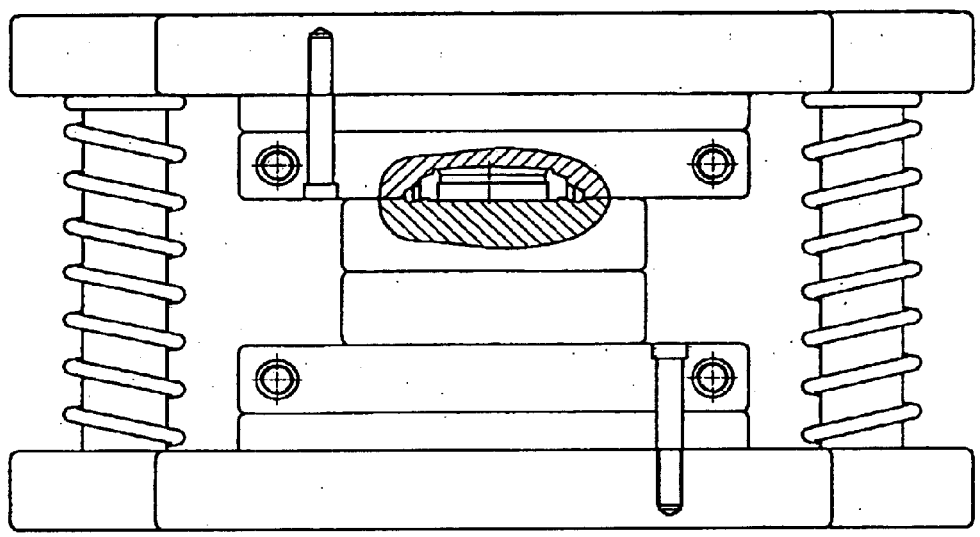
Figure 59C:
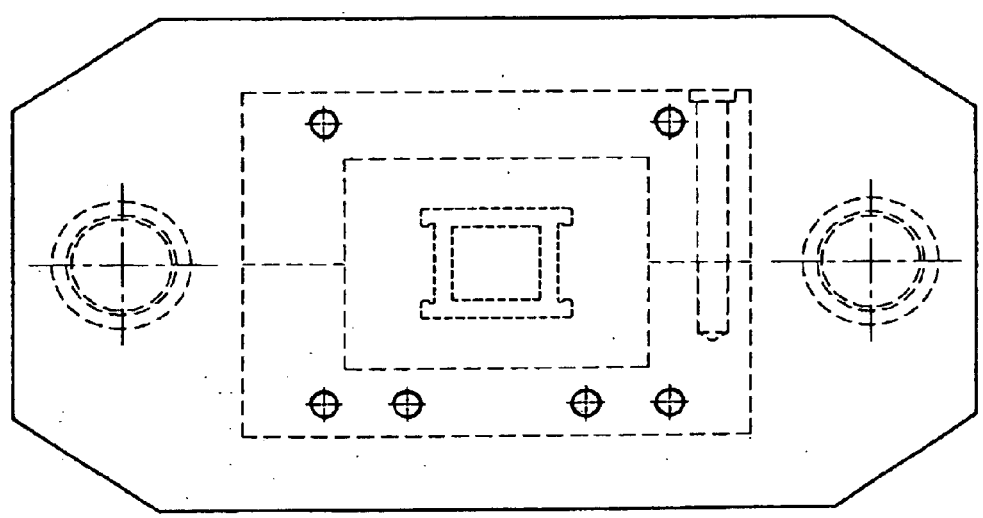
Figure 59F:
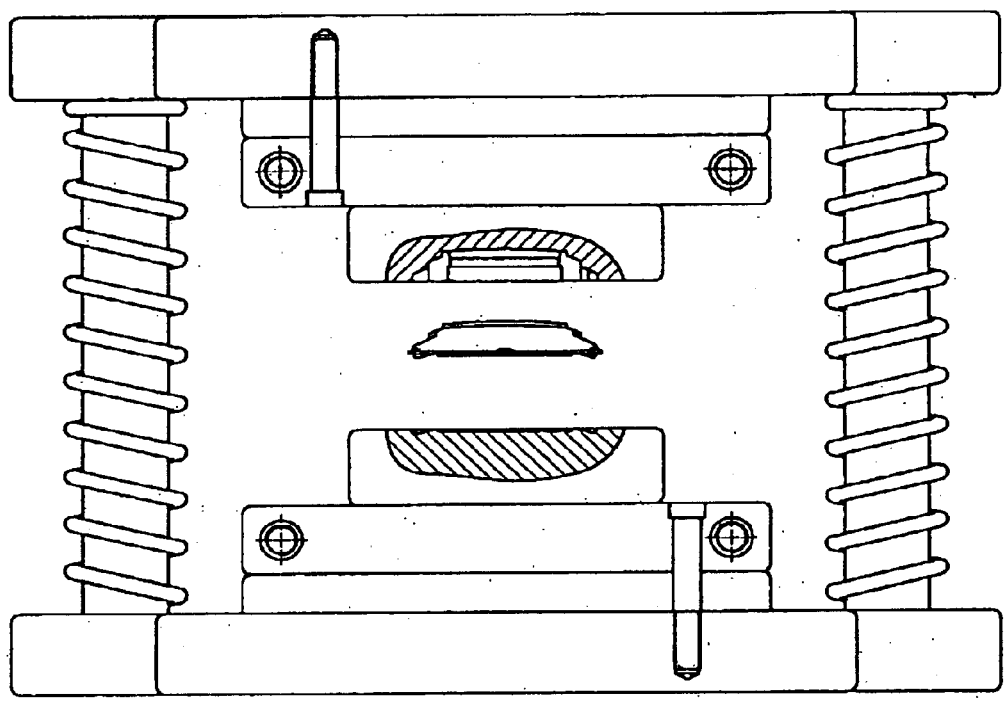
Figure 59E:
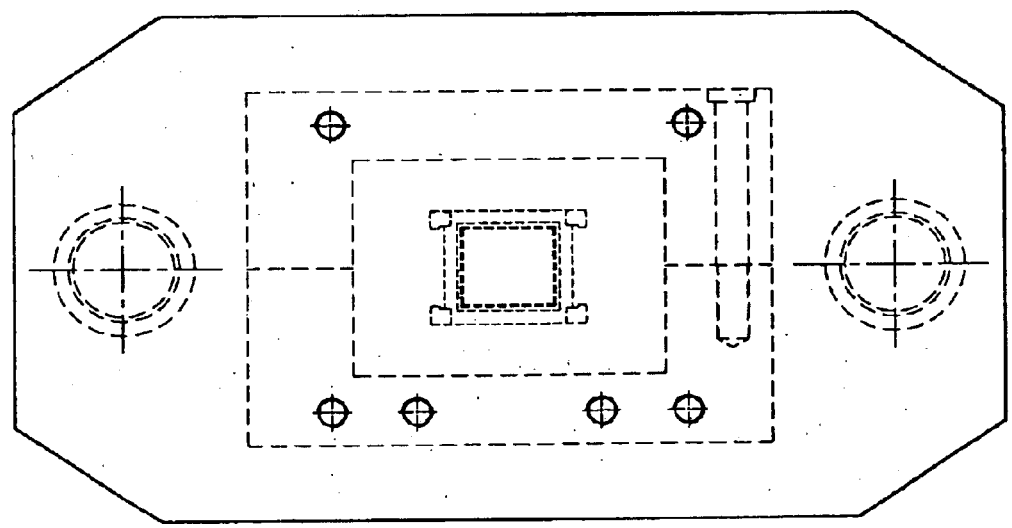
Figure 59H:
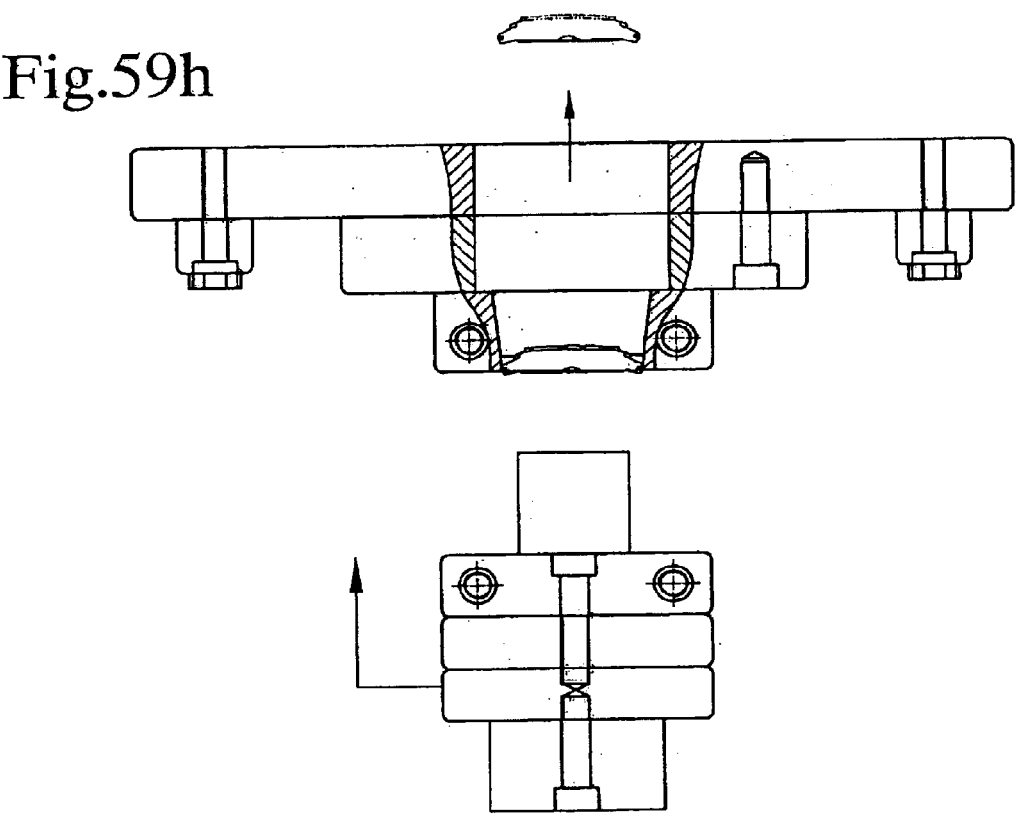
Figure 59G:
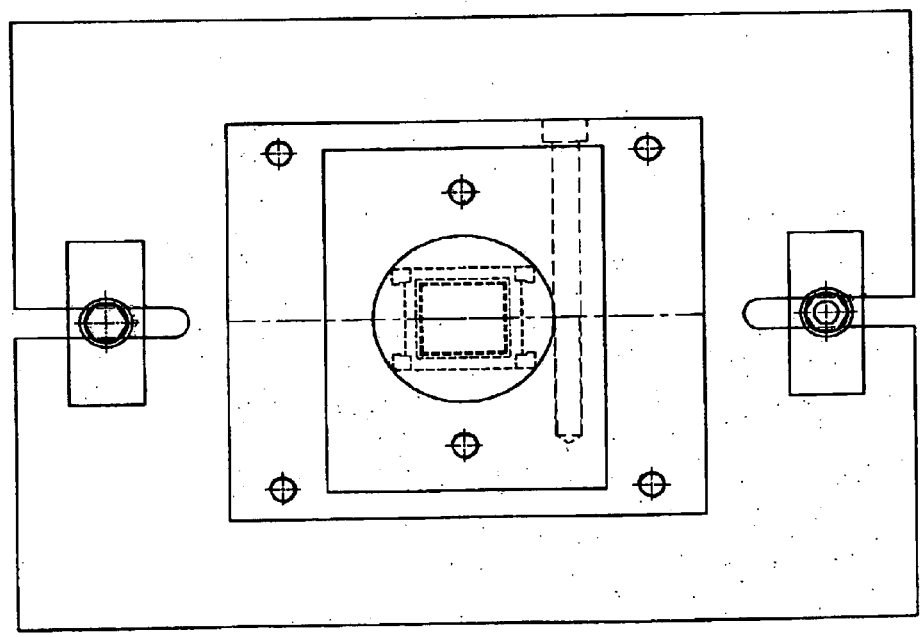
Figure 59I:
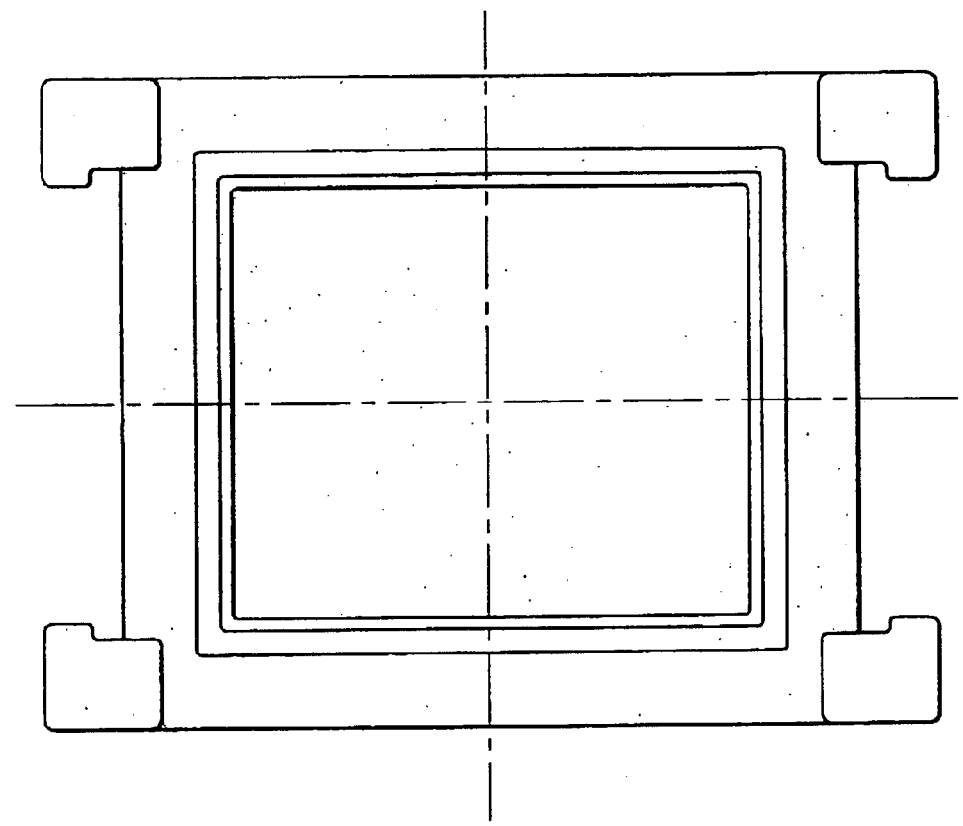
FIGS. 59i to 59j are different views of the interior portion produced from the steps illustrated in FIGS. 59a to 59h.
Figure 59J:
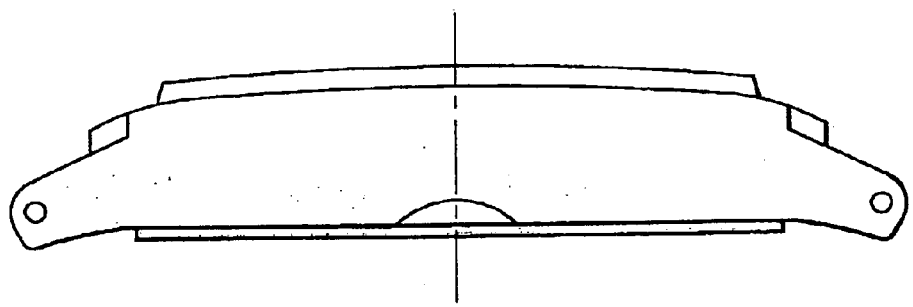
Figure 60B:
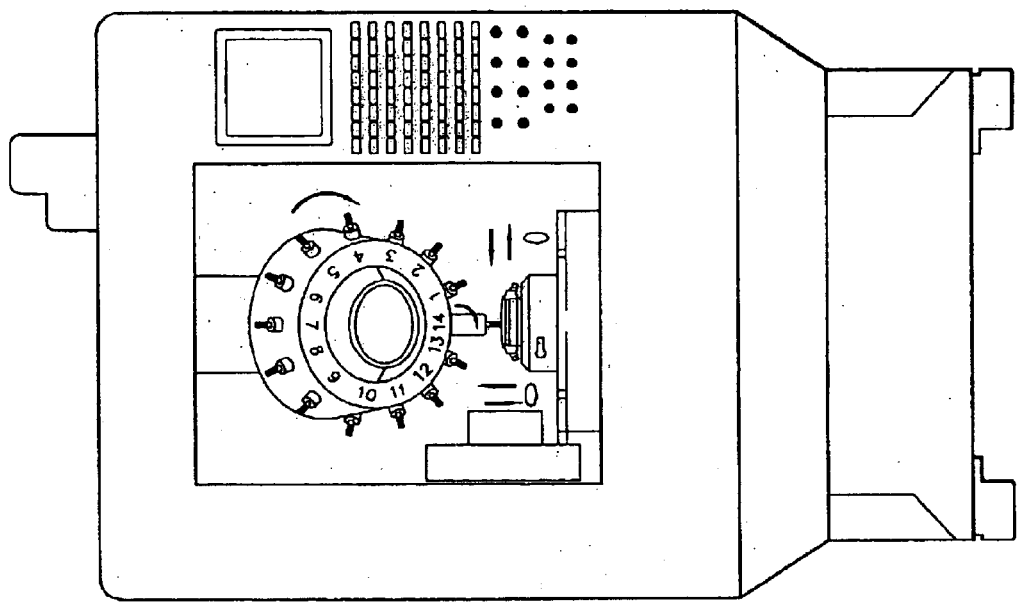
FIGS. 60a to 60b show a series of steps for further processing the interior portion shown in FIGS. 59i to 59j.
Figure 60A:
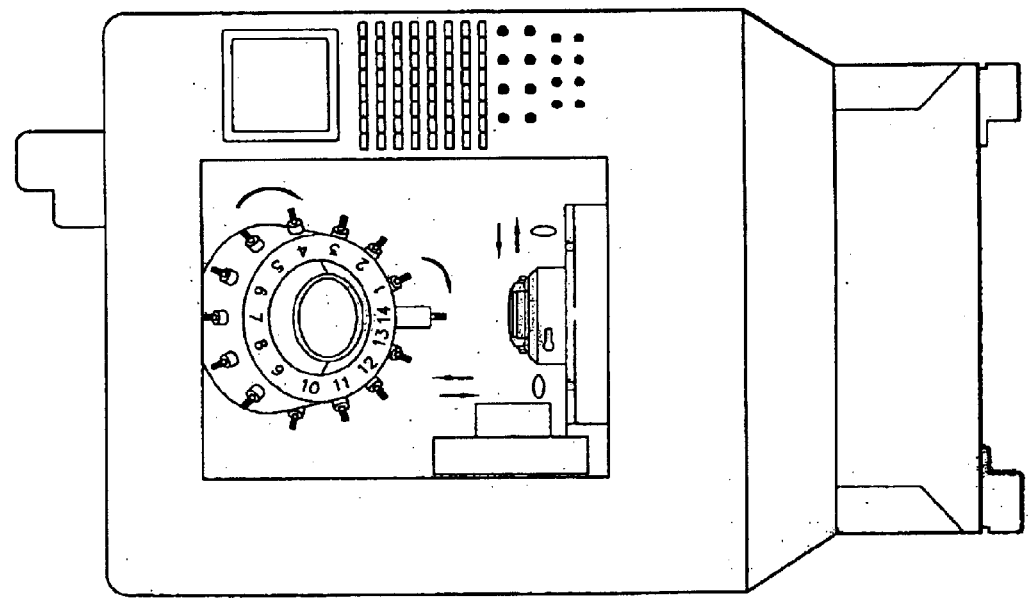
Figure 60C:
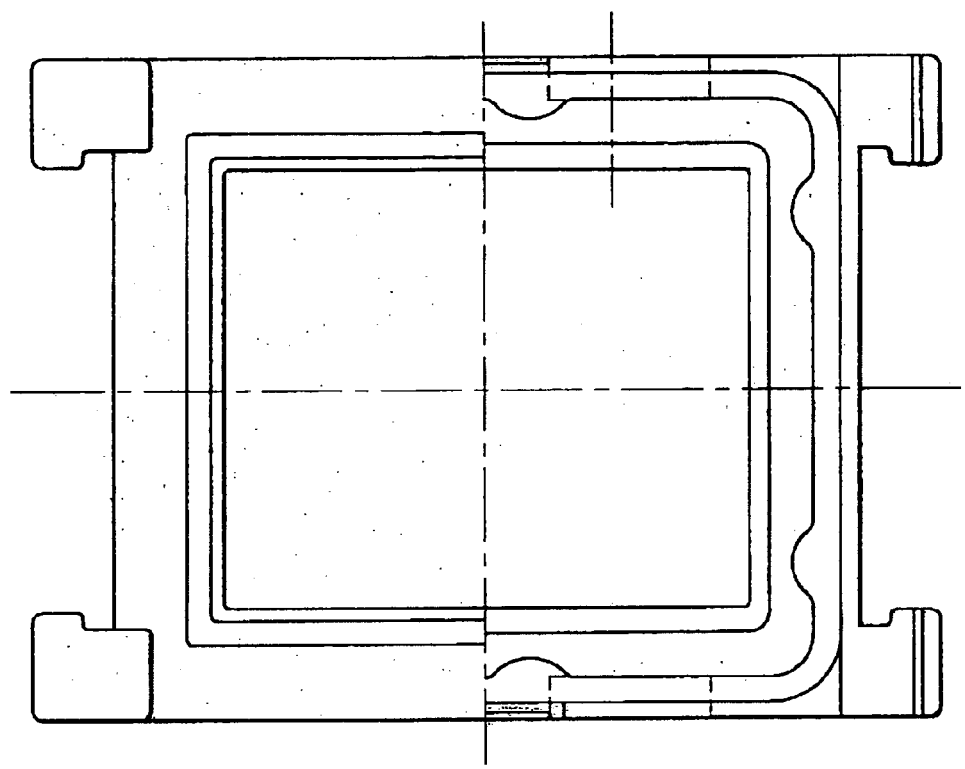
FIGS. 60c to 60d are different views of the interior portion produced from the steps illustrated in FIGS. 60a to 60b.
Figure 60D:
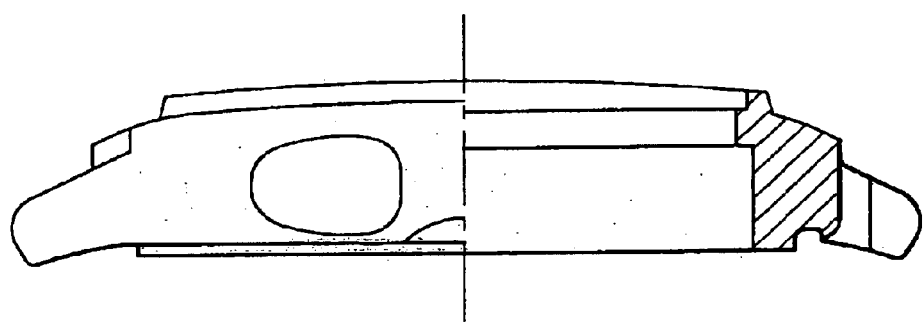
Figure 61F:
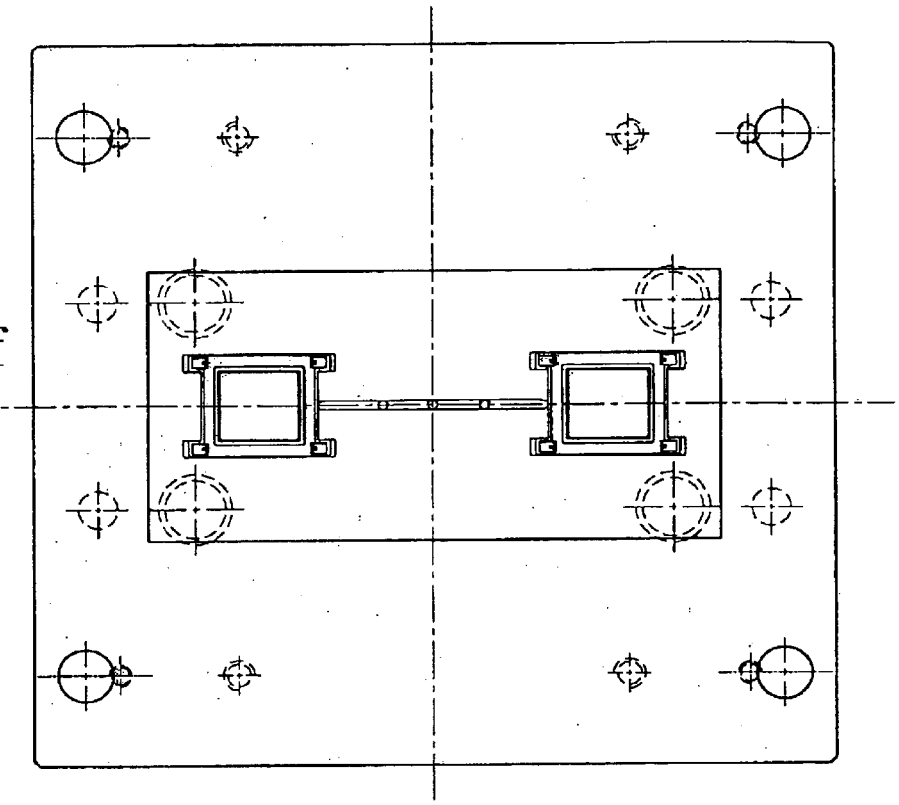
FIGS. 61e to 61k show a series of steps for moulding an exterior portion onto the interior portion of the watchcase shown in FIGS. 60c to 60d.
Figure 61E:
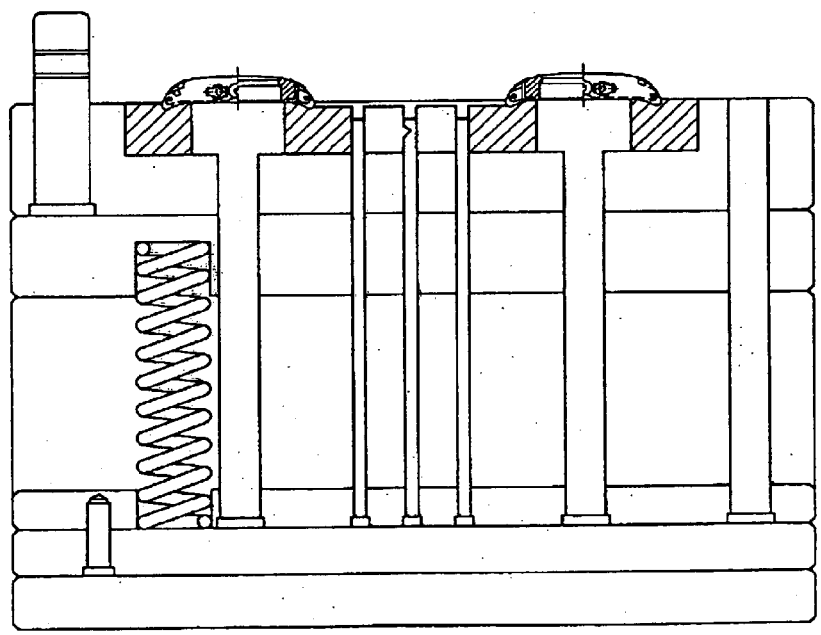
Figure 61H:
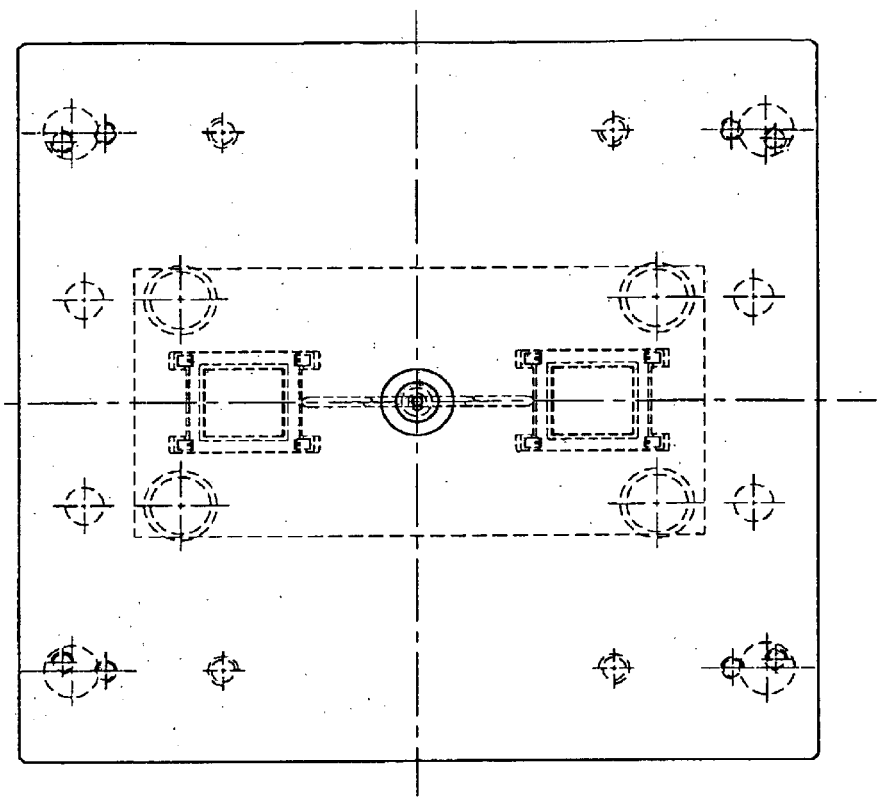
Figure 61G:
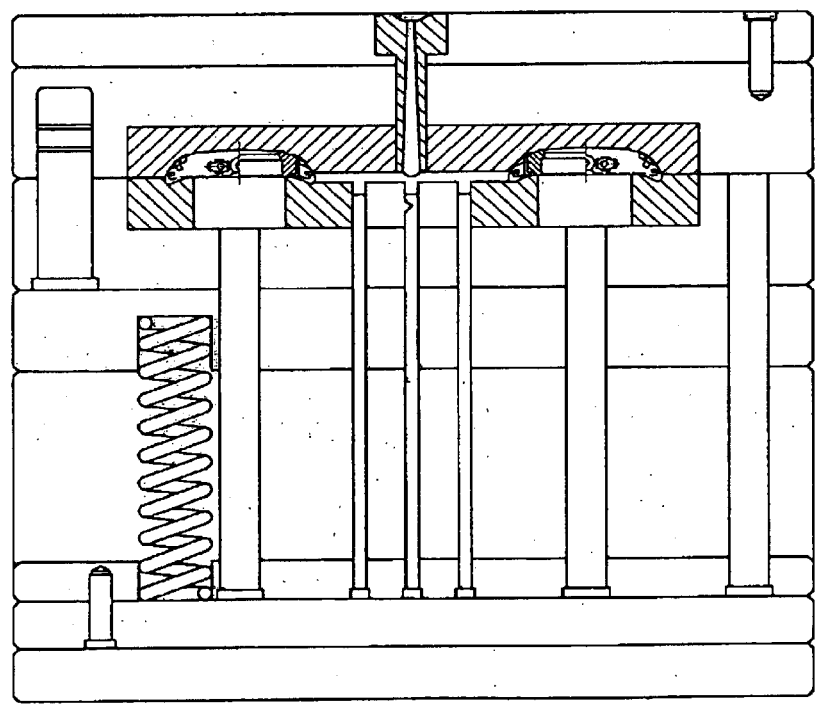
Figure 61J:
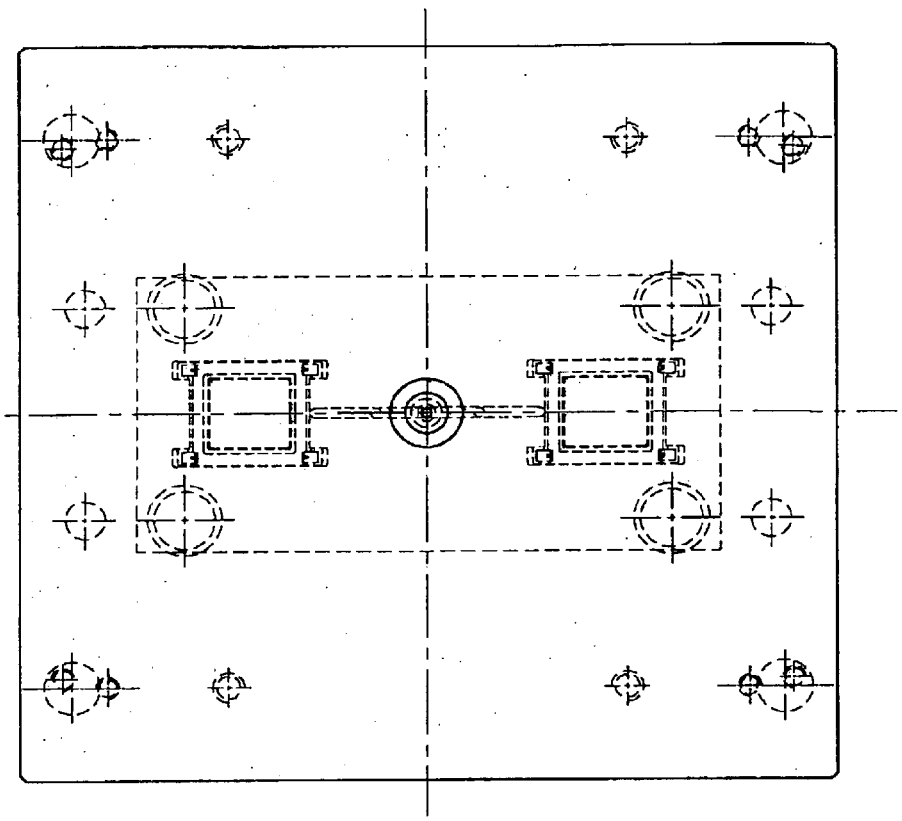
Figure 61I:
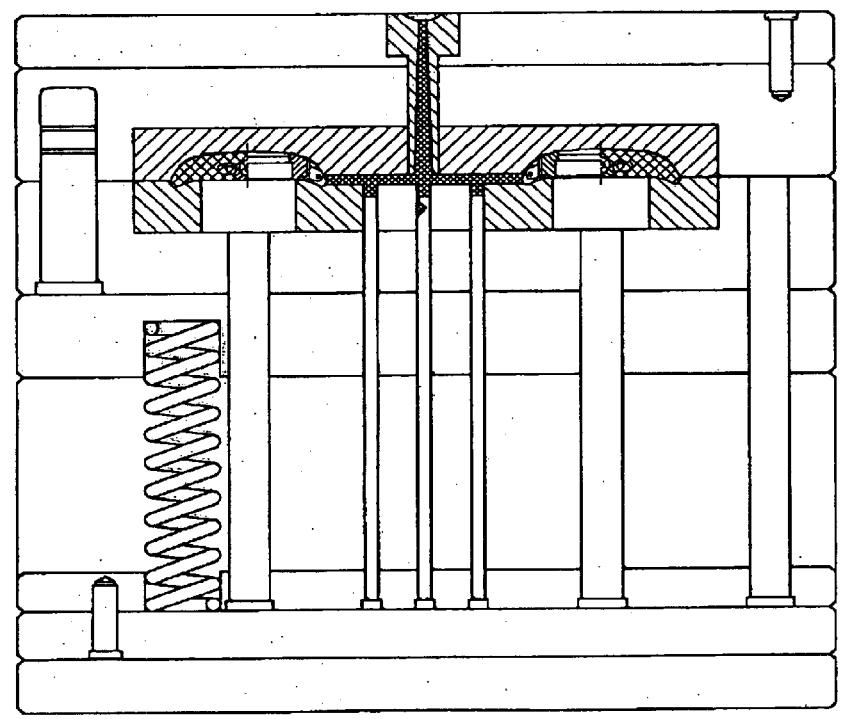
Figure 61K:
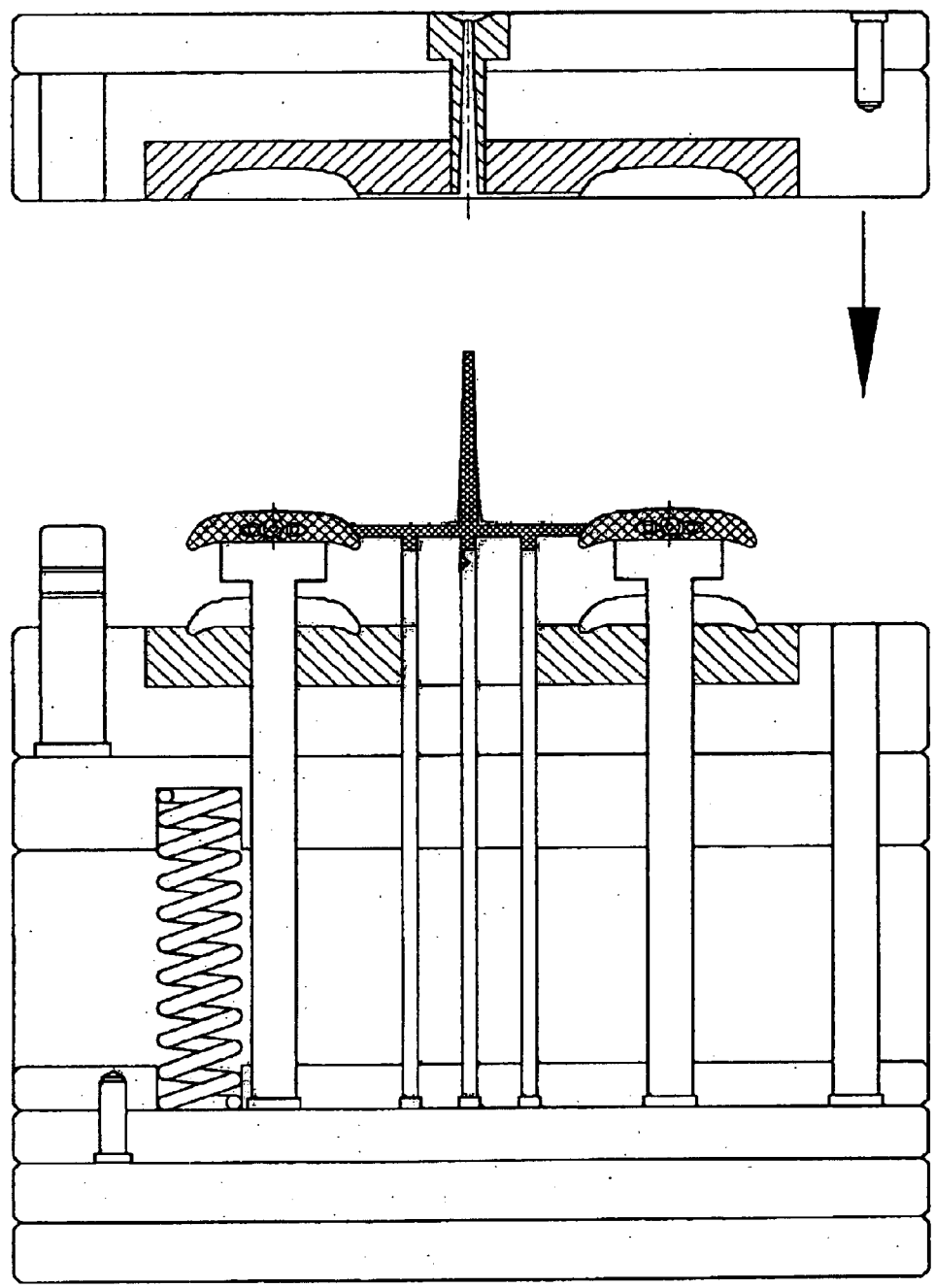
Figure 61L:
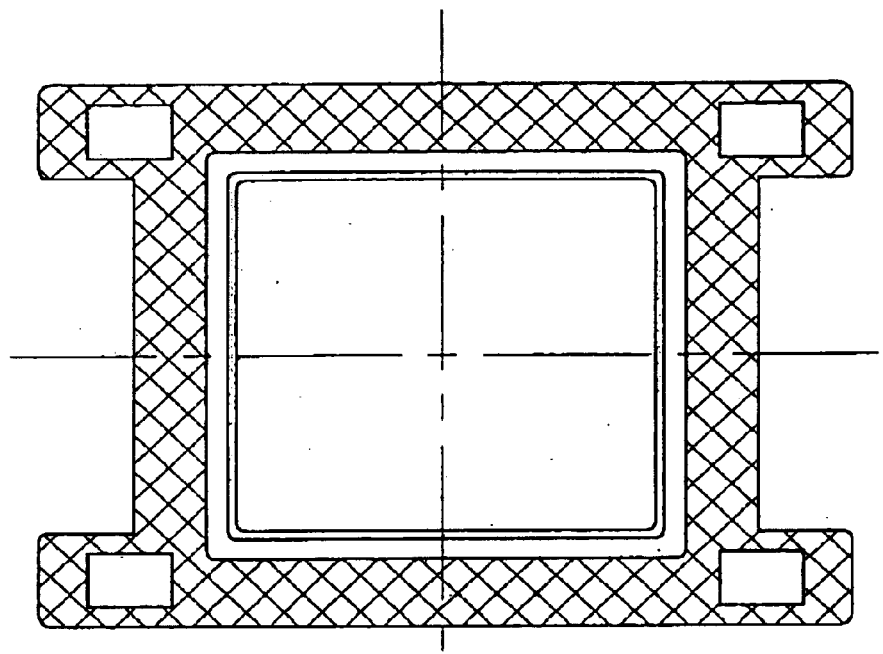
FIGS. 61l to 61m are different views of the watchcase produced from the steps illustrated in FIGS. 61e to 61k.
Figure 61M:
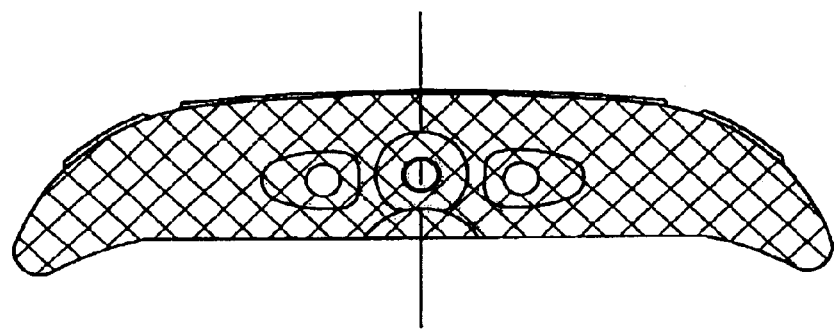
Figure 62B:
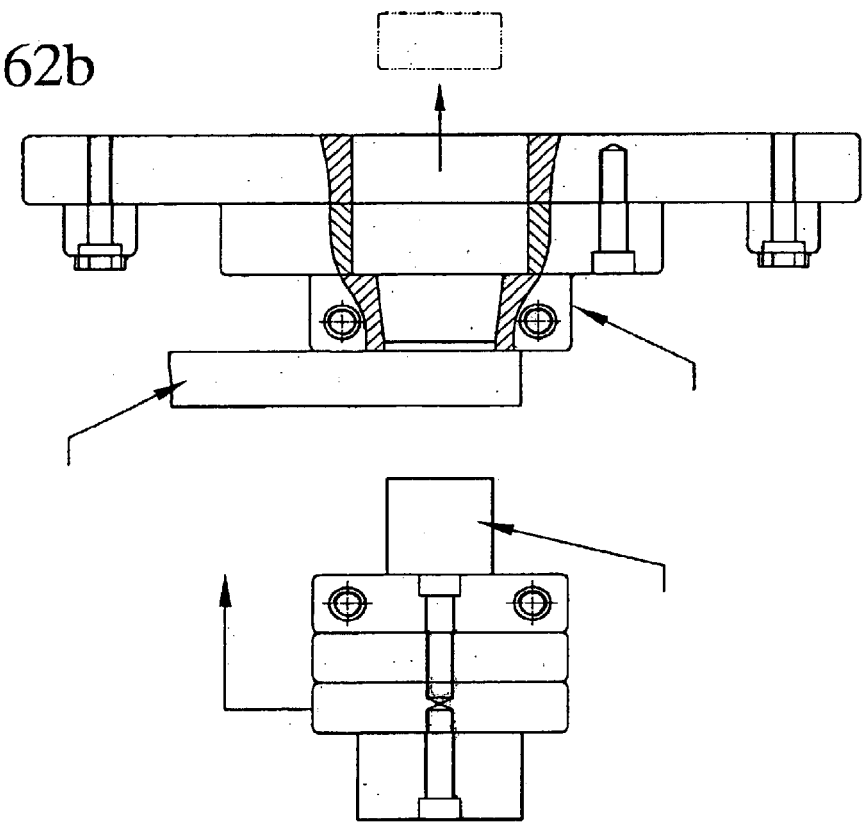
FIGS. 62a to 62h show a series of steps for producing interior portion of a watchcase according to a sixth embodiment of the present invention.
Figure 62A:
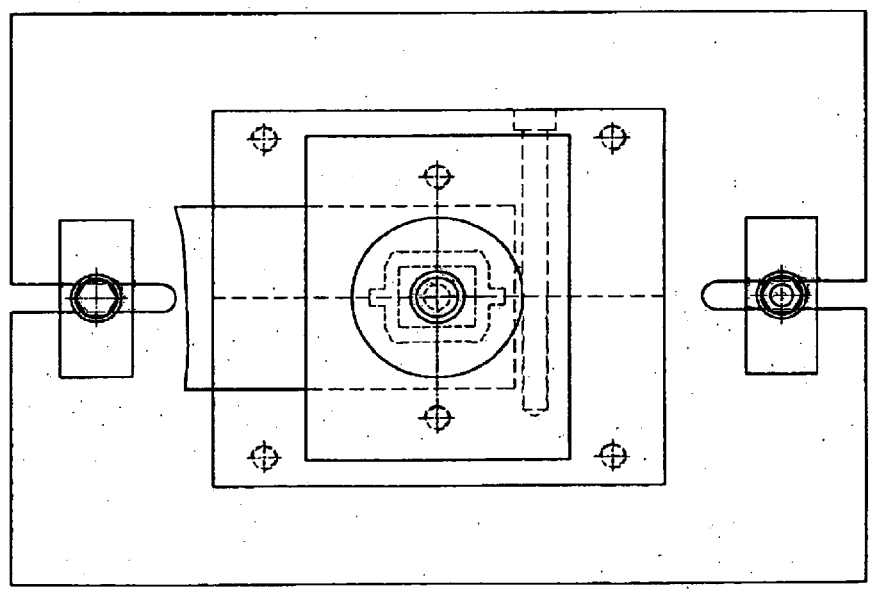
Figure 62D:
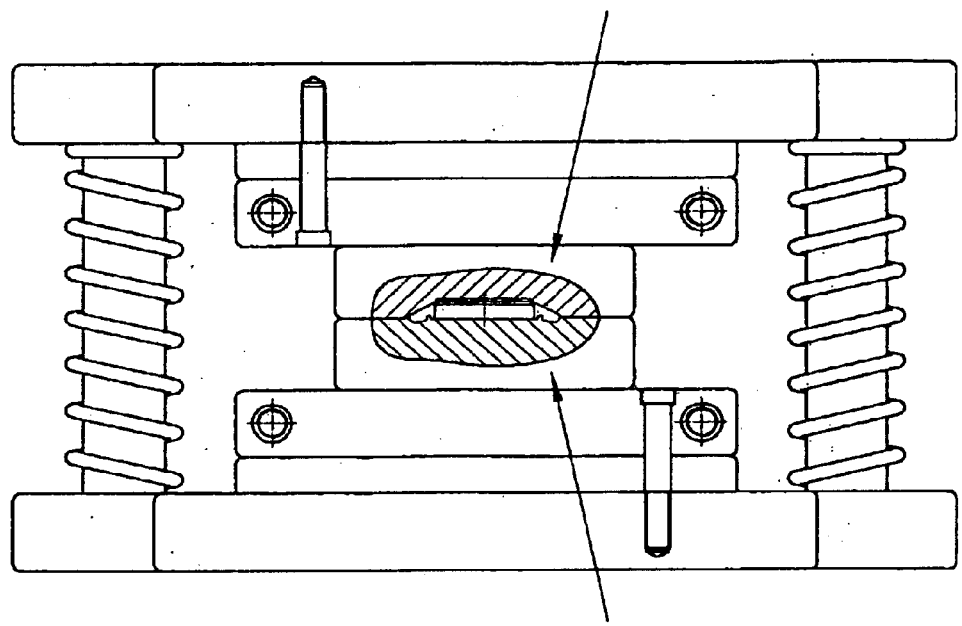
Figure 62C:
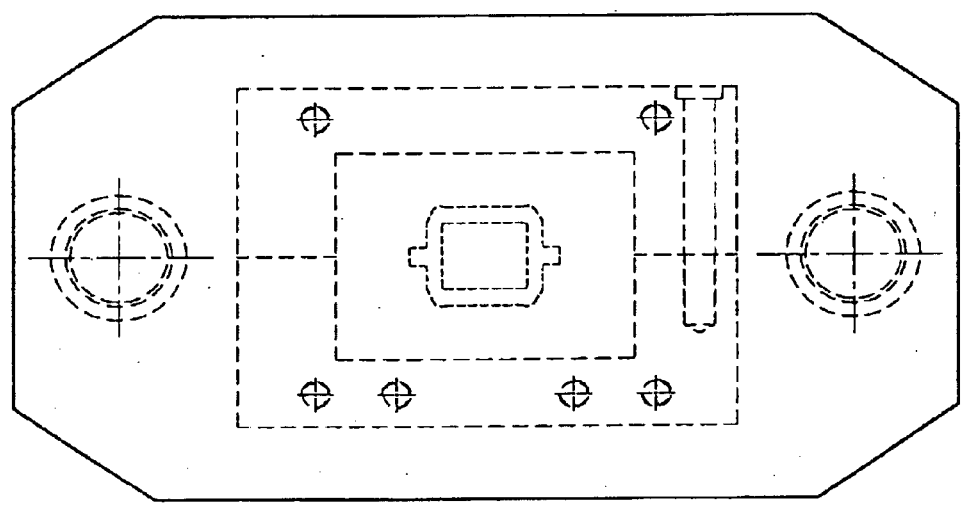
Figure 62F:
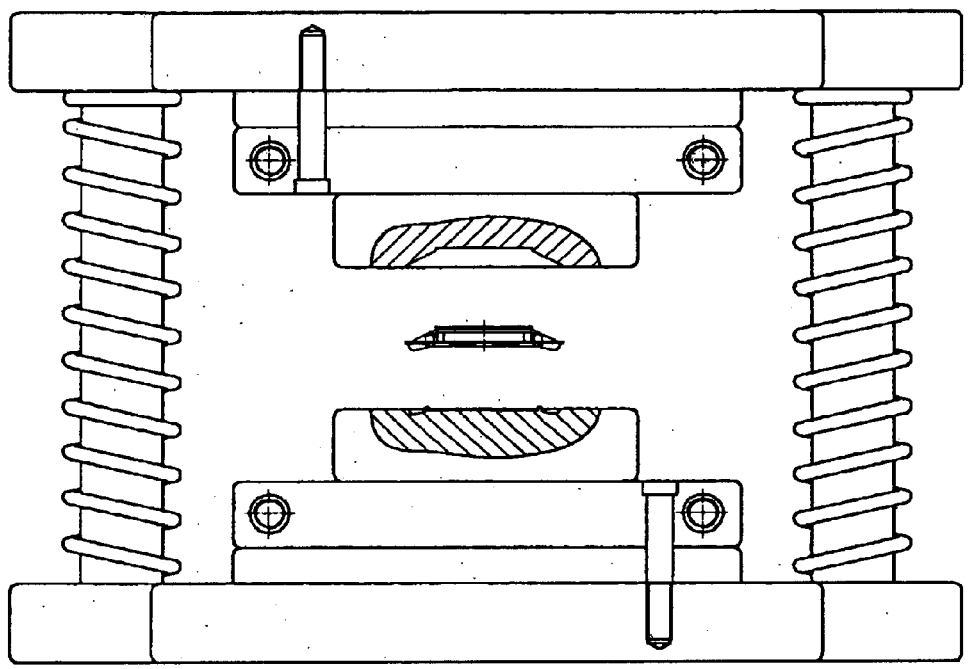
Figure 62E:
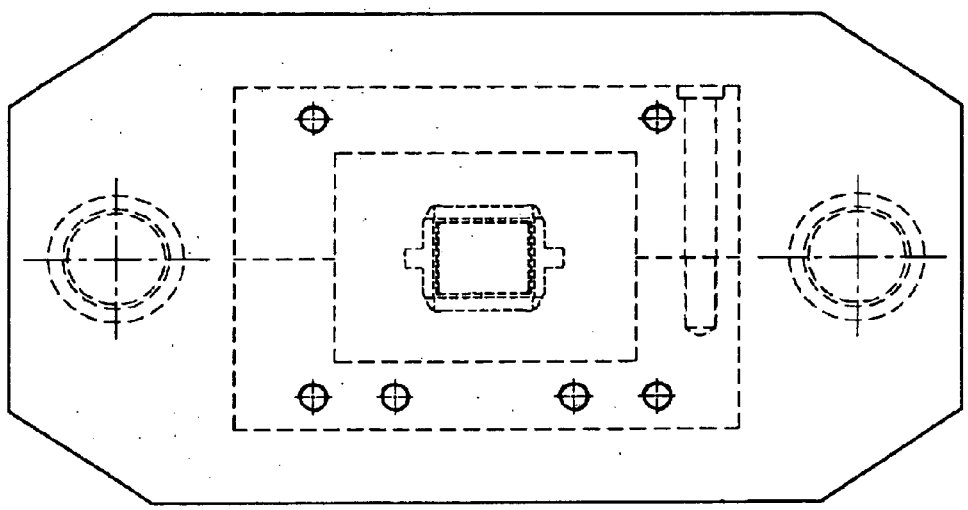
Figure 62H:
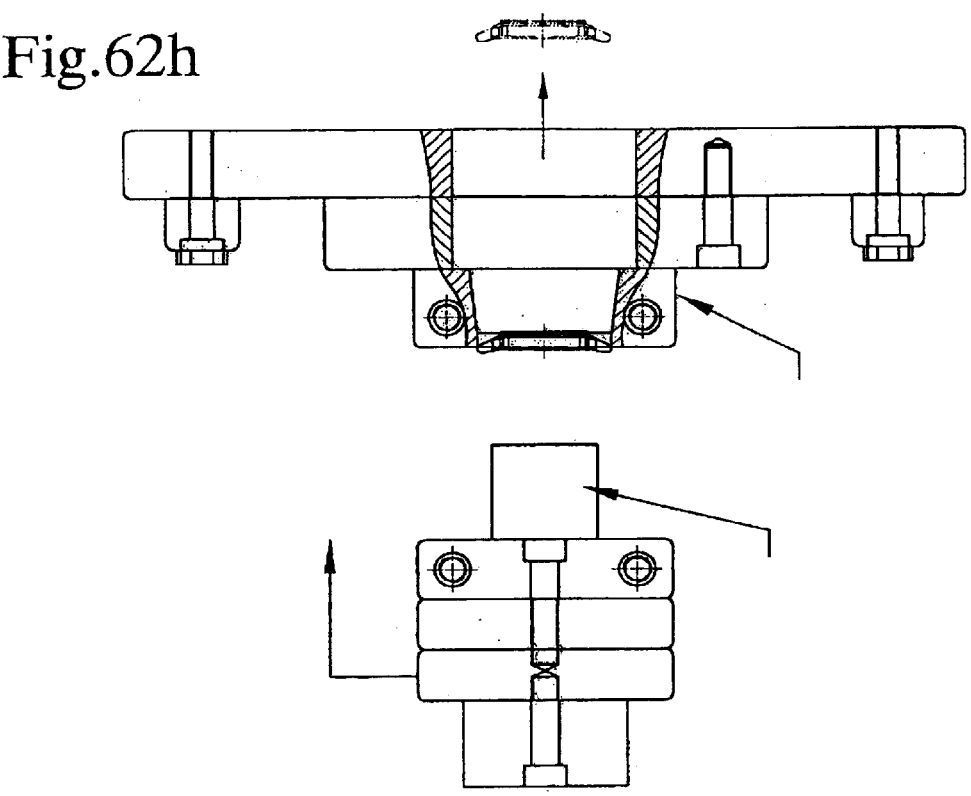
Figure 62G:
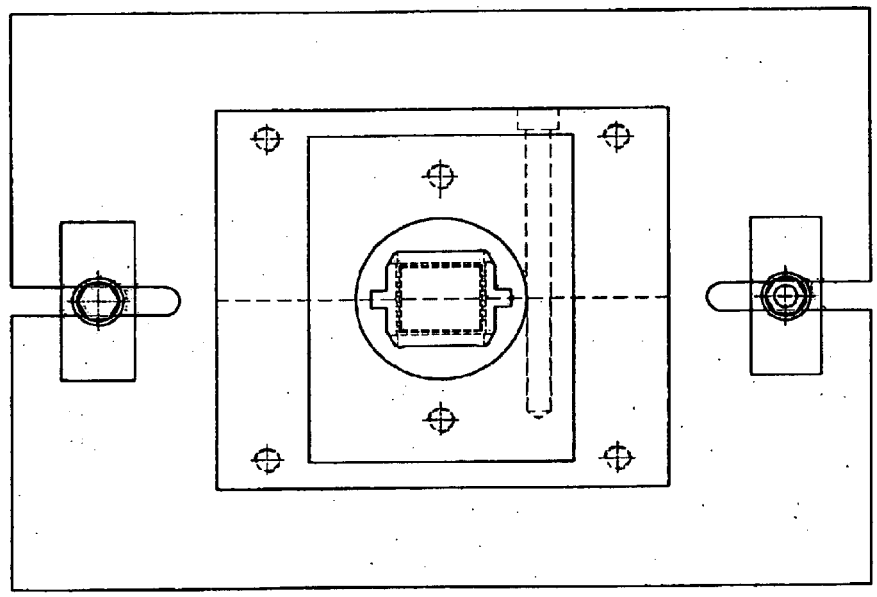
Figure 62I:
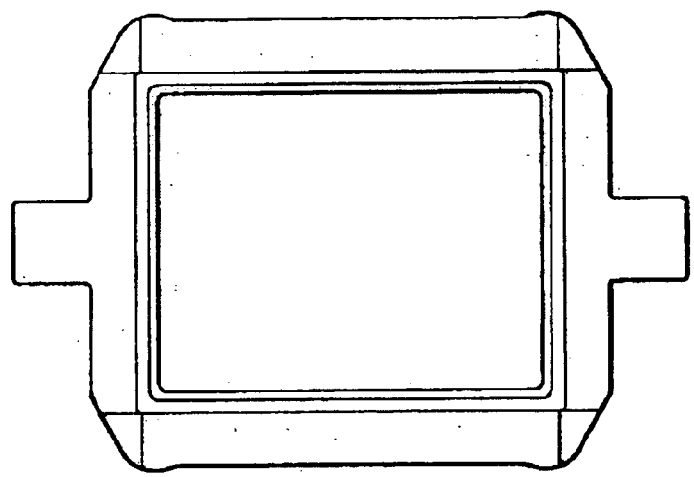
FIGS. 62i to 62j are different views of the interior portion produced from the steps illustrated in FIGS. 62a to 62h.
Figure 62J:
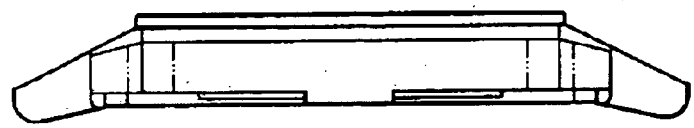
Figure 63B:
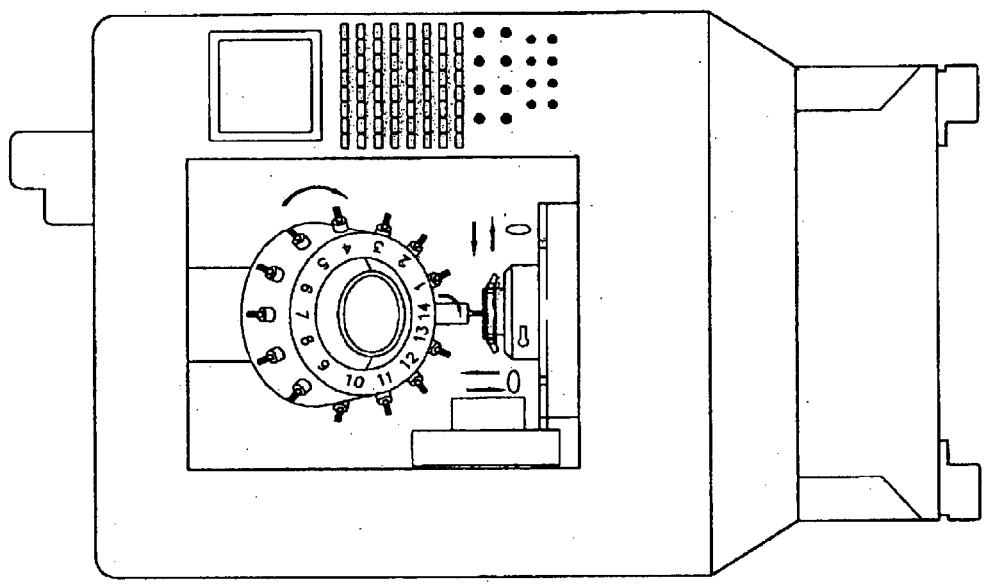
FIGS. 63a to 63b show a series of steps for further processing the interior portion shown in FIGS. 62i to 62j.
Figure 63A:
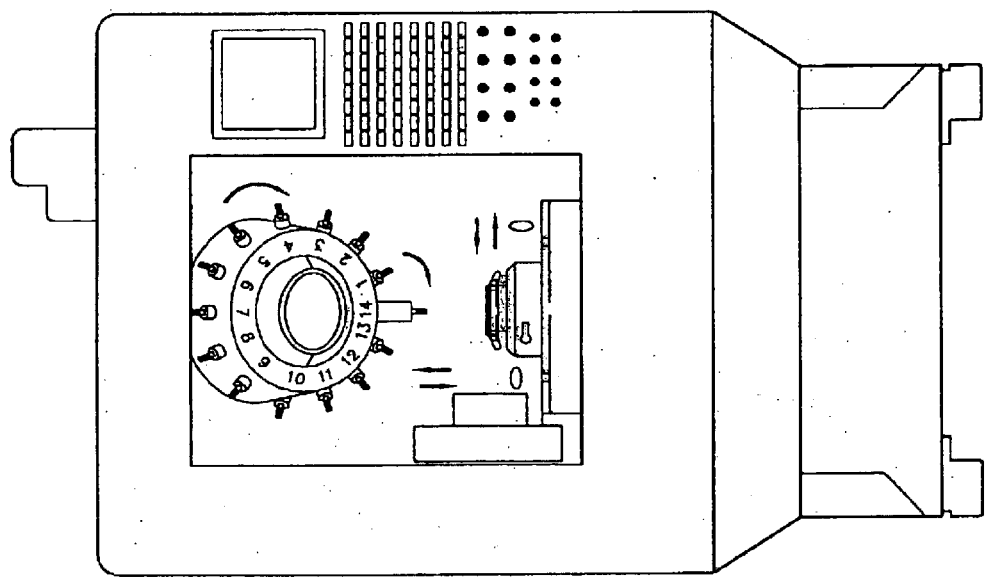
Figure 63C:
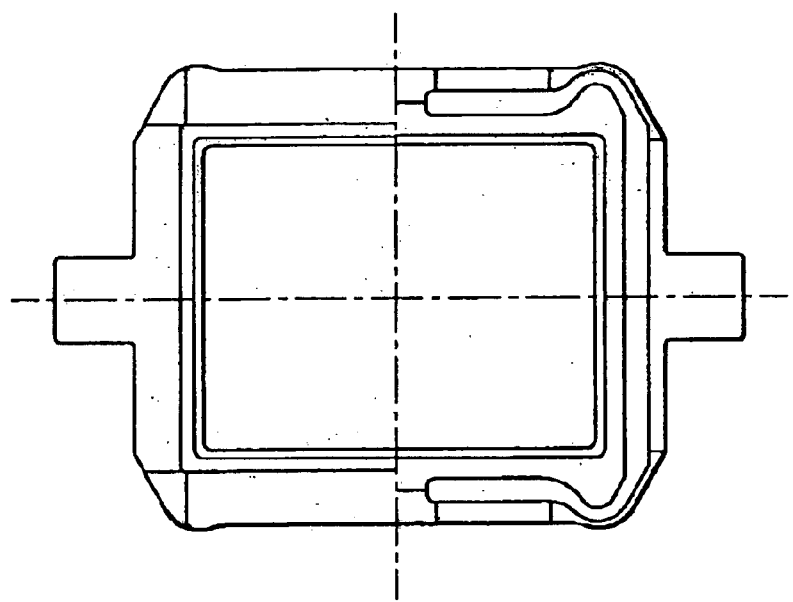
FIGS. 63c to 63d are different views of the interior portion produced from the steps illustrated in FIGS. 63a to 63b.
Figure 63D:
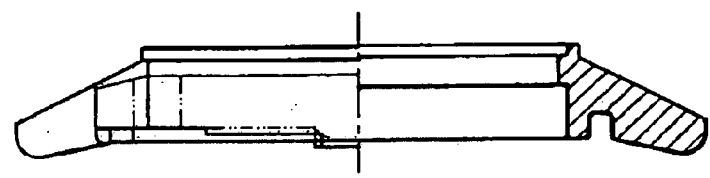
Figure 64A:
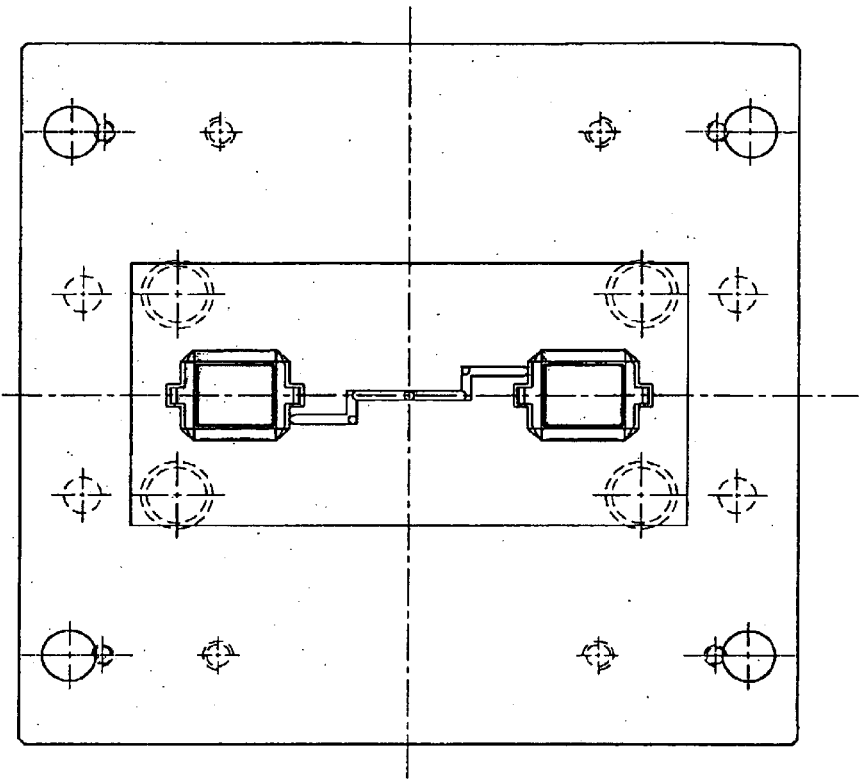
FIGS. 64a to 64g show a series of steps for moulding an exterior portion onto the interior portion of the watchcase shown in FIGS. 63c to 63d.
Figure 64B:
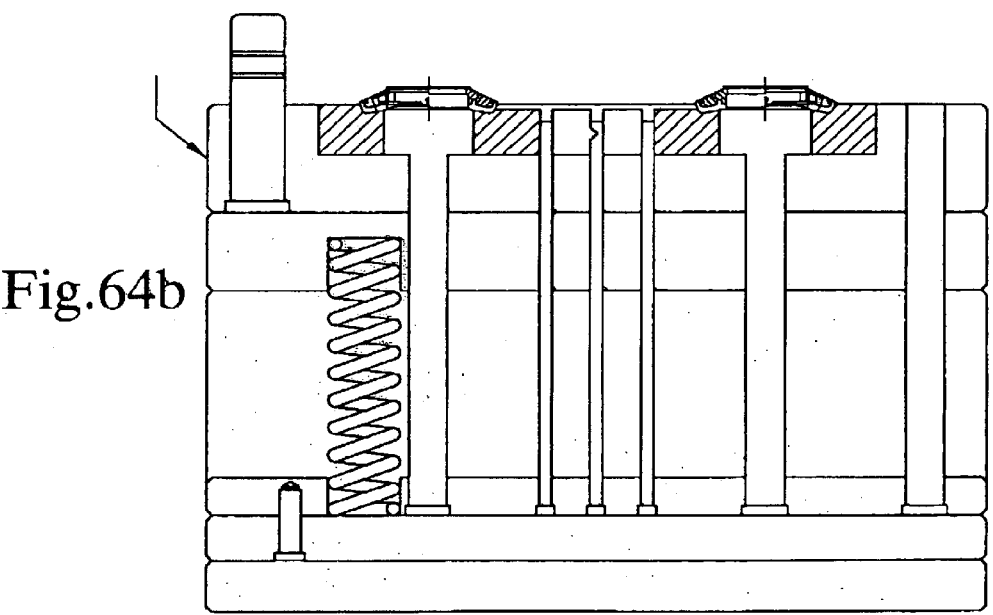
Figure 64C:
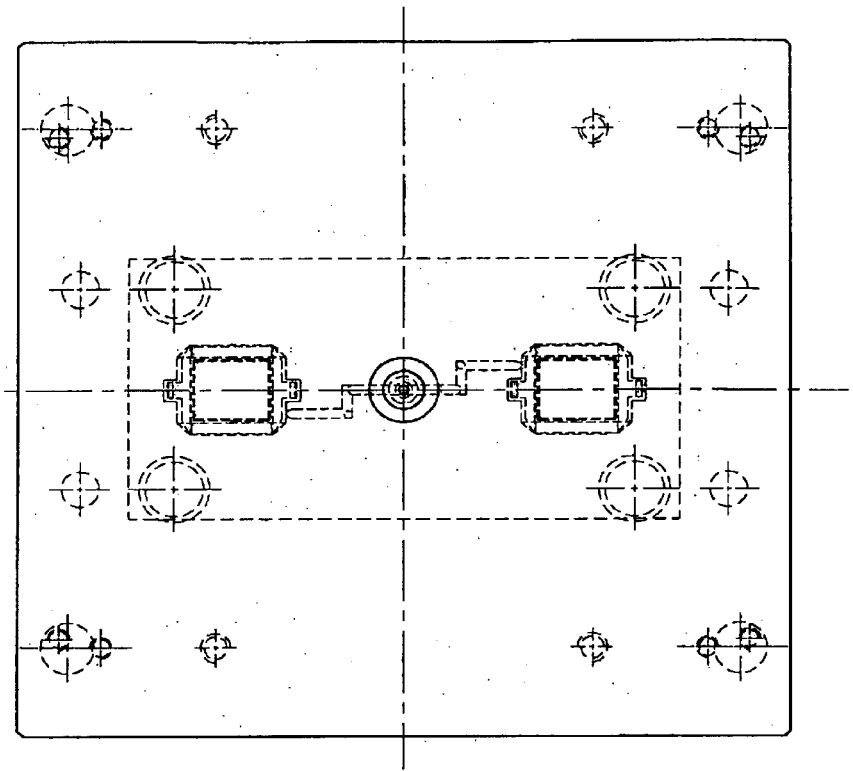
Figure 64D:
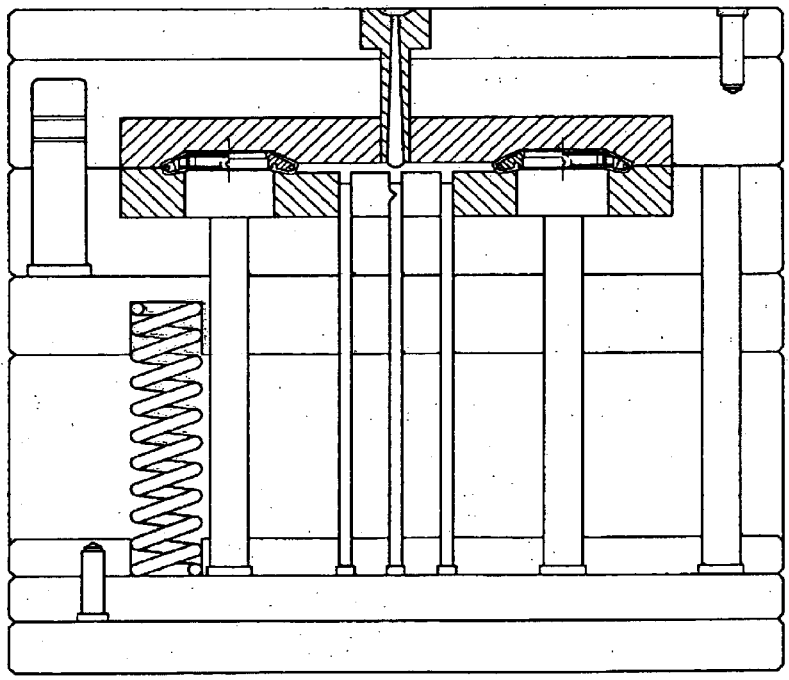
Figure 64E:
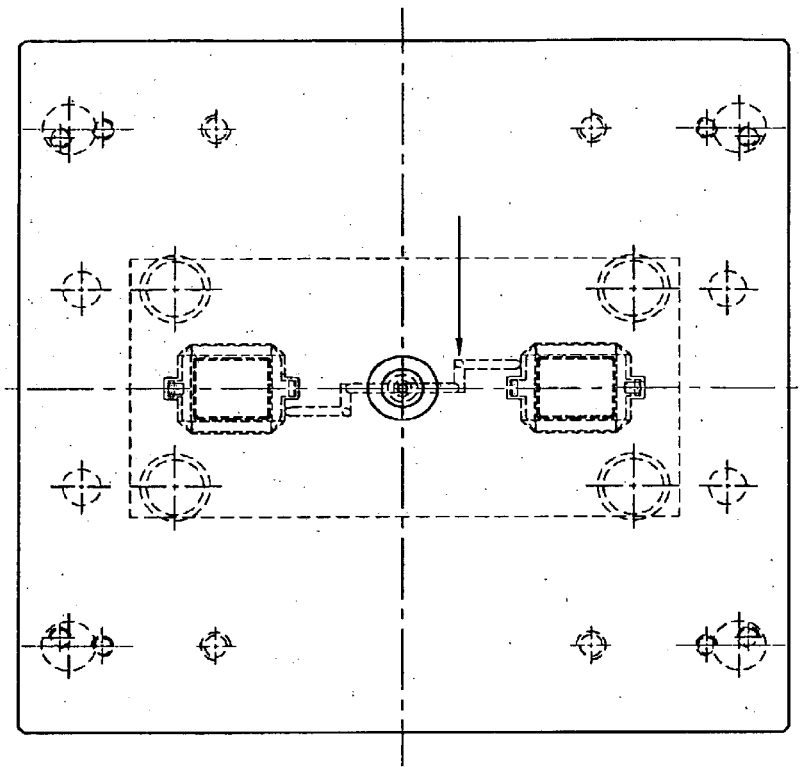
Figure 64F:
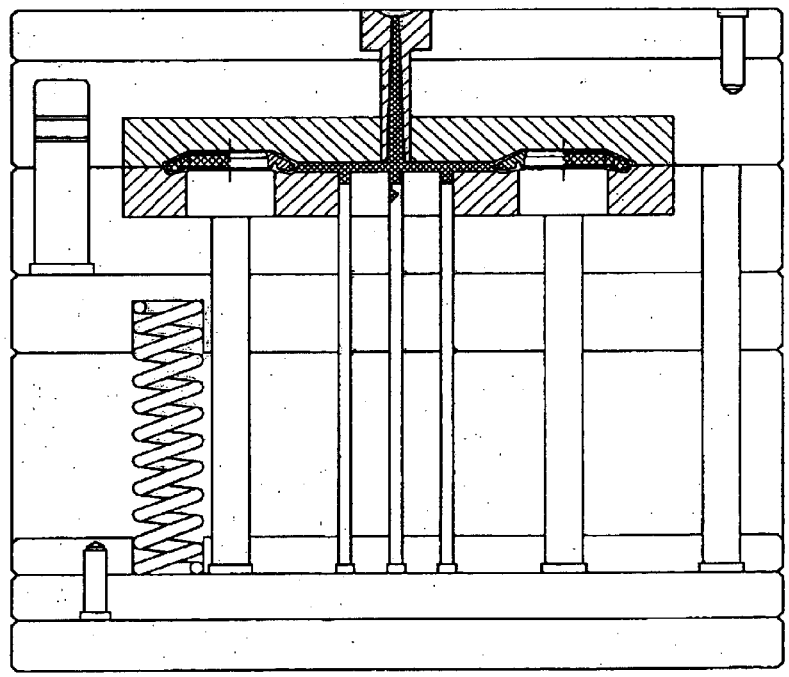
Figure 64G:
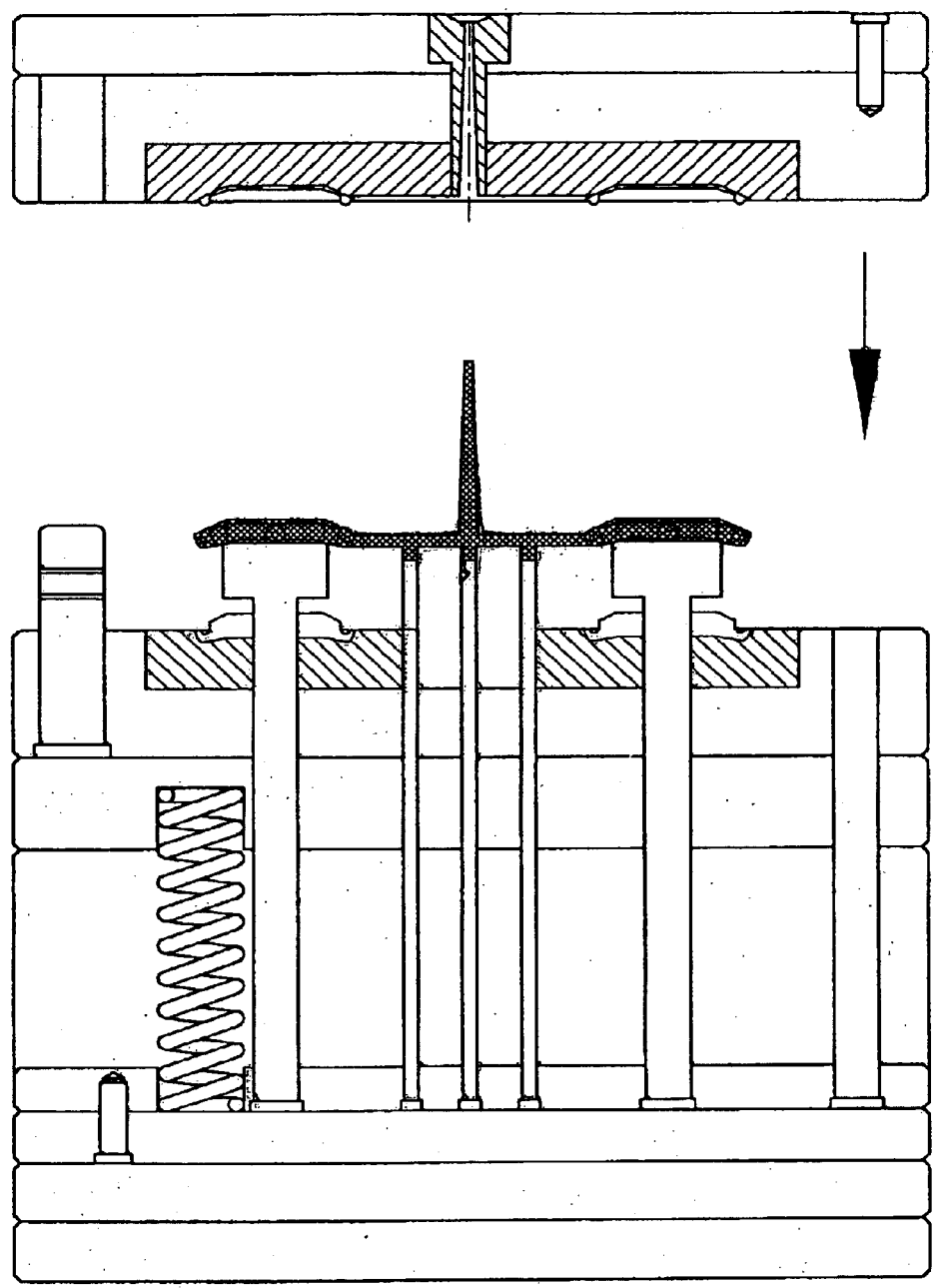
Figure 64H:
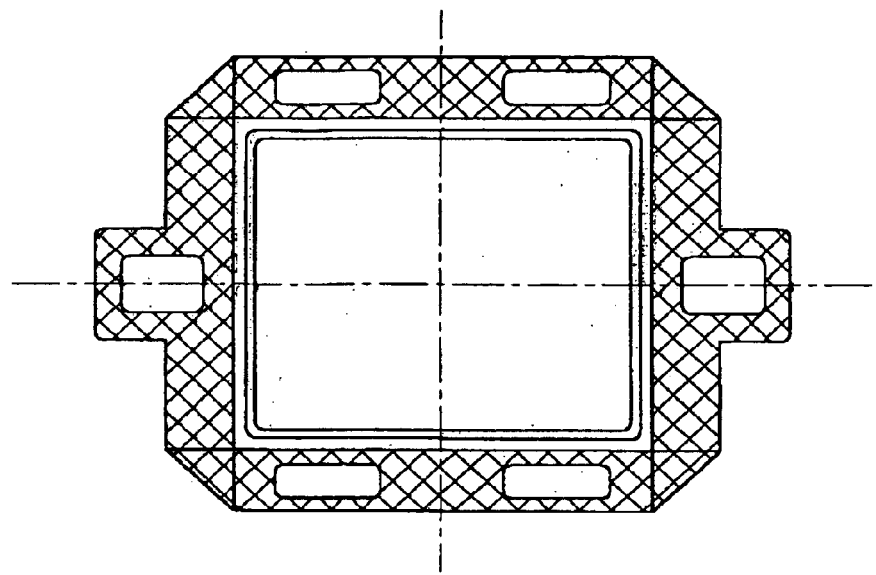
FIGS. 64h to 64i are different views of the watchcase produced from the steps shown in FIGS. 64a to 64g.
Figure 64I:
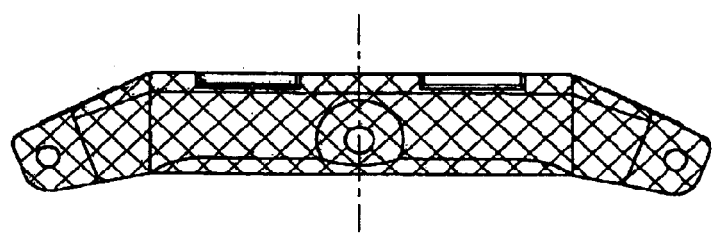

A fourth embodiment of a component for a watch and a method of manufacture thereof according to the present invention are shown in FIGS. 52a to 58b. The component in this embodiment is a watchcase instead of a wristband. In this embodiment, construction of the watchcase and method of manufacture thereof are generally similar to that of the first three embodiments. However, it is to be noted that an inner portion of the watchcase after having being cut from a steel blank (see FIG. 52b) and pressed into a desired shape (see FIG. 53b) is subject to a further process such that grooves and recesses (e.g. for accommodating movement and front and back covers of the watchcase) are formed on the inner portion (see FIGS. 56a and 56b). As shown in FIGS. 58a and 58b, the finished watchcase comprises of a region 100 with the inner portion exposed and a region 102 of the injection-molded material.

Fifth and sixth embodiments of a component for a watch and a method of manufacture thereof according to the present invention are shown in FIGS. 59a to 61m and FIGS. 62a to 64i respectively. The components in these two embodiments are also watchcases. In these two embodiments, construction of the watchcases and method of manufacture thereof are generally similar to that of the first to fourth embodiments as explained above and are therefore not repeated here. However, it is to be noted that the watchcases in the fifth and sixth embodiments are generally of rectangular shape.

Figure 65A:
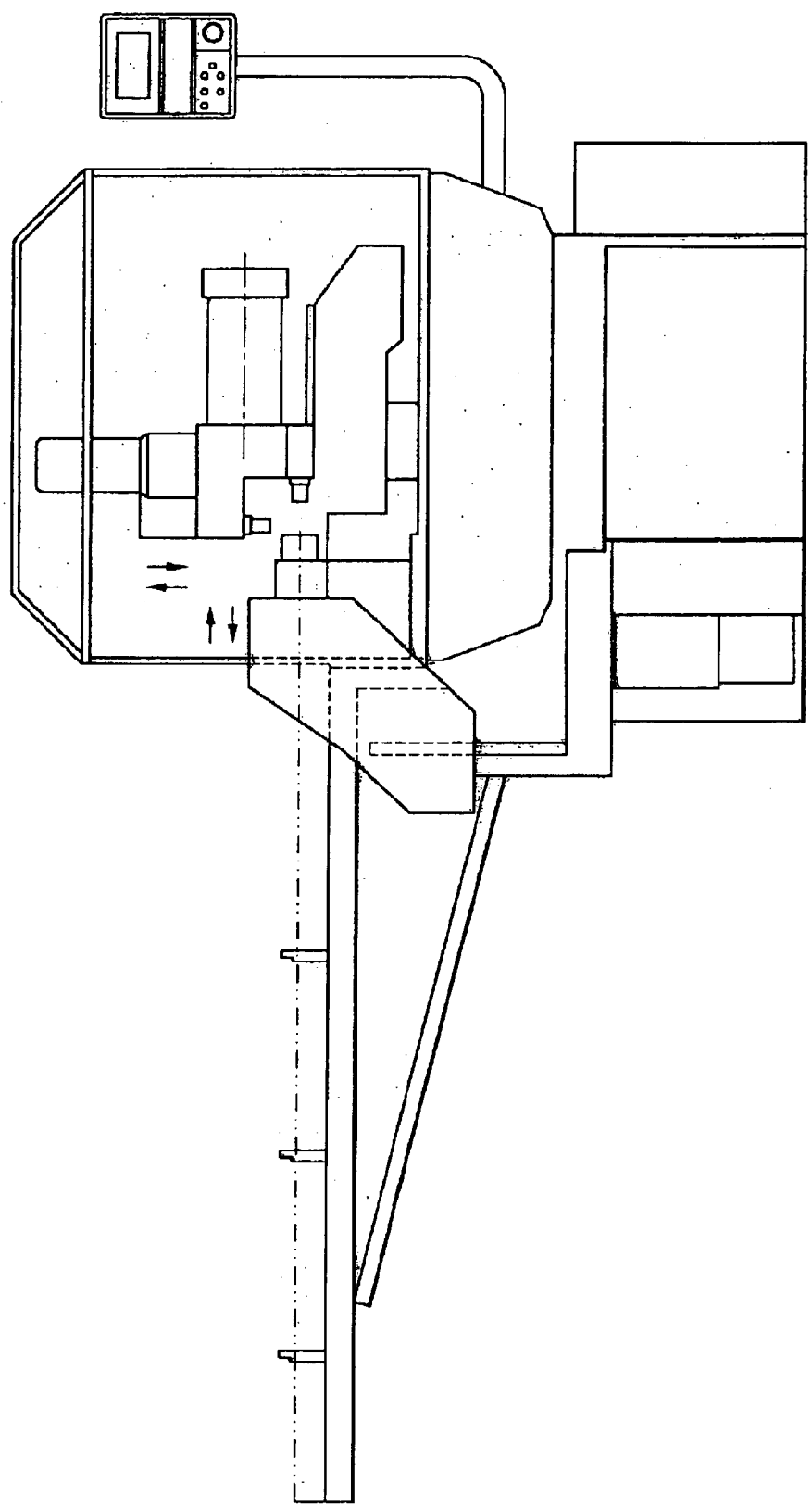
FIGS. 65a to 65b show a series of steps for producing an interior portion of a buckle component according to a seventh embodiment of the present invention.
Figure 65B:
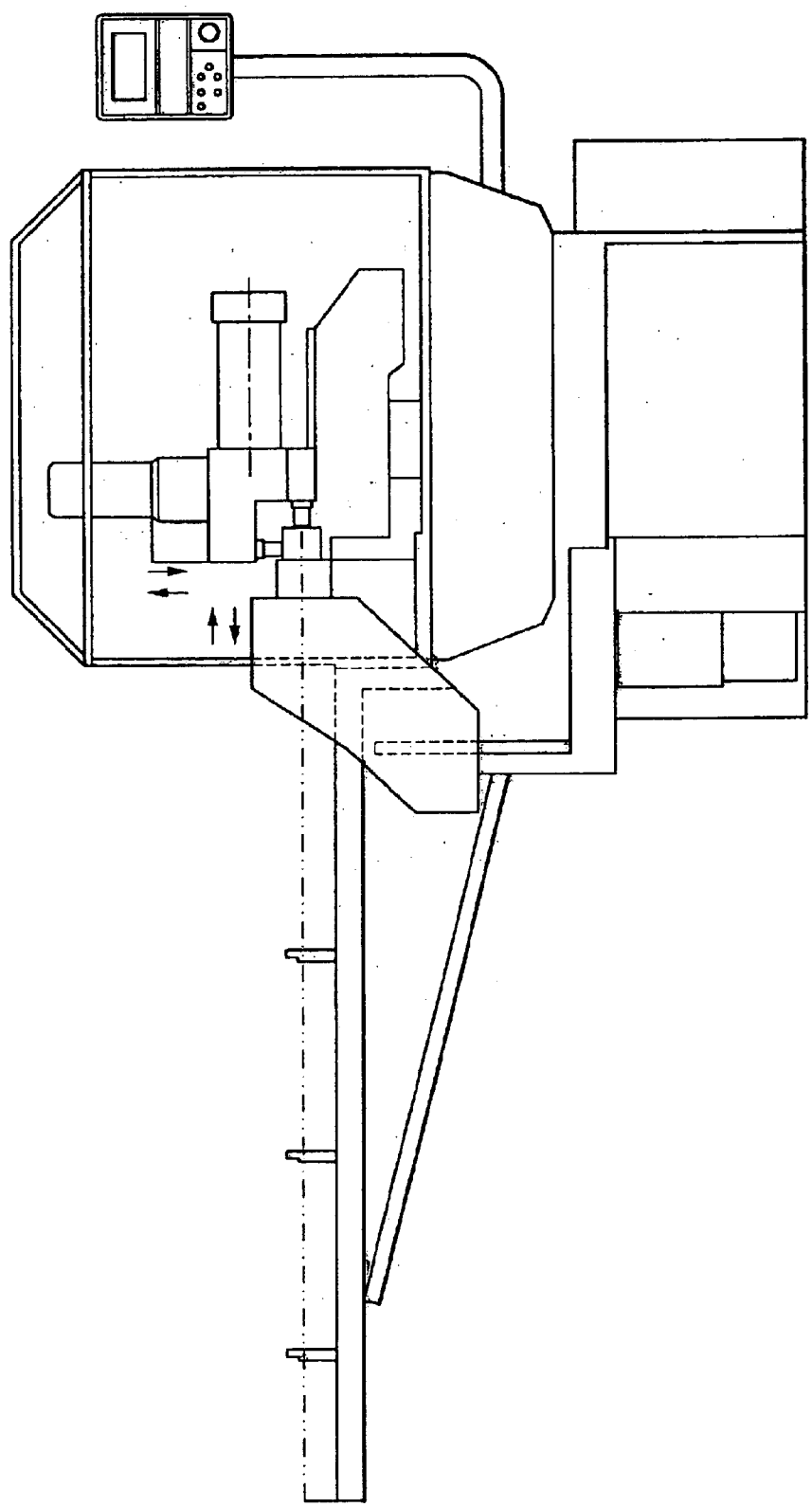
Figure 65C:
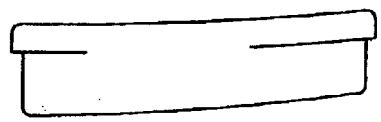
FIGS. 65c to 65d are different views of the interior portion produced from the steps illustrated in FIGS. 65a to 65b.
Figure 65D:
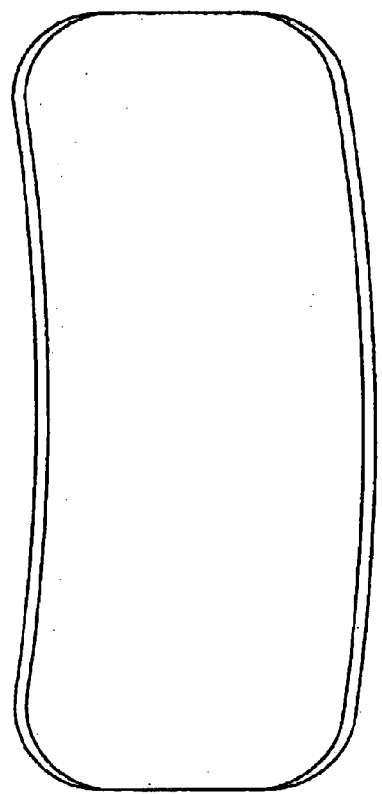
Figure 66A:
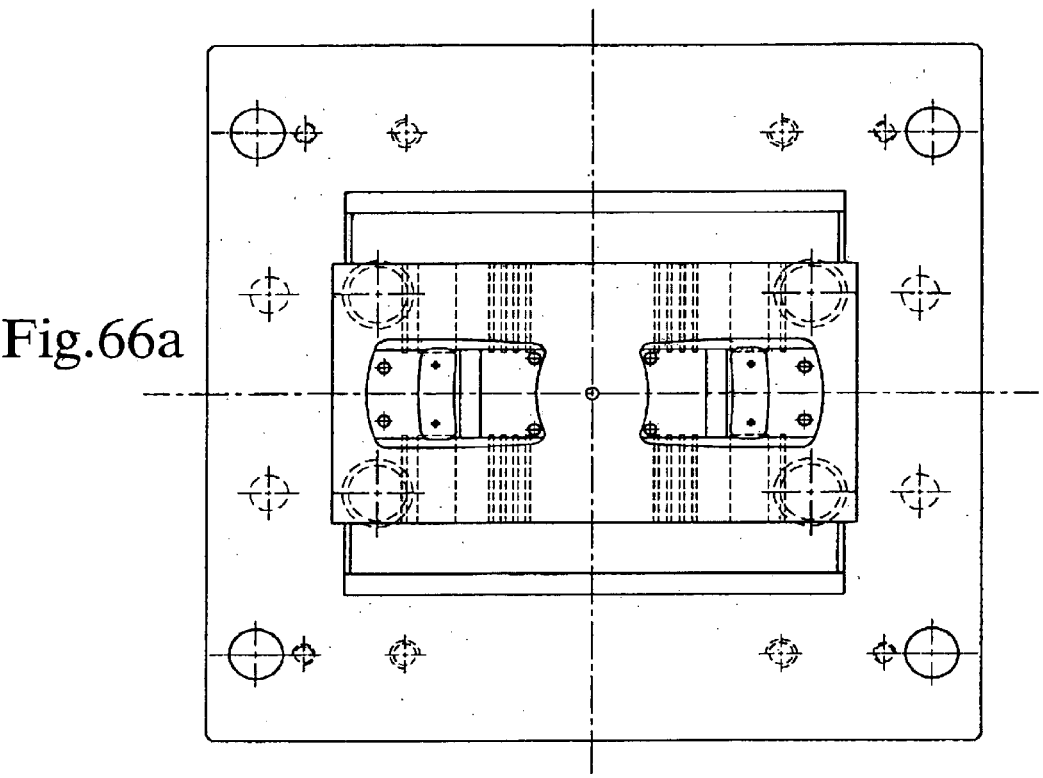
FIGS. 66a to 66g show a series of steps for moulding an exterior portion onto the interior portion of the watchcase shown in FIGS. 65c to 65d.
Figure 66B:
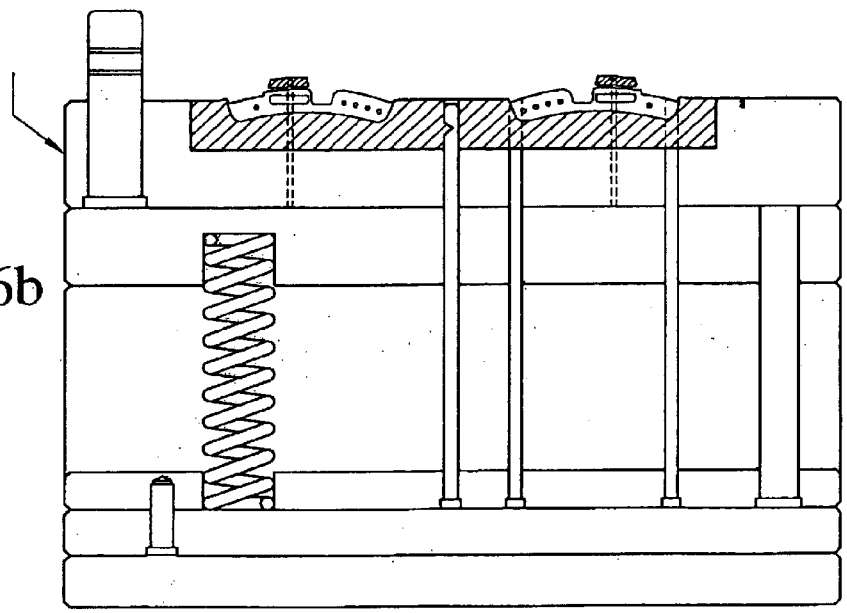
Figure 66C:
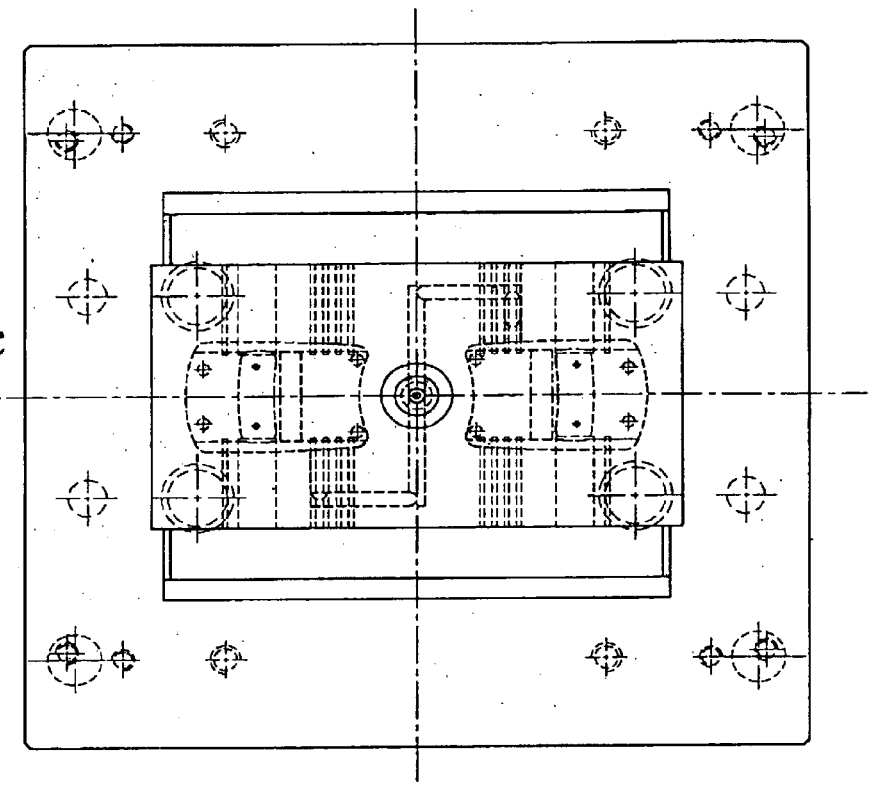
Figure 66D:
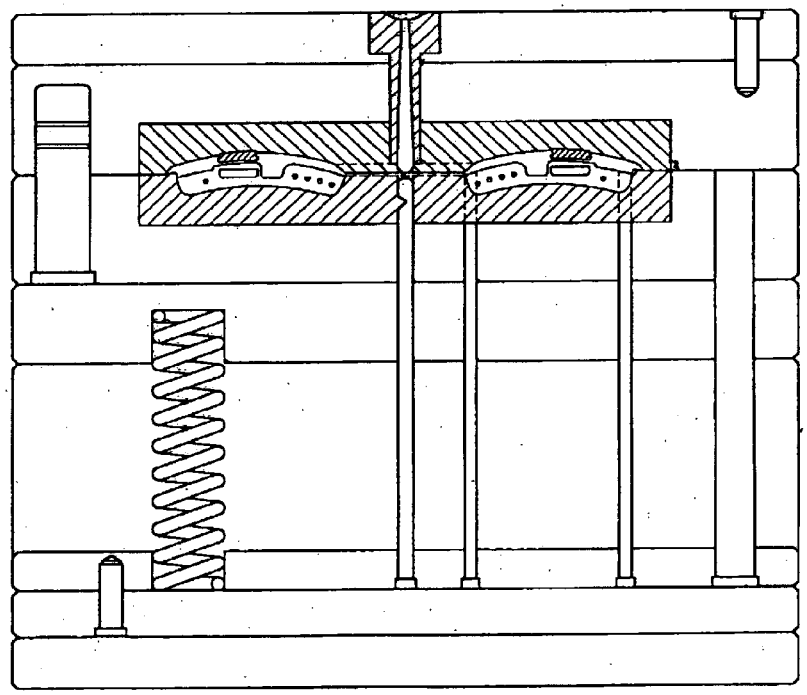
Figure 66E:
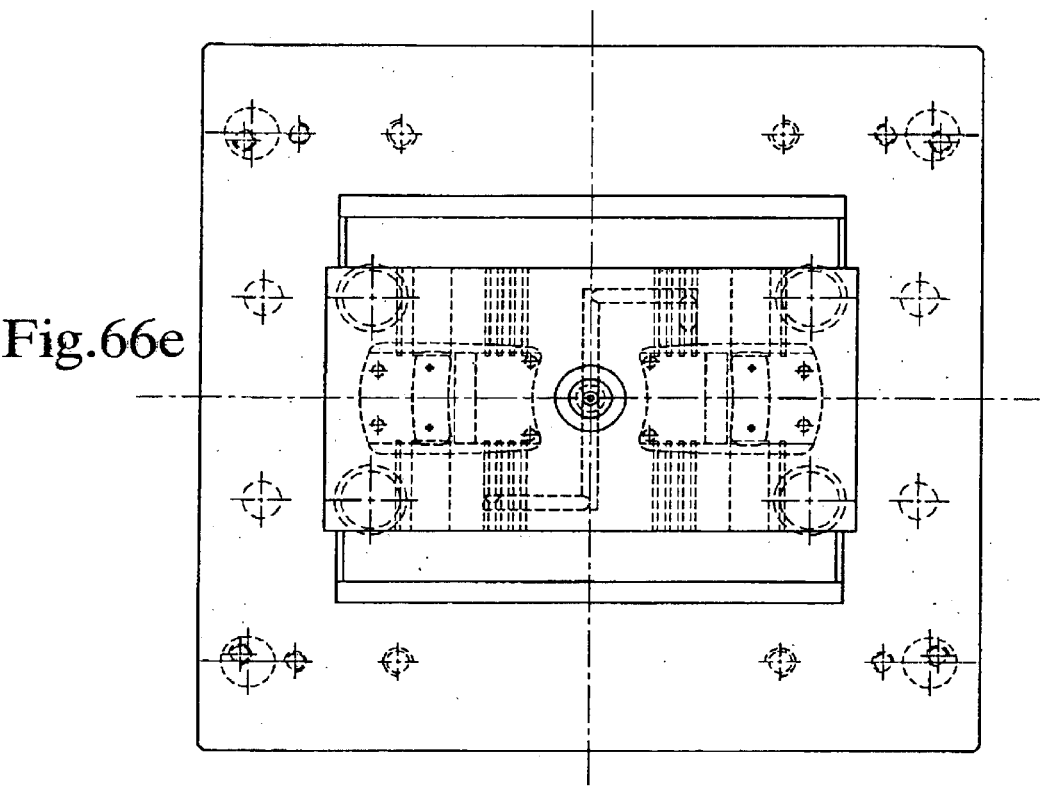
Figure 66F:
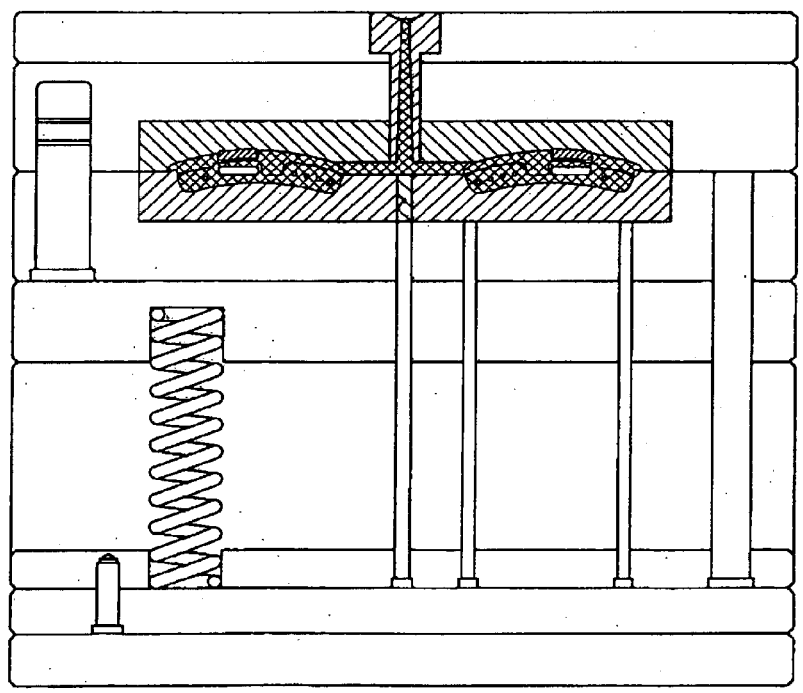
Figure 66G:
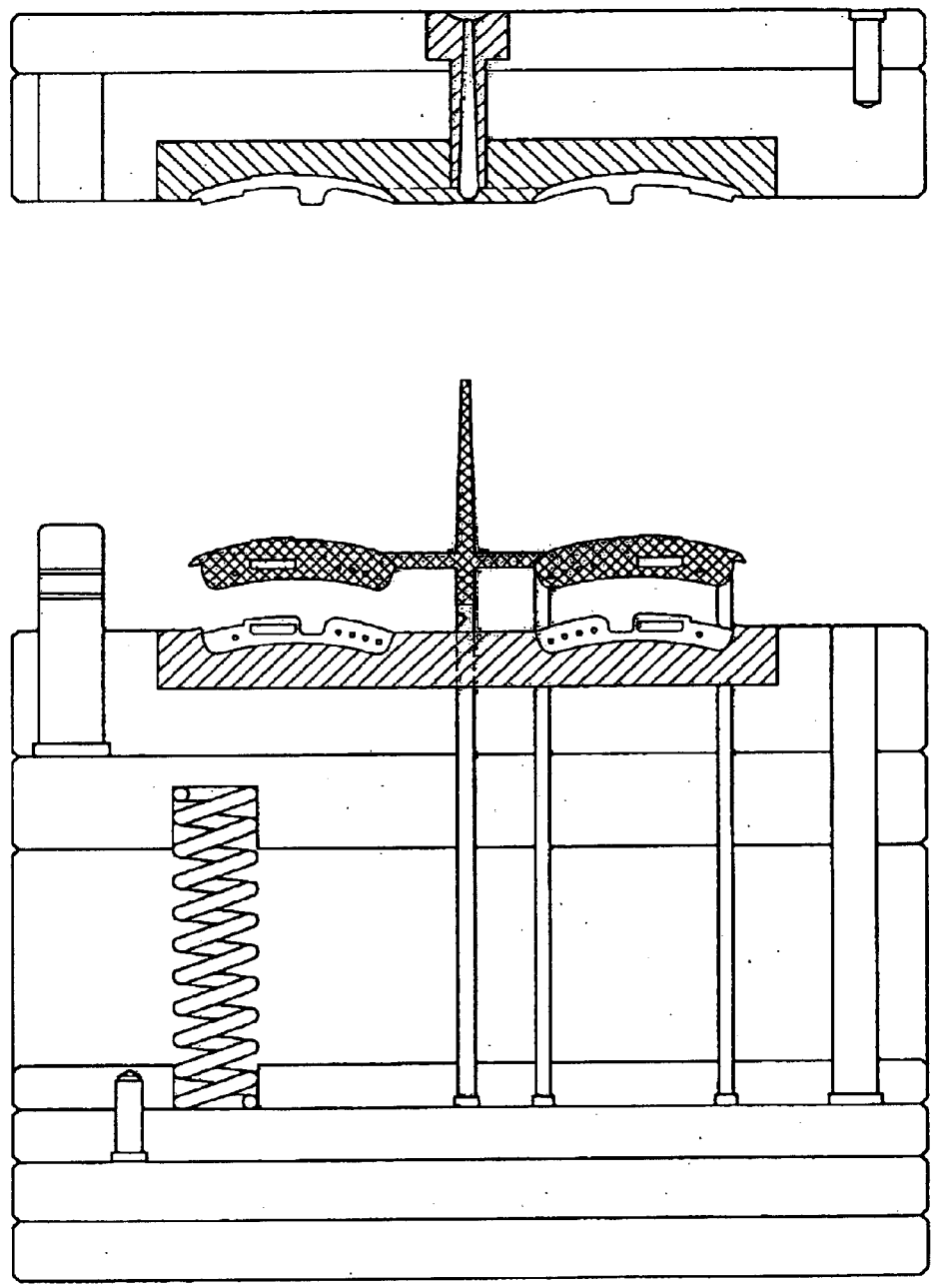
Figure 66H:
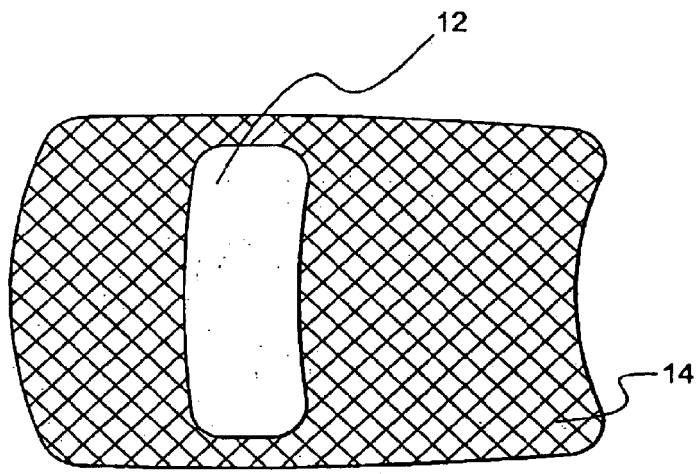
FIGS. 66h to 66i are different views of the buckle component produced from the steps illustrated in FIGS. 66a to 66g.
Figure 66I:
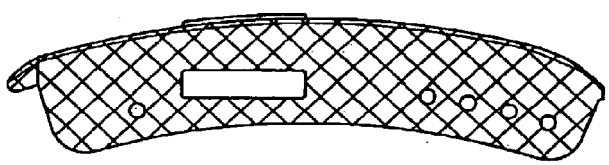

A seventh embodiment of a component for a timepiece and a method of manufacture thereof according to the present invention are shown in FIGS. 65a to 66i. The component in this embodiment is a buckle component for adjusting the length of a wristband and fastening the wristband to a user and may be called as length adjuster or fastener. In particular, FIGS. 65a and 65b show steps for forming an inner portion of the buckle component, FIGS. 65c and 65d show the side and top views of an inner portion of the buckle component, FIGS. 66a to 66g show steps for moulding injection moldable material onto the inner portion, and FIGS. 66h and 66i show the top and side views of the finished buckle component. It is to be noted in FIGS. 66h and 66i that a region 104 of the inner portion is exposed. A region 106 of the injection-molded material is of course also exposed.

It is envisaged that a watch comprising a matching watchcase, band and fastener according to the present invention exhibits an unusual appearance in that there are exposed alternate metallic regions and injection-molded regions. It is to be noted that unlike watches made principally of stainless steel, a watch made with the components according to the present invention retains the metallic strength, but yet is lighter because there is a lower content of metallic material and can be more durable because at least part of the metallic portion of the watch is protected by a injection-molded material.

Although the invention described above show seven embodiments, it is envisaged that components with a variety of patterns may be produced with surfaces having different combinations of metallic and injection-molded regions. For example, a watch may be constructed to include one or more of a watchcase, wristband and buckle component according to the present invention. It is also to be noted that the whole content of published UK Patent Publication No. 2374516 incorporated herein.

What is claimed is:

1. A band for a timepiece comprising a plurality of inter-connected links, at least one said link including a first portion made at least principally of a metallic material and a second portion made at least principally of an injection moldable material and fixedly secured thereto and molded thereover by injection moulding, wherein said injection moldable material is a natural rubber material, a synthetic rubber material, a silicon compound or a polymeric material selected from the group consisting of thermoplastic polyurethane, thermoplastic elastomer, acrylonitrile butadiene styrene, polycarbonate and polyvinyl chloride, and wherein protrusions and/or recesses are provided at at least one end of said links allowing connection of said links with each other.

2. A band according to claim 1, wherein said first portion is at least partially enveloped by said second portion.

3. A band according claim 1, wherein said links are inter-connected by at least a pin.

4. A band according to claim 1, wherein two of said adjacent links are connected at said protrusions and recesses.

5. A band according to claim 1, wherein said links are provided with a plurality of apertures at said protrusions and recesses.

6. A band according to claim 5, wherein said pin connects said links at said apertures.

7. A band according to claim 1, wherein two said links which are adjacent to each other are pivotably movable relative to each other.

8. A band according to claim 1, wherein said metallic material is stainless steel.

9. A combination of a band according to claim 1 and a length adjuster for adjusting the length of said band, wherein said length adjuster comprises a first portion made at least principally of a metallic material and a second portion made at least principally of an injection moldable material.

10. A combination according to claim 9, wherein said second portion of said length adjuster is fixedly secured to said first portion of said length adjuster by molded thereover.

11. A combination according to claim 9, wherein said first and second portions of said length adjuster are connected together by snap-fitting.

12. A combination according to claim 9, wherein said injection moldable material of said length adjuster is a synthetic rubber material, a natural rubber material, a silicon compound or a polymeric material selected from the group consisting of thermoplastic polyurethane thermoplastic elastomer, acrylonitrile butadiene styrene, polycarbonate and polyvinyl chloride.

13. A combination according to claim 9, wherein said metallic material is stainless steel.

14. A combination of a band according to claim 1 and a case for a timepiece, wherein said case comprises a first portion made at least principally of a metallic material and a second portion made at least principally of an injection moldable material and fixedly secured thereto and molded thereover by injection moulding.

15. A combination according to claim 14, wherein said injection moldable material of said case is a synthetic rubber material, a natural rubber material, a silicon compound or a polymeric material selected from the group consisting of polyurethane, thermoplastic elastomer, acrylonitrile butadiene styrene, polycarbonate and polyvinyl chloride.

16. A combination according to claim 14, wherein said case is connectable to said band.

17. A combination according to claim 14, wherein said metallic material of said case is stainless steel.

18. A timepiece comprising a band as defined in claim 1.

* * * * *